US010701937B2

(12) United States Patent
Wilhelm et al.

(10) Patent No.: US 10,701,937 B2
(45) Date of Patent: Jul. 7, 2020

(54) PESTICIDAL MIXTURE COMPRISING A PYRAZOLE COMPOUND, AN INSECTICIDE AND A FUNGICIDE

(71) Applicant: BASF SE, Ludwigshafen am Rein (DE)

(72) Inventors: Ronald Wilhelm, Hofheim (DE); Florent Mazuir, Raleigh, NC (US); Sebastian Soergel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 15/550,191

(22) PCT Filed: Feb. 3, 2016

(86) PCT No.: PCT/EP2016/052218
§ 371 (c)(1),
(2) Date: Aug. 10, 2017

(87) PCT Pub. No.: WO2016/128261
PCT Pub. Date: Aug. 18, 2016

(65) Prior Publication Data
US 2018/0271095 A1  Sep. 27, 2018

(30) Foreign Application Priority Data

Feb. 11, 2015  (EP) .................... 15154717

(51) Int. Cl.
A01N 43/58 (2006.01)
A01N 37/46 (2006.01)

(52) U.S. Cl.
CPC .................. A01N 43/58 (2013.01)

(58) Field of Classification Search
CPC combination set(s) only.
See application file for complete search history.

(56) References Cited

U.S. PATENT DOCUMENTS

| 3,296,272 | A | 1/1967 | Johnston et al. |
| 3,325,503 | A | 6/1967 | Bimber et al. |
| 4,617,303 | A | 10/1986 | Eicken et al. |
| 5,091,539 | A | 2/1992 | Makisumi et al. |
| 8,524,743 | B2 | 9/2013 | Cristau et al. |
| 8,822,693 | B2 | 9/2014 | Hoffmann et al. |
| 9,309,202 | B2 | 4/2016 | Pazenok et al. |
| 9,961,899 | B2 | 5/2018 | Ding et al. |
| 2001/0007876 | A1 | 7/2001 | Alig et al. |
| 2009/0076282 | A1 | 3/2009 | Toriyade et al. |
| 2009/0118346 | A1 | 5/2009 | Dunkel et al. |
| 2011/0046186 | A1 | 2/2011 | Li et al. |
| 2011/0137068 | A1* | 6/2011 | Aoki ............ A01N 37/46 560/43 |
| 2013/0150414 | A1 | 6/2013 | Kagabu et al. |

FOREIGN PATENT DOCUMENTS

| CN | 101715777 A | 6/2010 |
| CN | 102126994 A | 7/2011 |
| CN | 102613183 A | 8/2012 |
| CN | 104488896 A | 4/2015 |
| CN | 104488900 A | 4/2015 |
| CN | 104521989 A | 4/2015 |
| CN | 104936451 A | 9/2015 |
| CN | 105994301 A | 10/2016 |
| DE | 19650197 A1 | 6/1998 |
| DE | 10021412 A1 | 6/2001 |
| DE | 102005009458 A1 | 9/2006 |
| EP | 0141317 A2 | 5/1985 |
| EP | 0152031 A2 | 8/1985 |
| EP | 0226917 A1 | 7/1987 |
| EP | 0243970 A1 | 11/1987 |
| EP | 0256503 A2 | 2/1988 |
| EP | 0428941 A1 | 5/1991 |
| EP | 0532022 A1 | 3/1993 |
| EP | 1028125 A1 | 8/2000 |
| EP | 1035122 A1 | 9/2000 |
| EP | 1122244 A1 | 8/2001 |

(Continued)

OTHER PUBLICATIONS

The Pesticide Manual, 16th Edition, C. MacBean, British Crop Protection Council (2013).
Can. J. Plant Sci. 48(6), 587-94, 1968.
Catalogue of pesticide formulation types and international coding system, Technical Mono-graph No. 2, 6th Ed. May 2008, CropLife International.
Mollet and Grubemann, Formulation technology, Wiley VCH, Weinheim, 2001.
Knowles, New developments in crop protection product formulation, Agrow Reports DS243, T&F Informa, London, 2005.
McCutcheon's, vol. 1: Emulsifiers & Detergents, McCutcheon's Directories, Glen Rock, USA, 2008 (International Ed. or North American Ed.).

(Continued)

Primary Examiner — John Pak
(74) Attorney, Agent, or Firm — Marshall, Gerstein & Borun LLP

(57) ABSTRACT

Compositions and methods of using a pesticidal mixture PM that includes at least one compound of formula I defined above, an insecticide and a fungicide for protecting crop, plant propagation material, or soil or water in which the plants are growing, against attack or infestation by invertebrate pests and/or phytopathogenic fungi are described. Also described is a seed treatment composition that includes the pesticidal mixture PM, as well as seeds treated using the pesticidal mixture PM or the seed treatment composition. Methods for controlling invertebrate pests and/or phytopathogenic fungi on crop plants are described that include contacting the plant or the plant propagation material; the pest or its food supply, habitat or breeding ground; and/or the fungi or habitat, with an effective amount of the pesticidal mixture PM or the seed treatment composition. Binary mixtures of a compound of formula I and a second pesticidal component are also described.

10 Claims, No Drawings

(56) References Cited

FOREIGN PATENT DOCUMENTS

| | | |
|---|---|---|
| EP | 1201648 A1 | 5/2002 |
| EP | 2762002 A1 | 8/2014 |
| EP | 2762473 B1 | 8/2016 |
| JP | 2002316902 A | 10/2002 |
| WO | 9846608 A1 | 10/1998 |
| WO | 9914187 A1 | 3/1999 |
| WO | 9924413 A2 | 5/1999 |
| WO | 9927783 A1 | 6/1999 |
| WO | 0029404 A1 | 5/2000 |
| WO | 0046148 A1 | 8/2000 |
| WO | 0065913 A1 | 11/2000 |
| WO | 0154501 A2 | 8/2001 |
| WO | 0156358 A2 | 8/2001 |
| WO | 0222583 A2 | 3/2002 |
| WO | 0240431 A2 | 5/2002 |
| WO | 03010149 A1 | 2/2003 |
| WO | 03011853 A1 | 2/2003 |
| WO | 03014103 A1 | 2/2003 |
| WO | 03016286 A1 | 2/2003 |
| WO | 03016303 A1 | 2/2003 |
| WO | 03053145 A1 | 7/2003 |
| WO | 03061388 A1 | 7/2003 |
| WO | 03066609 A1 | 8/2003 |
| WO | 03074491 A1 | 9/2003 |
| WO | 2004049804 A2 | 6/2004 |
| WO | 2004083193 A1 | 9/2004 |
| WO | 2005063721 A1 | 7/2005 |
| WO | 2005077934 A1 | 8/2005 |
| WO | 2005087773 A1 | 9/2005 |
| WO | 2005120234 A2 | 12/2005 |
| WO | 2005123689 A1 | 12/2005 |
| WO | 2005123690 A1 | 12/2005 |
| WO | 2006015866 A1 | 2/2006 |
| WO | 2006087325 A1 | 8/2006 |
| WO | 2006087343 A1 | 8/2006 |
| WO | 2006089633 A2 | 8/2006 |
| WO | 2007006670 A1 | 1/2007 |
| WO | 2007043677 A1 | 4/2007 |
| WO | 2007090624 A2 | 8/2007 |
| WO | 2007101369 A1 | 9/2007 |
| WO | 2007101540 A1 | 9/2007 |
| WO | 2007144100 A1 | 12/2007 |
| WO | 2006043635 A1 | 5/2008 |
| WO | 2008067911 A1 | 6/2008 |
| WO | 2007082098 A2 | 10/2008 |
| WO | 2009023721 A1 | 2/2009 |
| WO | 2009090181 A2 | 7/2009 |
| WO | 2009124707 A2 | 10/2009 |
| WO | 2010006713 A2 | 1/2010 |
| WO | 2010034737 A1 | 4/2010 |
| WO | 2010060379 A1 | 6/2010 |
| WO | 2010069266 A1 | 6/2010 |
| WO | 2010069502 A2 | 6/2010 |
| WO | 2010069882 A1 | 6/2010 |
| WO | 2010127926 A1 | 11/2010 |
| WO | 2010129497 A1 | 11/2010 |
| WO | 2011028657 A1 | 3/2011 |
| WO | 11076699 A1 | 6/2011 |
| WO | 2011069456 A1 | 6/2011 |
| WO | 2011077514 A1 | 6/2011 |
| WO | 2011085575 A1 | 7/2011 |
| WO | 2011135833 A1 | 11/2011 |
| WO | 2010018714 A1 | 1/2012 |
| WO | 2012000896 A2 | 1/2012 |
| WO | 2012034403 A1 | 3/2012 |
| WO | 2012034472 A1 | 3/2012 |
| WO | 2012084670 A1 | 6/2012 |
| WO | 12104273 A1 | 8/2012 |
| WO | 2012143317 A1 | 10/2012 |
| WO | 2012168188 A1 | 12/2012 |
| WO | 2013003977 A1 | 1/2013 |
| WO | 2013024009 A1 | 2/2013 |
| WO | 2013024010 A1 | 2/2013 |
| WO | 2013050317 A1 | 4/2013 |
| WO | 2013055584 A1 | 4/2013 |
| WO | 2013092224 A1 | 6/2013 |
| WO | 13113829 A1 | 8/2013 |
| WO | 2013127704 A1 | 9/2013 |
| WO | 2013129688 A1 | 9/2013 |
| WO | 2012029672 A1 | 10/2013 |
| WO | 2013162072 A1 | 10/2013 |
| WO | 2013189801 A1 | 12/2013 |
| WO | 14089219 A1 | 6/2014 |
| WO | 2014126208 A1 | 8/2014 |
| WO | 15036379 A1 | 3/2015 |
| WO | 15038503 A1 | 3/2015 |
| WO | 2013047441 A1 | 3/2015 |
| WO | 2013047749 A1 | 3/2015 |
| WO | 15055752 A1 | 4/2015 |
| WO | 15055755 A1 | 4/2015 |
| WO | 15055757 A1 | 4/2015 |
| WO | 2015055497 A1 | 4/2015 |
| WO | 15144683 A1 | 10/2015 |
| WO | 15180983 A1 | 12/2015 |
| WO | 15180985 A1 | 12/2015 |
| WO | 15180987 A1 | 12/2015 |
| WO | 15180999 A1 | 12/2015 |
| WO | 15181008 A1 | 12/2015 |
| WO | 15181009 A1 | 12/2015 |
| WO | 15197393 A1 | 12/2015 |
| WO | 15200175 A1 | 12/2015 |
| WO | 2015189080 A1 | 12/2015 |
| WO | 16014664 A1 | 1/2016 |
| WO | 16015979 A1 | 2/2016 |
| WO | 16018875 A1 | 2/2016 |
| WO | 16034615 A1 | 3/2016 |
| WO | 16034618 A1 | 3/2016 |
| WO | 16037043 A1 | 3/2016 |
| WO | 2016128239 A1 | 8/2016 |
| WO | 2016128240 A1 | 8/2016 |
| WO | 17060349 A1 | 4/2017 |
| WO | 17178917 A1 | 10/2017 |

OTHER PUBLICATIONS

Knowles, Adjuvants and additives, Agrow Reports DS256, T&F Informa UK, 2006, chapter 5.
Colby, S.R., 1967, Calculating Synergistic and Antagonistic Responses in Herbicide Combinations, Weeds, 15, 20-22.
International Search Report and Written Opinion for International Application No. PCT/EP2016/052218, dated Feb. 3, 2016, 15 pages.
He, et al., "Composition used for treating fungal diseases in crops comprises 2-(p-fluorphenyl)-5-methanesulfonyl-1.3.4-oxadiazole and fungicide e.g. fluxapyroxad, fluopyram or fluopyram of flutolanil", Database WPI Thomson Scientific, AN 2015-375332, XP002758820, 2 pages.
Huang et al., "Composition useful for preventing and controlling plant diseases and pests, comprises methanesulfonyl oxadiazole and neonicotinoid insecticides", Database WPI Thomson Scientific, AN 2015-34275f, XP002758819, Apr. 8, 2015, 2 pages.
LI et al., "Composition useful for preventing bacterial and fungal diseases in crops, comprises methanesulfonyl ipconazole and strobilurin fungicide e.g. pyraclostrobin, picoxystrobin, fluoxastrobin, kresoxim-methyl and trifloxystrobin", Database WPI Thomson Scientific, AN 2015-34275k, XP002758821, Apr. 8, 2015, 2 pages.

* cited by examiner

PESTICIDAL MIXTURE COMPRISING A PYRAZOLE COMPOUND, AN INSECTICIDE AND A FUNGICIDE

CROSS-REFERENCE TO RELATED APPLICATIONS

This application is a U.S. National Phase Application of PCT/EP2016/052218, filed Feb. 3, 2016, which claims the benefit of priority to European Patent Application No. 15154717.1, filed Feb. 11, 2015, the entire contents of which are hereby incorporated by reference herein.

BACKGROUND

Invertebrate pests and in particular insects, arachnids and nematodes destroy growing and harvested crops and attack wooden dwelling and commercial structures, thereby causing large economic loss to the food supply and to property. Accordingly, there is an ongoing need for pesticides and pesticidal mixtures for combating invertebrate pests.

It has been found that N-(het)arylamides derived from pyrazole carboxylic acids, which are described e.g. in WO2010/034737, WO2012/084670, WO2012/143317, and WO2015/055497 are particularly useful for combating pests.

Furthermore, pesticidal mixtures of such pyrazole compounds with a further insecticide or fungicide are described in WO2012/084670 and WO2013/189801.

Nevertheless, there remains a need for pesticidal mixtures, which are suitable for overcoming specific problems in pest control.

In this context, it is also important to note that pest infestation is often accompanied by infestation with harmful fungi, so that it is often not only required that the pesticidal mixtures are suitable for pest control, but also that they are suitable for controlling harmful fungi. In this regard, it is noted that row crops selected from wheat, maize, barley, oat, rye, rice, soybean, cotton, sugar-beet, rapeseed, and potato which are of particular commercial importance, are highly vulnerable in terms of the attack or infestation by certain invertebrate pests and pythopathogenic harmful fungi. Relevant invertebrate pests for the above row crops include aphids, diptera, leafhopper, thrips, and whitefly, preferably aphids and/or thrips. Important harmful fungi include *Pythium* sp., *Fusarium* sp., *Rhizoctonia* sp., *Ustilago* sp., *Tilletia* sp., *Michrodochium* sp., *Gaeumannomyces graminis, Aphanomyces cochlioides, Sclerotinia* sp., and *Phoma* sp., preferably *Pythium* sp., *Fusarium* sp., *Ustilago* sp., *Tilletia* sp., *Michrodochium* sp., *Gaeumannomyces graminis, Aphanomyces cochlioides, Sclerotinia* sp., and *Phoma* sp., more preferably *Pythium* sp., *Fusarium* sp., or *Phoma* sp. Consequently, a pesticidal mixture is required, which has insecticidal activity against the above listed pests, and at the same time fungicidal activity against the above listed fungi. It is therefore an object of the present invention to provide pesticidal mixtures, which are suitable for protecting a plant selected from wheat, maize, barley, oat, rye, rice, soybean, cotton, sugarbeet, rapeseed, and potato against the harmful effects of the above listed pests and fungi.

Furthermore, there are increasing problems with insect resistance and/or fungal resistance, while it is at the same time desired to reduce dosage rates of the active ingredients in order to reduce or avoid unfavorable environmental or toxicological effects. It is therefore another object of the present invention to provide pesticidal mixtures, which overcome the problem of insect resistance and/or fungal resistance. It is yet another object of the present invention to provide pesticidal mixtures, which can be applied in low dosage rates.

Furthermore, there is a desire for pesticidal mixtures that improve "plant health" as defined below. It is therefore another object of the present invention to provide pesticidal mixtures, which are suitable for improving the plant health.

In connection with the above objects, it is emphasized that in certain situations, in particular seeds, plant roots, and shoots are threatened by harmful pests and/or fungi. Accordingly, there is also an ongoing need for pesticidal mixtures and seed treatment compositions comprising said pesticidal mixtures, which are suitable for protecting the plant propagation material, in particular the seeds, and the plant roots and shoots of the plant from attack and infestation by harmful pests and/or fungi. It is particularly desired to provide pesticidal mixtures and seed treatment compositions, which not only have activity against pests and/or fungi in the soil, which threaten the seeds and the roots of the plant, but which also ensure protection against foliar pests and/or fungi as defined above, when applied to the seeds only, e.g. by seed dressing, seed coating, seed dusting, seed soaking or seed pelleting, in order to protect the shoots of the plant. It is therefore another object of the present invention to provide pesticidal mixtures and seed treatment compositions, which are suitable for protecting the plant propagation material, in particular the seeds and the roots and shoots of a plant, in particular a plant selected from wheat, maize, barley, oat, rye, rice, soybean, cotton, sugarbeet, rapeseed, and potato, against the harmful effects of pests and/or fungi. In particular, it is an object to provide pesticidal mixtures and seed treatment compositions, which are suitable for protecting the shoots of a plant, in particular a plant selected from wheat, maize, barley, oat, rye, rice, soybean, cotton, sugarbeet, rapeseed, and potato, against harmful foliar pests and/or fungi as defined above, when applied to the seeds only.

SUMMARY

In a first aspect, the present invention relates to the use of a pesticidal mixture PM for protecting a plant selected from wheat, maize, barley, oat, rye, rice, soybean, cotton, sugarbeet, rapeseed, and potato, the plant propagation material thereof, or soil or water, in which said plants are growing, against the attack or infestation by invertebrate pests and/or phytopathogenic harmful fungi, wherein the pesticidal mixture comprises as active components 1) at least one active compound of formula I:

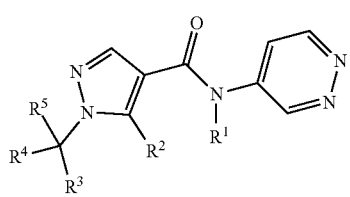

wherein
$R^1$ is H, $C_1$-$C_2$-alkyl, or $C_1$-$C_2$-alkoxy-$C_1$-$C_2$-alkyl;
$R^2$ is $CH_3$, or halomethyl;
$R^3$ is CN, $C_1$-$C_6$-alkyl, $C_1$-$C_6$-haloalkyl, $C_1$-$C_2$-alkoxy-$C_1$-$C_2$-alkyl, $C_2$-$C_6$-alkenyl and $C_2$-$C_6$-alkynyl, $C_3$-$C_6$- cycloalkyl, $C_5$-$C_6$-cycloalkenyl, $C_1$-$C_6$-alkoxy, wherein the C-atoms are unsubstituted, or partially or fully substituted by $R^a$;

$R^a$ is halogen, CN, $C_1$-$C_2$-alkyl, $C_1$-$C_2$-haloalkyl, $C_1$-$C_4$-alkoxy, $C_1$-$C_2$-haloalkoxy;

$R^4$ is $C_1$-$C_4$-alkyl, or a group mentioned for $R^3$; or $R^3$ and $R^4$ may together form $C_5$-$C_6$-cycloalkyl, which is unsubstituted, or partially or fully substituted by $R^a$;

$R^5$ is H, or a group mentioned for $R^4$;

and the stereoisomers, salts, tautomers and N-oxides thereof;

2) at least one insecticide II selected from the group M consisting of:

M.1 Acetylcholine esterase (AChE) inhibitors from the class of: M.1A carbamates, for example aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; or from the class of M.1B organophosphates, for example acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemetonmethyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion;

M.2. GABA-gated chloride channel antagonists such as: M.2A cyclodiene organochlorine compounds, as for example endosulfan or chlordane; or M.2B fiproles (phenylpyrazoles), as for example ethiprole, fipronil, flufiprole, pyrafluprole and pyriprole;

M.3 Sodium channel modulators from the class of M.3A pyrethroids, for example acrinathrin, allethrin, d-cis-trans allethrin, d-trans allethrin, bifenthrin, bioallethrin, bioallethrin S-cylclopentenyl, bioresmethrin, cyprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin and transfluthrin; or M.3B sodium channel modulators such as DDT or methoxychlor;

M.4 Nicotinic acetylcholine receptor agonists (nAChR) from the class of M.4A neonicotinoids, for example acetamiprid, clothianidin, cycloxaprid, dinotefuran, imidacloprid, nitenpyram, thiacloprid and thiamethoxam; or the compounds M.4A.2: (2E-)-1-[(6-Chloropyridin-3-yl)methyl]-N'-nitro-2-pentylidenehydrazinecarboximidamide; or M4.A.3: 1-[(6-Chloropyridin-3-yl)methyl]-7-methyl-8-nitro-5-propoxy-1,2,3,5,6,7-hexahydroimidazo[1,2-a]pyridine; or from the class M.4B nicotine;

M.5 Nicotinic acetylcholine receptor allosteric activators from the class of spinosyns, for example spinosad or spinetoram;

M.6 Chloride channel activators from the class of avermectins and milbemycins, for example abamectin, emamectin benzoate, ivermectin, lepimectin or milbemectin;

M.7 Juvenile hormone mimics, such as M.7A juvenile hormone analogues as hydroprene, kinoprene and methoprene; or others as M.7B fenoxycarb or M.7C pyriproxyfen;

M.8 miscellaneous non-specific (multi-site) inhibitors, for example M.8A alkyl halides as methyl bromide and other alkyl halides, or M.8B chloropicrin, or M.8C sulfuryl fluoride, or M.8D borax, or M.8E tartar emetic;

M.9 Selective homopteran feeding blockers, for example M.9B pymetrozine, or M.9C flonicamid;

M.10 Mite growth inhibitors, for example M.10A clofentezine, hexythiazox and diflovidazin, or M.10B etoxazole;

M.11 Microbial disruptors of insect midgut membranes, for example *Bacillus thuringiensis* or *Bacillus sphaericus* and the insecticidal proteins they produce such as *Bacillus thuringiensis* subsp. *israelensis, Bacillus sphaericus, Bacillus thuringiensis* subsp. *aizawai, Bacillus thuringiensis* subsp. *kurstaki* and *Bacillus thuringiensis* subsp. *tenebrionis*, or the Bt crop proteins: Cry1Ab, Cry1Ac, Cry1Fa, Cry2Ab, mCry3A, Cry3Ab, Cry3Bb and Cry34/35Ab1;

M.12 Inhibitors of mitochondrial ATP synthase, for example M.12A diafenthiuron, or M.12B organotin miticides such as azocyclotin, cyhexatin or fenbutatin oxide, or M.12C propargite, or M.12D tetradifon;

M.13 Uncouplers of oxidative phosphorylation via disruption of the proton gradient, for example chlorfenapyr, DNOC or sulfluramid;

M.14 Nicotinic acetylcholine receptor (nAChR) channel blockers, for example nereistoxin analogues as bensultap, cartap hydrochloride, thiocyclam, or thiosultap sodium;

M.15 Inhibitors of the chitin biosynthesis type 0, such as benzoylureas as for example bistrifluron, chlorfluazuron, diflubenzuron, flucycloxuron, flufenoxuron, hexaflumuron, lufenuron, novaluron, noviflumuron, teflubenzuron or triflumuron;

M.16 Inhibitors of the chitin biosynthesis type 1, as for example buprofezin;

M.17 Moulting disruptors, Dipteran, as for example cyromazine;

M.18 Ecdyson receptor agonists such as diacylhydrazines, for example methoxyfenozide, tebufenozide, halofenozide, fufenozide or chromafenozide;

M.19 Octopamin receptor agonists, as for example amitraz;

M.20 Mitochondrial complex III electron transport inhibitors, for example M.20A hydramethylnon, or M.20B acequinocyl, or M.20C fluacrypyrim;

M.21 Mitochondrial complex I electron transport inhibitors, for example M.21A METI acaricides and insecticides such as fenazaquin, fenpyroximate, pyrimidifen, pyridaben, tebufenpyrad or tolfenpyrad, or M.21B rotenone;

M.22 Voltage-dependent sodium channel blockers, for example M.22A indoxacarb, or M.22B metaflumizone, or M.22B.1: 2-[2-(4-Cyanophenyl)-1-[3-(trifluoromethyl)phenyl]ethylidene]-N-[4-(difluoromethoxy)phenyl]-hydrazinecarboxamide or M.22B.2: N-(3-Chloro-2-methylphenyl)-2-[(4-chlorophenyl)[4-[methyl(methylsulfonyl)amino]phenyl]methylene]-hydrazinecarboxamide;

M.23 Inhibitors of the of acetyl CoA carboxylase, such as Tetronic and Tetramic acid derivatives, for example spirodiclofen, spiromesifen or spirotetramat;

M.24 Mitochondrial complex IV electron transport inhibitors, for example M.24A phosphine such as aluminium phosphide, calcium phosphide, phosphine or zinc phosphide, or M.24B cyanide;

M.25 Mitochondrial complex II electron transport inhibitors, such as beta-ketonitrile derivatives, for example cyenopyrafen or cyflumetofen;

M.28 Ryanodine receptor-modulators from the class of diamides, as for example flubendiamide, chlorantraniliprole (Rynaxypyr®), cyantraniliprole (Cyazypyr®), tetraniliprole, or the phthalamide compounds M.28.1: (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and M.28.2: (S)-3-Chlor-N1-{2-methyl-4-[1,2,2,2-tetrafluor-1-(trifluormethyl)ethyl]phenyl}-N2-(1-methyl-2-methylsulfonylethyl)phthalamid, or the compound M.28.3: 3-bromo-N-{2-bromo-4-chloro-6-[(1-cyclopropylethyl)carbamoyl]phenyl}-1-(3-chlorpyridin-2-yl)-1H-pyrazole-5-carboxamide (proposed ISO name: cyclaniliprole), or the compound M.28.4: methyl-2-[3,5-dibromo-2-({[3-bromo-1-(3-chloropyridin-2-yl)-1H-pyrazol-5-yl]carbonyl}amino)benzoyl]-1,2-dimethylhydrazinecarboxylate; or a compound selected from M.28.5i) N-[2-(5-Amino-1,3,4-thiadiazol-2-yl)-4-chloro-6-methylphenyl]-3-bromo-1-(3-chloro-2-pyridinyl)-1H-pyrazole-5-carboxamide; M.28.5j) 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; M.28.5k) 3-Bromo-N-[2,4-dichloro-6-(methylcarbamoyl)phenyl]-1-(3,5-dichloro-2-pyridyl)-1H-pyrazole-5-carboxamide; M.28.5l) N-[4-Chloro-2-[[(1,1-di-methylethyl)amino]carbonyl]-6-methylphenyl]-1-(3-chloro-2-pyridinyl)-3-(fluoromethoxy)-1H-pyrazole-5-carboxamide; or a compound selected from M.28.6: N-(2-cyanopropan-2-yl)-N-(2,4-dimethylphenyl)-3-iodobenzene-1,2-dicarboxamide; or M.28.7: 3-Chloro-N-(2-cyanopropan-2-yl)-N-(2,4-dimethylphenyl)-benzene-1,2-dicarboxamide;

M.29. insecticidal active compounds of unknown or uncertain mode of action, as for example afidopyropen, afoxolaner, azadirachtin, amidoflumet, benzoximate, bifenazate, broflanilide, bromopropylate, chinomethionat, cryolite, cyhalodiamide, dicloromezotiaz, dicofol, flufenerim, flometoquin, fluensulfone, fluhexafon, fluopyram, flupyradifurone, fluralaner, metoxadiazone, piperonyl butoxide, pyflubumide, pyridalyl, pyrifluquinazon, sulfoxaflor, tioxazafen, triflumezopyrim, or M.29.3: 11-(4-chloro-2,6-dimethylphenyl)-12-hydroxy-1,4-dioxa-9-azadispiro[4.2.4.2]-tetradec-11-en-10-one, or M.29.4: 3-(4'-fluoro-2,4-dimethylbiphenyl-3-yl)-4-hydroxy-8-oxa-1-azaspiro[4.5]dec-3-en-2-one, or M.29.5: 1-[2-fluoro-4-methyl-5-[(2,2,2-trifluoroethyl)sulfinyl]phenyl]-3-(trifluoromethyl)-1H-1,2,4-triazole-5-amine, or actives on basis of *Bacillus firmus* (Votivo, 1-1582); or a compound selected from the group of M.29.6, wherein the compound is selected from M.29.6a) to M.29.6k):
M.29.6a) (E/Z)—N-[1-[(6-chloro-3-pyridyl)methyl]-2-pyridylidene]-2,2,2-tri-fluoro-acetamide; M.29.6b) (E/Z)—N-[1-[(6-chloro-5-fluoro-3-pyridyl)methyl]-2-pyridylidene]-2,2,2-trifluoro-acetamide; M.29.6c) (E/Z)-2,2,2-trifluoro-N-[1-[(6-fluoro-3-pyridyl)methyl]-2-pyridylidene]acetamide; M.29.6d) (E/Z)—N-[1-[(6-bromo-3-pyridyl)methyl]-2-pyridylidene]-2,2,2-tri-fluoro-acetamide; M.29.6e) (E/Z)—N-[1-[1-(6-chloro-3-pyridyl)ethyl]-2-pyridylidene]-2,2,2-tri-fluoro-acetamide; M.29.6f) (E/Z)—N-[1-[(6-chloro-3-pyridyl)methyl]-2-pyridylidene]-2,2-difluoro-acetamide; M.29.6g) (E/Z)-2-chloro-N-[1-[(6-chloro-3-pyridyl)methyl]-2-pyridylidene]-2,2-difluoro-acetamide; M.29.6h) (E/Z)—N-[1-[(2-chloropyrimidin-5-yl)methyl]-2-pyridylidene]-2,2,2-trifluoro-acetamide; M.29.6i) (E/Z)—N-[1-[(6-chloro-3-pyridyl)methyl]-2-pyridylidene]-2,2,3,3,3-pentafluoro-propanamide.); M.29.6j) N-[1-[(6-chloro-3-pyridyl)methyl]-2-pyridylidene]-2,2,2-trifluoro-thioacetamide; or M.29.6k) N-[1-[(6-chloro-3-pyridyl)methyl]-2-pyridylidene]-2,2,2-tri-fluoro-N'-isopropyl-acetamidine; or M.29.8: 8-chloro-N-[2-chloro-5-methoxyphenyl)sulfonyl]-6-trifluoromethyl)-imidazo[1,2-a]pyri-dine-2-carboxamide; or M.29.9.a): 4-[5-(3,5-dichlorophenyl)-5-(trifluoromethyl)-4H-isoxazol-3-yl]-2-methyl-N-(1-oxo-thietan-3-yl)benzamide; or M.29.9.b): 4-[5-(3,5-Dichlorophenyl)-5-trifluoromethyl-4,5-dihydroisoxazol-3-yl]-N-[(methoxyimino)methyl]-2-methylbenzamide; or M.29.10: 5-[3-[2,6-dichloro-4-(3,3-dichloroallyloxy)phenoxy]propoxy]-1H-pyrazole; or a compound selected from the group of M.29.11, wherein the compound is selected from M.29.11b) to M.29.11p): M.29.11.b) 3-(benzoylmethylamino)-N-[2-bromo-4-[1,2,2,3,3,3-hexa-fluoro-1-(trifluoromethyl)propyl]-6-(trifluoromethyl)phenyl]-2-fluoro-benzamide; M.29.11.c) 3-(benzoylmethylamino)-2-fluoro-N-[2-iodo-4-[1,2,2,2-tetrafluoro-1-(trifluoromethyl)ethyl]-6-(tri-fluoromethyl)phenyl]-benzamide; M.29.11.d) N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; M.29.11.e) N-[3-[[[2-bromo-4-[1,2,2,2-tetrafluoro-1-(trifluoromethyl)phenyl]amino]carbonyl]-2-fluorophenyl]-4-fluoro-N-methyl-benzamide; M.29.11.f) 4-fluoro-N-[2-fluoro-3-[[[2-iodo-4-[1,2,2,2-tetrafluoro-1-(trifluoromethyl)ethyl]-6-(trifluoromethyl)phenyl]amino]car-bonyl]phenyl]-N-methyl-benzamide; M.29.11.g) 3-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; M.29.11.h) 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; M.29.11.i) 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide; M.29.11.j) 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2- fluoro-benzamide; M.29.11.k) N-[5-[[2-chloro-6-cyano-4-[1,2,2,3,3,3-hexafluoro-1-(trifluoromethyl) propyl]phenyl]carbamoyl]-2-cyano-phenyl]-4-cyano-2-methyl-benzamide; M.29.11.l) N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide; M.29.11.m) N-[5-[[2-bromo-6-chloro-4-[1,2,2,3,3,3-hexafluoro-1-(trifluoromethyl)propyl]phenyl]carbamoyl]-2-cyano-phenyl]-4-cyano-2-methyl-benzamide; M.29.11.n) 4-cyano-N-[2-cyano-5-[[2,6-dichloro-4-[1,2,2,3,3,3-hexafluoro-1-(trifluoromethyl)propyl]phenyl]carbamoyl]phenyl]-2-methyl-benzamide; M.29.11.o) 4-cyano-N-[2-cyano-5-[[2,6-di-chloro-4-[1,2,2,2-tetrafluoro-1-(trifluoromethyl)ethyl]phenyl]carbamoyl]phenyl]-2-methyl-benzamide; M.29.11.p) N-[5-[[2-bromo-6-chloro-4-[1,2,2,2-tetrafluoro-1-(trifluoromethyl)ethyl] phenyl]carbamoyl]-2-cyano-phenyl]-4-cyano-2-methyl-benzamide; or a compound selected from the group of M.29.12, wherein the compound is selected from M.29.12a) to M.29.12m): M.29.12.a) 2-(1,3-Dioxan-2-yl)-6-[2-(3-pyridinyl)-5-thiazolyl]-pyridine; M.29.12.b) 2-[6-[2-(5-Fluoro-3-pyridinyl)-5-thiazolyl]-2-pyridinyl]-pyrimidine; M.29.12.c) 2-[6-[2-(3-Pyridinyl)-5-thiazolyl]-2-pyridinyl]-pyrimidine; M.29.12.d) N-Methylsulfonyl-6-[2-(3-pyridyl)thiazol-5-yl]pyridine-2-carboxamide; M.29.12.e) N-Methylsulfonyl-6-[2-(3-pyridyl)thiazol-5-yl]pyridine-2-carboxamide; M.29.12.f) N-Ethyl-N-[4-methyl-2-(3-pyridyl)thiazol-5-yl]-3-methyl-thio-propanamide; M.29.12.g) N-Methyl-N-[4-methyl-2-(3-pyridyl)thiazol-5-yl]-3-methylthio-propanamide; M.29.12.h) N,2-Dimethyl-N-[4-methyl-2-(3-pyridyl)thiazol-5-yl]-3-methylthio-propanamide; M.29.12.i) N-Ethyl-2-methyl-N-[4-methyl-2-(3-pyridyl)thiazol-5-yl]-3-methylthio-propanamide; M.29.12.j) N-[4-Chloro-2-(3-pyridyl)thiazol-5-yl]-N-ethyl-2-methyl-3-methylthio-propanamide; M.29.12.k) N-[4-Chloro-2-(3-pyridyl)thiazol-5-yl]-N,2-dimethyl-3-methylthio-propanamide; M.29.12.l) N-[4-Chloro-2-(3-pyridyl)thiazol-5-yl]-N-methyl-3-methylthio-propanamide; M.29.12.m) N-[4-Chloro-2-(3-pyridyl)thiazol-5-yl]-N-ethyl-3-methylthio-propanamide; or M.29.14a) 1-[(6-Chloro-3-pyridinyl)methyl]-1,2,3,5,6,7-hexahydro-5-methoxy-7-methyl-8-nitro-imidazo[1,2-a]pyridine; or M.29.14b) 1-[(6-Chloropyridin-3-yl)methyl]-7-methyl-8-nitro-1,2,3,5,6,7-hexahydroimidazo[1,2-a]pyridin-5-ol;

and 3) at least one fungicide III selected from the group consisting of:

A) Respiration inhibitors

Inhibitors of complex III at $Q_o$ site (e. g. strobilurins): azoxystrobin (A.1.1), coumethoxystrobin (A.1.2), coumoxystrobin (A.1.3), dimoxystrobin (A.1.4), enestroburin (A.1.5), fenaminstrobin (A.1.6), fenoxystrobin/flufenoxystrobin (A.1.7), fluoxastrobin (A.1.8), kresoxim-methyl (A.1.9), mandestrobin (A.1.10), metominostrobin (A.1.11), orysastrobin (A.1.12), picoxystrobin (A.1.13), pyraclostrobin (A.1.14), pyrametostrobin (A.1.15), pyraoxystrobin (A.1.16), trifloxystrobin (A.1.17), 2-(2-(3-(2,6-dichlorophenyl)-1-methyl-allylideneaminooxymethyl)-phenyl)-2-methoxy-imino-N-methyl-acetamide (A.1.18), pyribencarb (A.1.19), triclopyricarb/chlorodincarb (A.1.20), famoxadone (A.1.21), fenamidone (A.1.21), methyl-N-[2-[(1,4-dimethyl-5-phenyl-pyrazol-3-yl)ox-ylmethyl]phenyl]-N-methoxy-carbamate (A.1.22), 1-[3-chloro-2-[[1-(4-chlorophenyl)-1H-pyrazol-3-yl]oxymethyl] phenyl]-4-methyl-tetrazol-5-one (A.1.23), 1-[3-bromo-2-[[1-(4-chlorophenyl)pyrazol-3-yl] oxymethyl]phenyl]-4-methyl-tetrazol-5-one (A.1.24), 1-[2-[[1-(4-chlorophenyl)pyrazol-3-yl] oxymethyl]-3-methyl-phenyl]-4-methyl-tetrazol-5-one (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichloro-phenyl) pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]oxymethyl] phenyl]-4-methyl-tetrazol-5-one (A.1.29), 1-[3-cyclopropyl-2-[[2-methyl-4-(1-methylpyrazol-3-yl) phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyl-tetrazol-5-one (A.1.31), 1-methyl-4-[3-methyl-2-[[2-methyl-4-(1-methylpyrazol-3-yl) phenoxy]methyl]phenyl]tetrazol-5-one (A.1.32), 1-methyl-4-[3-methyl-2-[[1-[3-(trifluoromethyl) phenyl]-ethylideneamino]oxymethyl]phenyl]tetrazol-5-one (A.1.33), (Z,2E)-5-[1-(2,4-dichlorophenyl)pyrazol-3-yl]-oxy-2-methoxyimino-N,3-dimethyl-pent-3-enamide (A.1.34), (Z,2E)-5-[1-(4-chlorophenyl)pyrazol-3-yl]oxy-2-methoxyimino-N, 3-dimethyl-pent-3-enamide (A.1.35), (Z,2E)-5-[1-(4-chloro-2-fluoro-phenyl)pyrazol-3-yl]oxy-2-methoxyimino-N,3-dimethyl-pent-3-enamide (A.1.36), inhibitors of complex III at $Q_i$ site: cyazofamid (A.2.1), amisulbrom (A.2.2), [(3S,6S,7R,8R)-8-benzyl-3-[(3-acetoxy-4-methoxy-pyridine-2-carbonyl) amino]-6-methyl-4,9-dioxo-1,5-dioxonan-7-yl] 2-methylpropanoate (A.2.3), [(3S,6S,7R,8R)-8-benzyl-3-[[3-(acetoxymethoxy)-4-methoxy-pyridine-2-carbonyl]amino]-6-methyl-4,9-dioxo-,5-dioxonan-7-yl] 2-methylpropanoate (A.2.4), [(3S,6S,7R,8R)-8-benzyl-3-[(3-isobutoxycarbonyloxy-4-methoxy-pyridine-2-car-bonyl)amino]-6-methyl-4,9-dioxo-1, 5-dioxonan-7-yl] 2-methylpropanoate (A.2.5), [(3S, 6S,7R,8R)-8-benzyl-3-[[3-(1,3-benzodioxol-5-ylmethoxy)-4-methoxy-pyridine-2-car-bonyl] amino]-6-methyl-4,9-dioxo-1,5-dioxonan-7-yl] 2-methylpropanoate (A.2.6); (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate (A.2.7), (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate (A.2.8);

inhibitors of complex II (e. g. carboxamides): benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.14), penthiopyrad (A.3.15), sedaxane (A.3.16), tecloftalam (A.3.17), thifluzamide (A.3.18), N-(4'-trifluoromethylthiobiphenyl-2-yl)-3-difluoromethyl-1-methyl-1H-pyrazole-4-carboxamide (A.3.19), N-(2-(1,3,3- trimethyl-butyl)-phenyl)-1,3-di-methyl-5-fluoro-1H-pyrazole-4-carboxamide (A.3.20), 3-(difluoromethyl)-1-methyl-N-(1,1,3-tri-methylindan-4-yl)pyrazole-4-carboxamide (A.3.21), 3-(trifluoromethyl)-1-methyl-N-(1,1,3-trimethylindan-4-yl)pyrazole-4-carboxamide (A.3.22), 1,3-dimethyl-N-(1,1,3-trimethylindan-4-yl)pyrazole-4-carboxamide (A.3.23), 3-(trifluoromethyl)-1,5-dimethyl-N-(1,1,3-trimethylindan-4-yl)pyrazole-4-carboxamide (A.3.24), 1,3,5-trimethyl-N-(1,1,3-trimethylindan-4-yl)pyrazole-4-carboxamide (A.3.25), N-(7-fluoro-1,1,3-trimethyl-indan-4-yl)-1,3-dimethyl-pyrazole-4-carboxamide (A.3.26), N-[2-(2,4-dichlorophenyl)-2-methoxy-1-methy-ethyl]-3-(difluoromethyl)-1-methyl-pyrazole-4-carboxamide (A.3.27);

other respiration inhibitors (e. g. complex I, uncouplers): diflumetorim (A.4.1), (5,8-difluoro-quinazolin-4-yl)-{2-[²-fluoro-4-(4-trifluoromethylpyridin-2-yloxy)-phenyl]-ethyl}-amine (A.4.2); nitrophenyl derivates: binapacryl (A.4.3), dinobuton (A.4.4), dinocap (A.4.5), fluazinam (A.4.6); ferimzone (A.4.7); organometal compounds: fentin salts, such as fentin-acetate (A.4.8), fentin chloride (A.4.9) or fentin hydroxide (A.4.10); ametoctradin (A.4.11); and silthiofam (A.4.12);

B) Sterol biosynthesis inhibitors (SBI fungicides)
C14 demethylase inhibitors (DMI fungicides): triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[rel-(2S;3R)-3-(2-chlorophenyl)-2-(2,4-difluorophenyl)-oxiranylmethyl]-5-thiocyanato-1H-[1,2,4]triazolo (B.1.31), 2-[rel-(2S;3R)-3-(2-chlorophenyl)-2-(2,4-difluorophenyl)-oxiranylmethyl]-2H-[1,2,4]triazole-3-thiol (B.1.32); imidazoles: imazalil (B.1.42), pefurazoate (B.1.43), prochloraz (B.1.44), triflumizol (B.1.45); pyrimidines, pyridines and piperazines: fenarimol (B.1.46), nuarimol (B.1.47), pyrifenox (B.1.48), triforine (B.1.49), [3-(4-chloro-2-fluoro-phenyl)-5-(2,4-difluorophenyl)isoxazol-4-yl]-(3-pyridyl)methanol (B.1.50);
Delta14-reductase inhibitors: aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), spiroxamine (8.2.8);
Inhibitors of 3-keto reductase: fenhexamid (B.3.1);

C) Nucleic acid synthesis inhibitors
phenylamides or acyl amino acid fungicides: benalaxyl (C.1.1), benalaxyl-M (C.1.2), kiralaxyl (C.1.3), metalaxyl (C.1.4), metalaxyl-M (mefenoxam, C.1.5), ofurace (C.1.6), oxadixyl (C.1.7);
others: hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrimidin-4-amine (C.2.6), 5-fluoro-2-(4-fluorophenylmethoxy)pyrimidin-4-amine (C.2.7);

D) Inhibitors of cell division and cytoskeleton
tubulin inhibitors, such as benzimidazoles, thiophanates: benomyl (D1.1), carbendazim (D1.2), fuberidazole (D1.3), thiabendazole (D1.4), thiophanate-methyl (D1.5); triazolopyrimidines: 5-chloro-7-(4-methylpiperidin-1-yl)-6-(2,4,6-trifluorophenyl)-[1,2,4]triazolo[1,5-a]pyrimidine (D1.6);
other cell division inhibitors: diethofencarb (D2.1), ethaboxam (D2.2), pencycuron (D2.3), fluopicolide (D2.4), zoxamide (D2.5), metrafenone (D2.6), pyriofenone (D2.7);

E) Inhibitors of amino acid and protein synthesis
methionine synthesis inhibitors (anilino-pyrimidines): cyprodinil (E.1.1), mepanipyrim (E.1.2), pyrimethanil (E.1.3);
protein synthesis inhibitors: blasticidin-S(E.2.1), kasugamycin (E.2.2), kasugamycin hydro-chloride-hydrate (E.2.3), mildiomycin (E.2.4), streptomycin (E.2.5), oxytetracyclin (E.2.6), polyoxine (E.2.7), validamycin A (E.2.8);

F) Signal transduction inhibitors
MAP/histidine kinase inhibitors: fluoroimid (F.1.1), iprodione (F.1.2), procymidone (F.1.3), vinclozolin (F.1.4), fenpiclonil (F.1.5), fludioxonil (F.1.6); G protein inhibitors: quinoxyfen (F.2.1);

G) Lipid and membrane synthesis inhibitors
Phospholipid biosynthesis inhibitors: edifenphos (G.1.1), iprobenfos (G.1.2), pyrazophos (G.1.3), isoprothiolane (G.1.4);
lipid peroxidation: dicloran (G.2.1), quintozene (G.2.2), tecnazene (G.2.3), tolclofos-methyl (G.2.4), biphenyl (G.2.5), chloroneb (G.2.6), etridiazole (G.2.7);
phospholipid biosynthesis and cell wall deposition: dimethomorph (G.3.1), flumorph (G.3.2), mandipropamid (G.3.3), pyrimorph (G.3.4), benthiavalicarb (G.3.5), iprovalicarb (G.3.6), valifenalate (G.3.7) and N-(1-(1-(4-cyano-phenyl)ethanesulfonyl)-but-2-yl) carbamic acid-(4-fluoro-phenyl) ester (G.3.8);
compounds affecting cell membrane permeability and fatty acides: propamocarb (G.4.1);
fatty acid amide hydrolase inhibitors: oxathiapiprolin (G.5.1), 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate (G.5.3);

H) Inhibitors with Multi Site Action
inorganic active substances: Bordeaux mixture (H.1.1), copper acetate (H.1.2), copper hydroxide (H.1.3), copper oxychloride (H.1.4), basic copper sulfate (H.1.5), sulfur (H.1.6);
thio- and dithiocarbamates: ferbam (H.2.1), mancozeb (H.2.2), maneb (H.2.3), metam (H.2.4), metiram (H.2.5), propineb (H.2.6), thiram (H.2.7), zineb (H.2.8), ziram (H.2.9);
organochlorine compounds (e. g. phthalimides, sulfamides, chloronitriles): anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), tolylfluanid (H.3.11), N-(4-chloro-2-nitro-phenyl)-N-ethyl-4-methyl-benzenesulfonamide (H.3.12);
guanidines and others: guanidine (H.4.1), dodine (H.4.2), dodine free base (H.4.3), guazatine (H.4.4), guazatine-acetate (H.4.5), iminoctadine (H.4.6), iminoctadine-triacetate (H.4.7), iminoctadine-tris(albesilate) (H.4.8), dithianon (H.4.9), 2,6-dimethyl-1H,5H-[1,4]dithiino[2,3-c:5,6-c']dipyrrole-1,3,5,7(2H,6H)-tetraone (H.4.10);

I) Cell wall synthesis inhibitors
inhibitors of glucan synthesis: validamycin (1.1.1), polyoxin B (1.1.2);
melanin synthesis inhibitors: pyroquilon (1.2.1), tricyclazole (1.2.2), carpropamid (1.2.3), dicyclomet (1.2.4), fenoxanil (1.2.5);

J) Plant defence inducers
acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9);

K) Unknown mode of action
bronopol (K.1.1), chinomethionat (K.1.2), cyflufenamid (K.1.3), cymoxanil (K.1.4), dazomet (K.1.5), debacarb (K.1.6), diclomezine (K.1.7), difenzoquat (K.1.8), difenzoquat-methylsulfate (K.1.9), diphenylamin (K.1.10), fenpyrazamine (K.1.11), flumetover (K.1.12), flusulfamide (K.1.13), flutianil (K.1.14), methasulfocarb (K.1.15), nitrapyrin (K.1.16), nitrothal-isopropyl (K.1.18), oxathiapiprolin (K.1.19), tolprocarb (K.1.20), oxin-copper (K.1.21), proquinazid (K.1.22), tebufloquin (K.1.23), tecloftalam (K.1.24), triazoxide (K.1.25), 2-butoxy-6-iodo-3-propylchromen-4-one (K.1.26), 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone (K.1.27), 2-[3,5-bis(difluoro-methyl)-1H-pyrazol-1-yl]-1-[4-(4-{5-[2-fluoro-6-(prop-2-yn-1-yloxy)phenyl]-4,5-dihydro-1,2-oxa-zol-3-yl}-1,3-thiazol-2-yl)piperidin-1-yl]ethanone (K.1.28), 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone (K.1.29), N-(cyclopropylmethoxyimino-(6-difluoro-methoxy-2,3-di-fluoro-phenyl)-methyl)-2-phenyl acetamide (K.1.30), N'-(4-(4-chloro-3-trifluoromethyl-phenoxy)-2,5-dimethyl-phenyl)-N-ethyl-N-methyl formamidine (K.1.31), N'-(4-(4-fluoro-3-trifluoromethyl-phenoxy)-2,5-dimethyl-phenyl)-N-ethyl-N-methyl formamidine (K.1.32), N'-(2-methyl-5-trifluoromethyl-4-(3-trimethylsilanyl-propoxy)-phenyl)-N-ethyl-N-methyl formamidine (K.1.33), N'-(5-difluoromethyl-2-methyl-4-(3-trimethylsilanyl-propoxy)-phenyl)-N-ethyl-N-methyl formamidine (K.1.34), methoxy-acetic acid 6-tert-butyl-8-fluoro-2,3-dimethyl-quinolin-4-yl ester (K.1.35), 3-[5-(4-methylphenyl)-2,3-dimethyl-isoxazolidin-3-yl]-pyridine (K.1.36), 3-[5-(4-chloro-phenyl)-2,3-dimethyl-isoxazolidin-3-yl]-pyridine (pyrisoxazole) (K.1.37), N-(6-methoxy-pyridin-3-yl) cyclopropanecarboxylic acid amide (K.1.38), 5-chloro-1-(4,6-dimethoxy-pyrimidin-2-yl)-2-methyl-1H-benzoimidazole (K.1.39), 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate (K.1.40), picarbutrazox (K.1.41), pentyl N-[6-[[(Z)-[(1-methyltetrazol-5-yl)-phenyl-methylene]amino]oxymethyl]-2-pyridyl]carbamate (K.1.42), 2-[2-[(7,8-difluoro-2-methyl-3-quinolyl)oxy]-6-fluoro-phenyl]propan-2-ol (K.1.43), 2-[2-fluoro-6-[(8-fluoro-2-methyl-3-quinolyl)oxy] phen-yl]propan-2-ol (K.1.44), 3-(5-fluoro-3,3,4,4-tetramethyl-3,4-dihydroisoquinolin-1-yl)quinoline (K.1.45), 3-(4,4-difluoro-3,3-dimethyl-3,4-dihydroisoquinolin-1-yl)quinoline (K.1.46), 3-(4,4,5-trifluoro-3,3-dimethyl-3,4-dihydroisoquinolin-1-yl) quinoline (K.1.47), 9-fluoro-2,2-dime-thyl-5-(3-quinolyl)-3H-1,4-benzoxazepine (K.1.48), wherein component 1) and component 2) are present in a weight ratio from 1000:1 to 1:1000, component 1) and component 3) are present in a weight ratio from 1000:1 to 1:1000, and component 2) and 3) are present in a weight ratio from 1000:1 to 1:1000.

It has been found that simultaneous (that is joint or separate) application of the three components 1), 2), and 3) of the pesticidal mixture PM or successive application (that is immediately one after another and thereby creating the mixture "in situ" on the desired location, as e.g. the plant) of the three components 1), 2), and 3) of the pesticidal mixture PM of the invention allows enhanced control of pests and fungi compared to the control rates that are possible with the individual compounds. Therefore, the term "pesticidal mixture PM" as used herein is intended to include also combinations.

In another aspect, the present invention relates to a seed treatment composition comprising the pesticidal mixture PM and at least one auxiliary. Furthermore, the present invention relates to seeds comprising the pesticidal mixture PM or the above defined seed treatment composition thereof in an amount of from 0.01 g to 10000 g per 100 kg of seeds.

In yet another aspect, the present invention relates to a method for controlling invertebrate pests and/or phytopathogenic harmful fungi on a plant selected from wheat, maize, barley, oat, rye, rice, soybean, cotton, sugarbeet, rapeseed, and potato comprising contacting the plant or the plant propagation material thereof; the pest or its food supply, habitat or breeding ground; and/or the fungi or their habitat, with an effective amount of the pesticidal mixture PM of the invention or the seed treatment composition thereof.

In a further aspect, the present invention relates to the following pesticidal mixtures:

Pesticidal mixture A, which comprises as active components
A1) at least one active compound of formula I as defined above; and
A2) tioxazafen;
wherein component A1) and component A2) are present in a total weight ratio of from 1000:1 to 1:1000.

Pesticidal mixture B, which comprises as active components
B1) at least one active compound of formula I as defined above; and
B2) tetraniliprole;
wherein component B1) and component B2) are present in a total weight ratio of from 1000:1 to 1:1000.

Pesticidal mixture C, which comprises as active components
C1) at least one active compound of formula I as defined above; and
C2) broflanilide;
wherein component C1) and component C2) are present in a total weight ratio of from 1000:1 to 1:1000.

Pesticidal mixture D, which comprises as active components

D1) at least one active compound of formula I as defined above; and

D2) cyhalodiamide; M29 wherein component D1) and component D2) are present in a total weight ratio of from 1000:1 to 1:1000.

Pesticidal mixture E, which comprises as active components

E1) at least one active compound of formula I as defined above; and

E2) 8-chloro-N-[2-chloro-5-methoxyphenyl)sulfonyl]-6-trifluoromethyl)-imidazo[1,2-a]pyridine-2-carboxamide (common name: fluazaindolizine); M29.8 wherein component E1) and component E2) are present in a total weight ratio of from 1000:1 to 1:1000.

Pesticidal mixture F, which comprises as active components

F1) at least one active compound of formula I as defined above; and

F2) 4-[5-(3,5-Dichlorophenyl)-5-trifluoromethyl-4,5-dihydroisoxazol-3-yl]-N-[(methoxy-imino)methyl]-2-methylbenzamide (common name: fluxametamide); M29.9b wherein component F1) and component F2) are present in a total weight ratio of from 1000:1 to 1:1000.

DETAILED DESCRIPTION

It has been found that simultaneous (that is joint or separate), application of components A1) and A2) of the pesticidal mixture A or successive application (that is immediately one after another and thereby creating the mixture "in situ" on the desired location, as e.g. the plant) of components A1) and A2) of the pesticidal mixture A of the invention allows enhanced control of pests compared to the control rates that are possible with the individual compounds. Therefore, the term "pesticidal mixture A" as used herein is intended to include also combinations. In a preferred embodiment, the pesticidal mixture A is a binary mixture.

It has also been found that simultaneous (that is joint or separate) application of components B1) and B2) of the pesticidal mixture B or successive application (that is immediately one after another and thereby creating the mixture "in situ" on the desired location, as e.g. the plant) of components B1) and B2) of the pesticidal mixture B of the invention allows enhanced control of pests compared to the control rates that are possible with the individual compounds. Therefore, the term "pesticidal mixture B" as used herein is intended to include also combinations. In a preferred embodiment, the pesticidal mixture B is a binary mixture.

It has also been found that simultaneous (that is joint or separate) application of components C1) and C2) of the pesticidal mixture C or successive application (that is immediately one after another and thereby creating the mixture "in situ" on the desired location, as e.g. the plant) of components C1) and C2) of the pesticidal mixture C of the invention allows enhanced control of pests compared to the control rates that are possible with the individual compounds. Therefore, the term "pesticidal mixture C" as used herein is intended to include also combinations. In a preferred embodiment, the pesticidal mixture C is a binary mixture.

It has also been found that simultaneous (that is joint or separate) application of components D1) and D2) of the pesticidal mixture D or successive application (that is immediately one after another and thereby creating the mixture "in situ" on the desired location, as e.g. the plant) of components D1) and D2) of the pesticidal mixture D of the invention allows enhanced control of pests compared to the control rates that are possible with the individual compounds. Therefore, the term "pesticidal mixture D" as used herein is intended to include also combinations. In a preferred embodiment, the pesticidal mixture D is a binary mixture.

It has also been found that simultaneous (that is joint or separate) application of components E1) and E2) of the pesticidal mixture E or successive application (that is immediately one after another and thereby creating the mixture "in situ" on the desired location, as e.g. the plant) of components E1) and E2) of the pesticidal mixture E of the invention allows enhanced control of pests compared to the control rates that are possible with the individual compounds. Therefore, the term "pesticidal mixture E" as used herein is intended to include also combinations. In a preferred embodiment, the pesticidal mixture E is a binary mixture.

It has also been found that simultaneous (that is joint or separate) application of components F1) and F2) of the pesticidal mixture F or successive application (that is immediately one after another and thereby creating the mixture "in situ" on the desired location, as e.g. the plant) of components F1) and F2) of the pesticidal mixture F of the invention allows enhanced control of pests compared to the control rates that are possible with the individual compounds. Therefore, the term "pesticidal mixture F" as used herein is intended to include also combinations. In a preferred embodiment, the pesticidal mixture F is a binary mixture.

The present invention also relates to the following seed treatment compositions:

a) A seed treatment composition comprising the pesticidal mixture A and at least one auxiliary.

b) A seed treatment composition comprising the pesticidal mixture B and at least one auxiliary.

c) A seed treatment composition comprising the pesticidal mixture C and at least one auxiliary.

d) A seed treatment composition comprising the pesticidal mixture D and at least one auxiliary.

e) A seed treatment composition comprising the pesticidal mixture E and at least one auxiliary.

f) A seed treatment composition comprising the pesticidal mixture F and at least one auxiliary.

Furthermore, the present invention relates to the following seeds:

a) Seeds comprising the pesticidal mixture A or the above defined seed treatment composition thereof in an amount of from 0.01 g to 10000 g per 100 kg of seeds.

b) Seeds comprising the pesticidal mixture B or the above defined seed treatment composition thereof in an amount of from 0.01 g to 10000 g per 100 kg of seeds, or c) Seeds comprising the pesticidal mixture C or the above defined seed treatment composition thereof in an amount of from 0.01 g to 10000 g per 100 kg of seeds.

d) Seeds comprising the pesticidal mixture D or the above defined seed treatment composition thereof in an amount of from 0.01 g to 10000 g per 100 kg of seeds.

e) Seeds comprising the pesticidal mixture E or the above defined seed treatment composition thereof in an amount of from 0.01 g to 10000 g per 100 kg of seeds.

f) Seeds comprising the pesticidal mixture F or the above defined seed treatment composition thereof in an amount of from 0.01 g to 10000 g per 100 kg of seeds.

Furthermore, the present invention relates to the following methods.

a) A method for controlling invertebrate pests on a plant comprising contacting the plant or the plant propagation material; the pest or its food supply, habitat or breeding ground; with an effective amount of the pesticidal mixture A or the above defined seed treatment composition thereof.

b) A method for controlling invertebrate pests on a plant comprising contacting the plant or the plant propagation material; the pest or its food supply, habitat or breeding ground; and/their habitat, with an effective amount of the pesticidal mixture B or the above defined seed treatment composition thereof.

c) A method for controlling invertebrate pests and on a plant comprising contacting the plant or the plant propagation material; the pest or its food supply, habitat or breeding ground; and/or their habitat, with an effective amount of the pesticidal mixture C or the above defined seed treatment composition thereof.

d) A method for controlling invertebrate pests and/on a plant comprising contacting the plant or the plant propagation material; the pest or its food supply, habitat or breeding ground; and/or their habitat, with an effective amount of the pesticidal mixture D or the above defined seed treatment composition thereof.

e) A method for controlling invertebrate pests and on a plant comprising contacting the plant or the plant propagation material; the pest or its food supply, habitat or breeding ground; and/i or their habitat, with an effective amount of the pesticidal mixture E or the above defined seed treatment composition thereof.

f) A method for controlling invertebrate pests and on a plant comprising contacting the plant or the plant propagation material; the pest or its food supply, habitat or breeding ground; and or their habitat, with an effective amount of the pesticidal mixture F or the above defined seed treatment composition thereof.

It has been found that the above objects can be achieved by the pesticidal mixtures as defined above and hereinafter, and the seed treatment compositions and uses thereof, as well as by seeds comprising the pesticidal mixtures or the seed treatment compositions thereof, and by methods of applying the pesticidal mixtures.

The components, which are present in the pesticidal mixtures of the invention, are described in further detail hereinafter.

The definitions regarding the compound of formula I apply to the pesticidal mixture PM of the invention as well as for the pesticidal mixtures A, B, C, D, E, and F.

The term "compound(s) of formula I" or "compound(s) according to the invention" comprises the compound(s) as defined herein as well as a stereoisomer, salt, tautomer or N-oxide thereof. The term "compound(s) of the present invention" is to be understood as equivalent to the term "compound(s) according to the invention", therefore also comprising a stereoisomer, salt, tautomer or N-oxide thereof.

The term "stereoisomers" encompasses both optical isomers, such as enantiomers or diastereomers, the latter existing due to more than one center of chirality in the molecule, as well as geometrical isomers (cis/trans isomers).

Depending on the substitution pattern, the compounds of formula I may have one or more centers of chirality, in which case they are present as mixtures of enantiomers or diastereomers. One center of chirality is the carbon atom carrying radicals $R^3$, $R^4$ and $R^5$. The invention provides both the pure enantiomers or diastereomers and their mixtures and the use according to the invention of the pure enantiomers or diastereomers of the compound I or its mixtures. Suitable compounds of the formula I also include all possible geometrical stereoisomers (cis/trans isomers) and mixtures thereof.

The term "N-oxide" relates to a form of compounds I in which at least one nitrogen atom is present in oxidized form (as NO).

The compounds of the formula I may be amorphous or may exist in one ore more different crystalline states (polymorphs) which may have a different macroscopic properties such as stability or show different biological properties such as activities. The present invention includes both amorphous and crystalline compounds of the formula I, mixtures of different crystalline states of the respective compound I, as well as amorphous or crystalline salts thereof.

Salts of the compounds of the formula I are preferably agriculturally acceptable salts. They can be formed in a customary method, e.g. by reacting the compound with an acid of the anion in question if the compound of formula I has a basic functionality or by reacting an acidic compound of formula I with a suitable base.

Suitable agriculturally acceptable salts are especially the salts of those cations or the acid addition salts of those acids whose cations and anions, respectively, do not have any adverse effect on the action of the compounds according to the present invention.

Suitable cations are in particular the ions of the alkali metals, preferably lithium, sodium and potassium, of the alkaline earth metals, preferably calcium, magnesium and barium, and of the transition metals, preferably manganese, copper, zinc and iron, and also ammonium ($NH_4^+$) and substituted ammonium in which one to four of the hydrogen atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or benzyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxyethoxy)ethylammonium, bis(2-hydroxyethyl)ammonium, benzyltrimethylammonium and benzl-triethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium.

Anions of useful acid addition salts are primarily chloride, bromide, fluoride, hydrogen sulfate, sulfate, dihydrogen phosphate, hydrogen phosphate, phosphate, nitrate, hydrogen carbonate, carbonate, hexafluorosilicate, hexafluorophosphate, benzoate, and the anions of $C_1$-$C_4$-alkanoic acids, preferably formate, acetate, propionate and butyrate. They can be formed by reacting a compound of formulae I with an acid of the corresponding anion, preferably of hydrochloric acid, hydrobromic acid, sulfuric acid, phosphoric acid or nitric acid.

The organic moieties mentioned in the above definitions of the variables are—like the term halogen—collective terms for individual listings of the individual group members. The prefix $C_n$-$C_m$ indicates in each case the possible number of carbon atoms in the group.

The preparation of the compounds of formula I is described in WO2010/034737, WO2012/084670, WO2012/143317, and WO2015/055497.

The insecticides II as listed above under component 2) of the pesticidal mixture PM as groups M.1 to M.29, which are described by common names, are commercially available and may be found in The Pesticide Manual, 16th Edition, C. MacBean, British Crop Protection Council (2013) among other publications. The online Pesticide Manual is updated regularly and is accessible through http://bcpcdata.com/pesticide-manual.html. Another online data base for pesticides providing the ISO common names is http://www.alanwood.net/pesticides.

The M.4 neonicotinoid cycloxaprid is known from WO2010/069266 and WO2011/069456, the neonicotinoid M.4A.2, also named as guadipyr, is known from WO2013/003977, and the neonicotinoid M.4A.3 (approved as paichongding in China) is known from WO2007/101369. The metaflumizone analogue M.22B.1 is described in CN10171577 and the analogue M.22B.2 in CN102126994. The phthalamides M.28.1 and M.28.2 are known from WO2007/101540. The anthranilamide M.28.3 is described in WO2005/077934. The hydrazide M.28.4 is described in WO2007/043677. The anthranilamide M.28.5i) is described in WO2011/085575, M.28.5j) in WO2008/134969, M.28.5k) in US2011/046186 and M.28.5l) in WO2012/034403. The diamides M.28.6 and M.28.7 can be found in CN102613183. The spiroketal-substituted cyclic ketoenol M.29.3 is known from WO2006/089633 and the biphenyl-substituted spirocyclic ketoenol M.29.4 from WO2008/067911. The triazoylphenylsulfide M.29.5 is described in WO2006/043635, and biological control agents on the basis of *Bacillus firmus* are described in WO2009/124707. The compounds M.29.6a) to M.29.6i) listed under M.29.6 are described in WO2012/029672, and M.29.6j) and M.29.6k) in WO2013/129688. The nematicide M.29.8 is known from WO2013/055584. The isoxazoline M.29.9.a) is described in WO2013/050317. The isoxazoline M.29.9.b) is described in WO2014/126208. The pyridalyl-type analogue M.29.10 is known from WO2010/060379. The carboxamides broflanilide and M.29.11.b) to M.29.11.h) are described in WO2010/018714, and the carboxamides M.29.11i) to M.29.11.p) in WO2010/127926. The pyridylthiazoles M.29.12.a) to M.29.12.c) are known from WO2010/006713, M.29.12.d) and M.29.12.e) are known from WO2012/000896, and M.29.12.f) to M.29.12.m) from WO2010/129497. The com-pounds M.29.14a) and M.29.14b) are known from WO2007/101369.

The fungicides III as listed above under component 3) of the pesticidal mixture PM as groups A) to K), which are described by common names, are commercially available and may be found in the database http://www.alanwood.net/pesticides.

The fungicides described by IUPAC nomenclature, their preparation and their pesticidal activity is also known (cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 11/028657, WO2012/168188, WO 2007/006670, WO 2011/77514; WO13/047749, WO 10/069882, WO 13/047441, WO 03/16303, WO 09/90181, WO 13/127704, WO 13/024009, WO 13/024010 and WO 13/047441, WO 13/162072, WO 13/092224, WO 11/135833).

The mixing partners of the pesticidal mixture A, B, C, D, E, and F of the present invention are commercially available and may be found in The Pesticide Manual, 16th Edition, C. MacBean, British Crop Protection Council (2013), or in the online version thereof http://bcpcdata.com/pesticide-manual.html, or in the database http://www.alanwood.net/pesticides. Furthermore, the following references are cited in connection with the mixing partners: The mixing partner tioxazafen of the pesticidal mixture A of the present invention is described in WO2009/023721. The mixing partner tetraniliprole of the pesticidal mixture B of the present invention is described in WO2007/144100 and WO2010/069502. The mixing partner broflanilide of the pesticidal mixture C of the present invention is described in WO2010/018714. The mixing partner cyhalodiamide of the pesticidal mixture D of the present invention is described in WO2012/034472.

The following preferred embodiments of the compounds of formula I apply to the pesticidal mixture PM as well as to the pesticidal mixtures A, B, C, D, E, or F of the invention.

The remarks made as to preferred embodiments of the variables (substituents) of the com-pounds of formula I are to be understood as preferred on their own as well as preferably in combination with each other, as well as in combination with stereoisomers, tautomers, N-oxides or salts of the compounds of formula I, and in combination with the preferred embodiments of the insecticides II and fungicides Ill of the pesticidal mixtures PM as defined herein, and in combination with the uses of the pesticidal mixtures PM as defined herein, the seed treatment compositions of the pesticidal mixtures PM as defined herein, the seeds comprising the pesticidal mixtures PM or the seed treatment compositions thereof as defined herein, and the methods of applying the pesticidal mixtures PM or the seed treatment compositions thereof as defined herein.

Furthermore, the remarks made as to preferred embodiments of the variables (substituents) of the compounds of formula I are to be understood as preferred on their own as well as preferably in combination with each other, as well as in combination with stereoisomers, tautomers, N-oxides or salts of the compounds of formula I, and in combination with the uses of the pesticidal mixtures A, B, C, D, E, or F as defined herein, the seed treatment compositions of the pesticidal mixtures A, B, C, D, E, or F as defined herein, the seeds comprising the pesticidal mixtures A, B, C, D, E, or F or the seed treatment compositions thereof as defined herein, and the methods of applying the pesticidal mixtures A, B, C, D, E, or F or the seed treatment compositions thereof as defined herein.

The preferred embodiments of the variables of the compounds of formula I are defined hereinafter.

In one embodiment, $R^1$ is H, $CH_3$, $C_2H_5$, or $CH_2OCH_3$, preferably $CH_3$, or $C_2H_5$.

In one embodiment, $R^2$ is $CH_3$.

In one embodiment, $R^3$ is $C_1$-$C_6$-alkyl, $C_1$-$C_6$-haloalkyl, $C_3$-$C_6$-cycloalkyl, wherein the C-atoms may be unsubstituted, or partially or fully substituted by halogen, or CN.

In a preferred embodiment, $R^3$ is $CH_3$, $C_2H_5$, $CH(CH_3)_2$, $CH_2CH_2CH_3$, $CF_3$, $CHFCH_3$, cyclopropyl, wherein the ring is substituted by halogen, or CN.

In a further preferred embodiment, $R^3$ is $CH_3$, $CH(CH_3)_2$, $CF_3$, $CHFCH_3$, 1-CN-c-$C_3H_4$.

In one embodiment, $R^4$ is $C_1$-$C_4$-alkyl, preferably $CH_3$.

In another embodiment $R^3$ and $R^4$ together form $C_5$-$C_6$-cycloalkyl, wherein the C-atoms may be unsubstituted, or partially or fully substituted by halogen, or CN.

In one embodiment, $R^5$ is H.

In another embodiment, $R^5$ is H, and $R^4$ is $CH_3$.

In a further embodiment, $R^1$ is $CH_3$ or $C_2H_5$, $R^2$ is $CH_3$, $R^5$ is H, and $R^4$ is $CH_3$, and $R^3$ is selected from $CH_3$, $CH(CH_3)_2$, $CF_3$, $CHFCH_3$, and 1-CN-c-$C_3H_4$.

In one embodiment, the compound of formula I is a compound of formula IA as depicted below, wherein $R^2$ is $CH_3$ and $R^5$ is H.

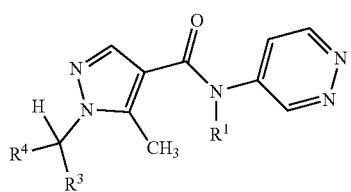

IA

For the compounds of formula IA, it is particularly preferred that $R^1$ is H, $CH_3$, $C_2H_5$, or $CH_2OCH_3$.

Furthermore, it is preferred for the compounds of formula IA that $R^3$ is $CH_3$, $C_2H_5$, $CH(CH_3)_2$, $CH_2CH_2CH_3$, $CF_3$, $CHFCH_3$, cyclopropyl, wherein the ring is substituted by halogen, or CN, and that $R^4$ is $C_1$-$C_4$-alkyl, or that $R^3$ and $R^4$ together form $C_5$-$C_6$-cycloalkyl, which is unsubstituted, or partially or fully substituted by halogen, or CN.

Particularly preferred compounds of formula I are compounds of formula IA, wherein the variables $R^1$, $R^3$, and $R^4$ correspond to one row of table I below. Said compounds are referred to as compounds I-1 to I-18 in accordance with each row of table I.

TABLE I

| No | $R^1$ | $R^3$ | $R^4$ |
| --- | --- | --- | --- |
| I-1 | $CH_3$ | $CH_3$ | $CH_3$ |
| I-2 | $CH_3$ | $CF_3$ | $CH_3$ |
| I-3 | $CH_3$ | $CH(CH_3)_2$ | $CH_3$ |
| I-4 | $CH_3$ | 1-CN—c-$C_3H_4$ | $CH_3$ |
| I-5 | $CH_3$ | $CHFCH_3$ | $CH_3$ |
| I-6 | $CH_3$ | $CH_2CH_2CF_2CH_2CH_2$ | |
| I-7 | $CH_2CH_3$ | $CH_3$ | $CH_3$ |
| I-8 | $CH_2CH_3$ | $CF_3$ | $CH_3$ |
| I-9 | $CH_2CH_3$ | $CH(CH_3)_2$ | $CH_3$ |
| I-10 | $CH_2CH_3$ | 1-CN—c-$C_3H_4$ | $CH_3$ |
| I-11 | $CH_2CH_3$ | $CHFCH_3$ | $CH_3$ |
| I-12 | $CH_2CH_3$ | $CH_2CH_2CF_2CH_2CH_2$ | |
| I-13 | $CH_2OCH_3$ | $CH_3$ | $CH_3$ |
| I-14 | $CH_2OCH_3$ | $CF_3$ | $CH_3$ |
| I-15 | $CH_2OCH_3$ | $CH(CH_3)_2$ | $CH_3$ |
| I-16 | $CH_2OCH_3$ | 1-CN—c-$C_3H_4$ | $CH_3$ |
| I-17 | $CH_2OCH_3$ | $CHFCH_3$ | $CH_3$ |
| I-18 | $CH_2OCH_3$ | $CH_2CH_2CF_2CH_2CH_2$ | |

A preferred embodiment of the invention are pesticidal mixtures wherein component 1) is the compound of formula IA, wherein $R^1$ is $CH_3$, $R^3$ is $CH(CH_3)_2$, and $R^4$ is $CH_3$ (compound I-3).

A preferred embodiment of the invention are pesticidal mixtures wherein component 1) is the compound of formula IA, wherein $R^1$ is $C_2H_5$, $R^3$ is $CH(CH_3)_2$, and $R^4$ is $CH_3$ (compound I-9).

Another preferred embodiment of the invention are pesticidal mixtures wherein component 1) is the compound of formula IA, wherein $R^1$ is $C_2H_5$, $R^3$ is 1-CN-c-$C_3H_4$, and $R^4$ is $CH_3$ (compound I-10).

With regard to the compounds I-2, I-3, I-4, I-5, I-8, I-9, I-10, I-11, I-14, I-15, I-16, I-17, it is to be understood, as explained above, that the compounds may be present in two enantiomeric forms, which are all understood to be encompassed by the present invention, either in isolated form or as a mixture.

In addition to the above defined component 1), the pesticidal mixture PM of the invention comprises a component 2), which is at least one insecticide II selected from the groups M.1 to M.29 as defined above, and a component 3), which is at least one fungicide III selected from the groups A) to K) as defined above. Preferred insecticides II and fungicides III as components 2) and 3) of the pesticidal mixtures PM, respectively, are defined hereinafter.

The preferred embodiments regarding components 2) and 3) are to be understood as preferred on their own as well as preferably in combination with each other, and in combination with the preferred embodiments of the compounds of formula I, i.e. component 1) of the pesticidal mixture PM, and in combination with the uses of the pesticidal mixtures PM as defined herein, the seed treatment compositions of the pesticidal mixtures PM as defined herein, the seeds comprising the pesticidal mixtures PM or the seed treatment compositions thereof as defined herein, and the methods of applying the pesticidal mixtures PM or the seed treatment compositions thereof as defined herein.

The following insecticides II are preferred as components 2) in the pesticidal mixtures PM.

In one embodiment, component 2) is selected from the group consisting of fipronil, clothianidin, thiamethoxam, acetamiprid, dinotefuran, imidacloprid, thiacloprid, sulfoxaflor, methiocarb, tefluthrin, bifenthrin, cypermethrin, alphacypermethrin, spinosad, cyantraniliprole, chlorantraniliprole, triflumezopyrim, flupyradifurone, tetraniliprole, abamectin, thiodicarb, and tioxazafen.

In a preferred embodiment, component 2) is selected from the group consisting of fipronil, clothianidin, thiamethoxam, acetamiprid, dinotefuran, imidacloprid, tefluthrin, bifenthrin, cypermethrin, alphacypermethrin, cyantraniliprole, chlorantraniliprole, abamectin, and thiodicarb.

The following fungicides III are preferred as components 3) in the pesticidal mixtures PM.

In one embodiment, component 3) is selected from the group consisting of azoxystrobinazoxystrobin, trifloxystrobin, picoxystrobin, pyraclostrobin, fenamidone, sedaxane, penthiopyrad, penflufen, fluopyram, fluxapyroxad, boscalid, oxathiapiprolin, metalaxyl, metalaxyl-M, ethaboxam, dimethomorph, cyproconazole, difenoconazole, prothioconazole, flutriafol, thiabendazole, ipconazole, tebuconazole, triadimenol, prochloraz, fluquinconazole, triticonazole, fludioxonil, carboxin, silthiofarm, ziram, thiram, carbendazim, thiophanate methyl, hymexazol, and fluazinam.

In a preferred embodiment, component 3) is selected from the group consisting of azoxystrobinazoxystrobin, trifloxystrobin, pyraclostrobin, sedaxane, penflufen, fluopyram, fluxapyroxad, boscalid, oxathiapiprolin, metalaxyl, metalaxyl-M, ethaboxam, dimethomorph, difenoconazole, prothioconazole, thiabendazole, ipconazole, tebuconazole, prochloraz, fluquinconazole, triticonazole, fludioxonil, silthiofarm, thiophanate methyl, and fluazinam.

Preferred pesticidal mixtures PM for use according to the invention and as contained in the seed treatment compositions and the seeds of the invention, and as applied in the method of the invention are defined hereinafter.

In one preferred embodiment, the pesticidal mixture PM of the present invention comprises at least one compound of formula I as component 1), which is selected from the compounds I-1, I-2, I-3, I-4, I-5, I-6, I-7, I-8, I-9, I-10, I-11, I-12, I-13, I-14, I-15, I-16, I-17, and I-18 as defined above.

In another embodiment, the pesticidal mixture PM of the present invention comprises at least one insecticide II, which is selected from the insecticides as defined in the following table II as component 2). The insecticides II as listed in table II are in the following referred to as insecticides II-1 to II-24 in accordance with each row of table II.

TABLE II

| No. | insecticide II |
| --- | --- |
| II-1 | fipronil |
| II-2 | clothianidin |
| II-3 | thiamethoxam |
| II-4 | acetamiprid |
| II-5 | dinotefuran |
| II-6 | imidacloprid |
| II-7 | thiacloprid |
| II-8 | sulfoxaflor |
| II-9 | methiocarb |
| II-10 | tefluthrin |
| II-11 | bifenthrin |
| II-12 | cypermethrin |
| II-13 | alphacypermethrin |
| II-14 | spinosad |
| II-15 | cyantraniliprole |
| II-16 | chlorantraniliprole |
| II-17 | triflumezopyrim |
| II-18 | flupyradifurone |
| II-19 | abamectin |
| II-20 | thiodicarb |
| II-21 | tioxazafen |
| II-22 | fluxametamide |
| II-23 | fluazaindolizine |
| II-24 | cyhalodiamide |

In another embodiment, the pesticidal mixture PM of the present invention comprises at least one fungicide III which is selected from the fungicides as defined in the following table III as component 3). The fungicides III as listed in table III are in the following referred to as fungicides III-1 to III-33 in accordance with each row of table III.

TABLE III

| No. | fungicide III |
| --- | --- |
| III-1 | azoxystrobin |
| III-2 | trifloxystrobin |
| III-3 | picoxystrobin |
| III-4 | pyraclostrobin |
| III-5 | sedaxane |
| III-6 | penthiopyrad |
| III-7 | penflufen |
| III-8 | fluopyram |
| III-9 | fluxapyroxad |
| III-10 | boscalid |
| III-11 | oxathiapiprolin |
| III-12 | metalaxyl |
| III-13 | metalaxyl-M |
| III-14 | ethaboxam |
| III-15 | dimethomorph |
| III-16 | cyproconazole |
| III-17 | difenoconazole |
| III-18 | prothioconazole |
| III-19 | flutriafol |
| III-20 | thiabendazole |
| III-21 | ipconazole |
| III-22 | tebuconazole |
| III-23 | triadimenol |
| III-24 | prochloraz |
| III-25 | fluquinconazole |
| III-26 | triticonazole |
| III-27 | fludioxonil |
| III-28 | carboxin |

TABLE III-continued

| No. | fungicide III |
| --- | --- |
| III-29 | silthiofarm |
| III-30 | ziram |
| III-31 | thiram |
| III-32 | carbendazim |
| III-33 | thiophanate methyl |

In one embodiment, the pesticidal mixture PM of the present invention comprises a compound of formula I, which is selected from the compounds I-1 to I-18, as component 1), and an insecticide II selected from the insecticides II-1 to II-24 as component 2), preferably from the insecticides II-1 to II-20, particularly fipronil II-1, and a fungicide III selected from the fungicides III-1 to III-33 as component 3), preferably pyraclostrobin III-4.

In particular with a view to their use, preference is given to the pesticidal mixtures compiled in the Groups below.

Group 1 Pesticidal mixtures PM, which comprise compound I-1, and in which the combination of components 2) and 3) corresponds in each case to the combination of an insecticide II with a fungicide III according to one row of Table A Group 2 Pesticidal mixtures PM, which comprise compound I-2, and in which the combination of components 2) and 3) corresponds in each case to the combination of an insecticide II with a fungicide III according to one row of Table A Group 3 Pesticidal mixtures PM, which comprise compound I-3, and in which the combination of components 2) and 3) corresponds in each case to the combination of an insecticide II with a fungicide III according to one row of Table A Group 4 Pesticidal mixtures PM, which comprise compound I-4, and in which combination of components 2) and 3) corresponds in each case to the combination of an insecticide II with a fungicide III according to one row of Table A Group 5 Pesticidal mixtures PM, which comprise compound I-5, and in which the combination of components 2) and 3) corresponds in each case to the combination of an insecticide II with a fungicide III according to one row of Table A Group 6 Pesticidal mixtures PM, which comprise compound I-6, and in which the combination of components 2) and 3) corresponds in each case to the combination of an insecticide II with a fungicide III according to one row of Table A Group 7 Pesticidal mixtures PM, which comprise compound I-7, and in which the combination of components 2) and 3) corresponds in each case to the combination of an insecticide II with a fungicide III according to one row of Table A Group 8 Pesticidal mixtures PM, which comprise compound I-8, and in which the combination of components 2) and 3) corresponds in each case to the combination of an insecticide II with a fungicide III according to one row of Table A Group 9 Pesticidal mixtures PM, which comprise compound I-9, and in which the combination of components 2) and 3) corresponds in each case to the combination of an insecticide II with a fungicide III according to one row of Table A Group 10 Pesticidal mixtures PM, which comprise compound I-10, and in which the combination of components 2)

and 3) corresponds in each case to the combination of an insecticide II with a fungicide III according to one row of Table A Group 11 Pesticidal mixtures PM, which comprise compound I-11, and in which the combination of components 2) and 3) corresponds in each case to the combination of an insecticide II with a fungicide III according to one row of Table A Group 12 Pesticidal mixtures PM, which comprise compound I-12, and in which the combination of components 2) and 3) corresponds in each case to the combination of an insecticide II with a fungicide III according to one row of Table A Group 13 Pesticidal mixtures PM, which comprise compound I-13, and in which the combination of components 2) and 3) corresponds in each case to the combination of an insecticide II with a fungicide III according to one row of Table A Group 14 Pesticidal mixtures PM, which comprise compound I-14, and in which the combination of components 2) and 3) corresponds in each case to the combination of an insecticide II with a fungicide III according to one row of Table A Group 15 Pesticidal mixtures PM, which comprise compound I-15, and in which the combination of components 2) and 3) corresponds in each case to the combination of an insecticide II with a fungicide III according to one row of Table A Group 16 Pesticidal mixtures PM, which comprise compound I-16, and in which the combination of components 2) and 3) corresponds in each case to the combination of an insecticide II with a fungicide III according to one row of Table A Group 17 Pesticidal mixtures PM, which comprise compound I-17, and in which the combination of components 2) and 3) corresponds in each case to the combination of an insecticide II with a fungicide III according to one row of Table A Group 18 Pesticidal mixtures PM, which comprise compound I-18, and in which the combination of components 2) and 3) corresponds in each case to the combination of an insecticide II with a fungicide III according to one row of Table A

TABLE A

| No. | II | III |
| --- | --- | --- |
| A-1 | II-1 | III-1 |
| A-2 | II-2 | III-1 |
| A-3 | II-3 | III-1 |
| A-4 | II-4 | III-1 |
| A-5 | II-5 | III-1 |
| A-6 | II-6 | III-1 |
| A-7 | II-7 | III-1 |
| A-8 | II-8 | III-1 |
| A-9 | II-9 | III-1 |
| A-10 | II-10 | III-1 |
| A-11 | II-11 | III-1 |
| A-12 | II-12 | III-1 |
| A-13 | II-13 | III-1 |
| A-14 | II-14 | III-1 |
| A-15 | II-15 | III-1 |
| A-16 | II-16 | III-1 |
| A-17 | II-17 | III-1 |
| A-18 | II-18 | III-1 |
| A-19 | II-19 | III-1 |
| A-20 | II-20 | III-1 |
| A-21 | II-21 | III-1 |
| A-22 | II-22 | III-1 |
| A-23 | II-23 | III-1 |
| A-24 | II-24 | III-1 |
| A-25 | II-1 | III-2 |
| A-26 | II-2 | III-2 |
| A-27 | II-3 | III-2 |
| A-28 | II-4 | III-2 |
| A-29 | II-5 | III-2 |
| A-30 | II-6 | III-2 |
| A-31 | II-7 | III-2 |
| A-32 | II-8 | III-2 |
| A-33 | II-9 | III-2 |
| A-34 | II-10 | III-2 |
| A-35 | II-11 | III-2 |
| A-36 | II-12 | III-2 |
| A-37 | II-13 | III-2 |
| A-38 | II-14 | III-2 |
| A-39 | II-15 | III-2 |
| A-40 | II-16 | III-2 |
| A-41 | II-17 | III-2 |
| A-42 | II-18 | III-2 |
| A-43 | II-19 | III-2 |
| A-44 | II-20 | III-2 |
| A-45 | II-21 | III-2 |
| A-46 | II-22 | III-2 |
| A-47 | II-23 | III-2 |
| A-48 | II-24 | III-2 |
| A-49 | II-1 | III-3 |
| A-50 | II-2 | III-3 |
| A-51 | II-3 | III-3 |
| A-52 | II-4 | III-3 |
| A-53 | II-5 | III-3 |
| A-54 | II-6 | III-3 |
| A-55 | II-7 | III-3 |
| A-56 | II-8 | III-3 |
| A-57 | II-9 | III-3 |
| A-58 | II-10 | III-3 |
| A-59 | II-11 | III-3 |
| A-60 | II-12 | III-3 |
| A-61 | II-13 | III-3 |
| A-62 | II-14 | III-3 |
| A-63 | II-15 | III-3 |
| A-64 | II-16 | III-3 |
| A-65 | II-17 | III-3 |
| A-66 | II-18 | III-3 |
| A-67 | II-19 | III-3 |
| A-68 | II-20 | III-3 |
| A-69 | II-21 | III-3 |
| A-70 | II-22 | III-3 |
| A-71 | II-23 | III-3 |
| A-72 | II-24 | III-3 |
| A-73 | II-1 | III-4 |
| A-74 | II-2 | III-4 |
| A-75 | II-3 | III-4 |
| A-76 | II-4 | III-4 |
| A-77 | II-5 | III-4 |
| A-78 | II-6 | III-4 |
| A-79 | II-7 | III-4 |
| A-80 | II-8 | III-4 |
| A-81 | II-9 | III-4 |
| A-82 | II-10 | III-4 |
| A-83 | II-11 | III-4 |
| A-84 | II-12 | III-4 |
| A-85 | II-13 | III-4 |
| A-86 | II-14 | III-4 |
| A-87 | II-15 | III-4 |
| A-88 | II-16 | III-4 |
| A-89 | II-17 | III-4 |
| A-90 | II-18 | III-4 |
| A-91 | II-19 | III-4 |
| A-92 | II-20 | III-4 |
| A-93 | II-21 | III-4 |
| A-94 | II-22 | III-4 |
| A-95 | II-23 | III-4 |
| A-96 | II-24 | III-4 |
| A-97 | II-1 | III-5 |
| A-98 | II-2 | III-5 |
| A-99 | II-3 | III-5 |
| A-100 | II-4 | III-5 |
| A-101 | II-5 | III-5 |

TABLE A-continued

| No. | II | III |
|---|---|---|
| A-102 | II-6 | III-5 |
| A-103 | II-7 | III-5 |
| A-104 | II-8 | III-5 |
| A-105 | II-9 | III-5 |
| A-106 | II-10 | III-5 |
| A-107 | II-11 | III-5 |
| A-108 | II-12 | III-5 |
| A-109 | II-13 | III-5 |
| A-110 | II-14 | III-5 |
| A-111 | II-15 | III-5 |
| A-112 | II-16 | III-5 |
| A-113 | II-17 | III-5 |
| A-114 | II-18 | III-5 |
| A-115 | II-19 | III-5 |
| A-116 | II-20 | III-5 |
| A-117 | II-21 | III-5 |
| A-118 | II-22 | III-5 |
| A-119 | II-23 | III-5 |
| A-120 | II-24 | III-5 |
| A-121 | II-1 | III-6 |
| A-122 | II-2 | III-6 |
| A-123 | II-3 | III-6 |
| A-124 | II-4 | III-6 |
| A-125 | II-5 | III-6 |
| A-126 | II-6 | III-6 |
| A-127 | II-7 | III-6 |
| A-128 | II-8 | III-6 |
| A-129 | II-9 | III-6 |
| A-130 | II-10 | III-6 |
| A-131 | II-11 | III-6 |
| A-132 | II-12 | III-6 |
| A-133 | II-13 | III-6 |
| A-134 | II-14 | III-6 |
| A-135 | II-15 | III-6 |
| A-136 | II-16 | III-6 |
| A-137 | II-17 | III-6 |
| A-138 | II-18 | III-6 |
| A-139 | II-19 | III-6 |
| A-140 | II-20 | III-6 |
| A-141 | II-21 | III-6 |
| A-142 | II-22 | III-6 |
| A-143 | II-23 | III-6 |
| A-144 | II-24 | III-6 |
| A-145 | II-1 | III-7 |
| A-146 | II-2 | III-7 |
| A-147 | II-3 | III-7 |
| A-148 | II-4 | III-7 |
| A-149 | II-5 | III-7 |
| A-150 | II-6 | III-7 |
| A-151 | II-7 | III-7 |
| A-152 | II-8 | III-7 |
| A-153 | II-9 | III-7 |
| A-154 | II-10 | III-7 |
| A-155 | II-11 | III-7 |
| A-156 | II-12 | III-7 |
| A-157 | II-13 | III-7 |
| A-158 | II-14 | III-7 |
| A-159 | II-15 | III-7 |
| A-160 | II-16 | III-7 |
| A-161 | II-17 | III-7 |
| A-162 | II-18 | III-7 |
| A-163 | II-19 | III-7 |
| A-164 | II-20 | III-7 |
| A-165 | II-21 | III-7 |
| A-166 | II-22 | III-7 |
| A-167 | II-23 | III-7 |
| A-168 | II-24 | III-7 |
| A-169 | II-1 | III-8 |
| A-170 | II-2 | III-8 |
| A-171 | II-3 | III-8 |
| A-172 | II-4 | III-8 |
| A-173 | II-5 | III-8 |
| A-174 | II-6 | III-8 |
| A-175 | II-7 | III-8 |
| A-176 | II-8 | III-8 |
| A-177 | II-9 | III-8 |
| A-178 | II-10 | III-8 |
| A-179 | II-11 | III-8 |
| A-180 | II-12 | III-8 |
| A-181 | II-13 | III-8 |
| A-182 | II-14 | III-8 |
| A-183 | II-15 | III-8 |
| A-184 | II-16 | III-8 |
| A-185 | II-17 | III-8 |
| A-186 | II-18 | III-8 |
| A-187 | II-19 | III-8 |
| A-188 | II-20 | III-8 |
| A-189 | II-21 | III-8 |
| A-190 | II-22 | III-8 |
| A-191 | II-23 | III-8 |
| A-192 | II-24 | III-8 |
| A-193 | II-1 | III-9 |
| A-194 | II-2 | III-9 |
| A-195 | II-3 | III-9 |
| A-196 | II-4 | III-9 |
| A-197 | II-5 | III-9 |
| A-198 | II-6 | III-9 |
| A-199 | II-7 | III-9 |
| A-200 | II-8 | III-9 |
| A-201 | II-9 | III-9 |
| A-202 | II-10 | III-9 |
| A-203 | II-11 | III-9 |
| A-204 | II-12 | III-9 |
| A-205 | II-13 | III-9 |
| A-206 | II-14 | III-9 |
| A-207 | II-15 | III-9 |
| A-208 | II-16 | III-9 |
| A-209 | II-17 | III-9 |
| A-210 | II-18 | III-9 |
| A-211 | II-19 | III-9 |
| A-212 | II-20 | III-9 |
| A-213 | II-21 | III-9 |
| A-214 | II-22 | III-9 |
| A-215 | II-23 | III-9 |
| A-216 | II-24 | III-9 |
| A-217 | II-1 | III-10 |
| A-218 | II-2 | III-10 |
| A-219 | II-3 | III-10 |
| A-220 | II-4 | III-10 |
| A-221 | II-5 | III-10 |
| A-222 | II-6 | III-10 |
| A-223 | II-7 | III-10 |
| A-224 | II-8 | III-10 |
| A-225 | II-9 | III-10 |
| A-226 | II-10 | III-10 |
| A-227 | II-11 | III-10 |
| A-228 | II-12 | III-10 |
| A-229 | II-13 | III-10 |
| A-230 | II-14 | III-10 |
| A-231 | II-15 | III-10 |
| A-232 | II-16 | III-10 |
| A-233 | II-17 | III-10 |
| A-234 | II-18 | III-10 |
| A-235 | II-19 | III-10 |
| A-236 | II-20 | III-10 |
| A-237 | II-21 | III-10 |
| A-238 | II-22 | III-10 |
| A-239 | II-23 | III-10 |
| A-240 | II-24 | III-10 |
| A-241 | II-1 | III-11 |
| A-242 | II-2 | III-11 |
| A-243 | II-3 | III-11 |
| A-244 | II-4 | III-11 |
| A-245 | II-5 | III-11 |
| A-246 | II-6 | III-11 |
| A-247 | II-7 | III-11 |
| A-248 | II-8 | III-11 |
| A-249 | II-9 | III-11 |
| A-250 | II-10 | III-11 |
| A-251 | II-11 | III-11 |
| A-252 | II-12 | III-11 |
| A-253 | II-13 | III-11 |
| A-254 | II-14 | III-11 |
| A-255 | II-15 | III-11 |
| A-256 | II-16 | III-11 |
| A-257 | II-17 | III-11 |

TABLE A-continued

| No. | II | III |
|---|---|---|
| A-258 | II-18 | III-11 |
| A-259 | II-19 | III-11 |
| A-260 | II-20 | III-11 |
| A-261 | II-21 | III-11 |
| A-262 | II-22 | III-11 |
| A-263 | II-23 | III-11 |
| A-264 | II-24 | III-11 |
| A-265 | II-1 | III-12 |
| A-266 | II-2 | III-12 |
| A-267 | II-3 | III-12 |
| A-268 | II-4 | III-12 |
| A-269 | II-5 | III-12 |
| A-270 | II-6 | III-12 |
| A-271 | II-7 | III-12 |
| A-272 | II-8 | III-12 |
| A-273 | II-9 | III-12 |
| A-274 | II-10 | III-12 |
| A-275 | II-11 | III-12 |
| A-276 | II-12 | III-12 |
| A-277 | II-13 | III-12 |
| A-278 | II-14 | III-12 |
| A-279 | II-15 | III-12 |
| A-280 | II-16 | III-12 |
| A-281 | II-17 | III-12 |
| A-282 | II-18 | III-12 |
| A-283 | II-19 | III-12 |
| A-284 | II-20 | III-12 |
| A-285 | II-21 | III-12 |
| A-286 | II-22 | III-12 |
| A-287 | II-23 | III-12 |
| A-288 | II-24 | III-12 |
| A-289 | II-1 | III-13 |
| A-290 | II-2 | III-13 |
| A-291 | II-3 | III-13 |
| A-292 | II-4 | III-13 |
| A-293 | II-5 | III-13 |
| A-294 | II-6 | III-13 |
| A-295 | II-7 | III-13 |
| A-296 | II-8 | III-13 |
| A-297 | II-9 | III-13 |
| A-298 | II-10 | III-13 |
| A-299 | II-11 | III-13 |
| A-300 | II-12 | III-13 |
| A-301 | II-13 | III-13 |
| A-302 | II-14 | III-13 |
| A-303 | II-15 | III-13 |
| A-304 | II-16 | III-13 |
| A-305 | II-17 | III-13 |
| A-306 | II-18 | III-13 |
| A-307 | II-19 | III-13 |
| A-308 | II-20 | III-13 |
| A-309 | II-21 | III-13 |
| A-310 | II-22 | III-13 |
| A-311 | II-23 | III-13 |
| A-312 | II-24 | III-13 |
| A-313 | II-1 | III-14 |
| A-314 | II-2 | III-14 |
| A-315 | II-3 | III-14 |
| A-316 | II-4 | III-14 |
| A-317 | II-5 | III-14 |
| A-318 | II-6 | III-14 |
| A-319 | II-7 | III-14 |
| A-320 | II-8 | III-14 |
| A-321 | II-9 | III-14 |
| A-322 | II-10 | III-14 |
| A-323 | II-11 | III-14 |
| A-324 | II-12 | III-14 |
| A-325 | II-13 | III-14 |
| A-326 | II-14 | III-14 |
| A-327 | II-15 | III-14 |
| A-328 | II-16 | III-14 |
| A-329 | II-17 | III-14 |
| A-330 | II-18 | III-14 |
| A-331 | II-19 | III-14 |
| A-332 | II-20 | III-14 |
| A-333 | II-21 | III-14 |
| A-334 | II-22 | III-14 |
| A-335 | II-23 | III-14 |
| A-336 | II-24 | III-14 |
| A-337 | II-1 | III-15 |
| A-338 | II-2 | III-15 |
| A-339 | II-3 | III-15 |
| A-340 | II-4 | III-15 |
| A-341 | II-5 | III-15 |
| A-342 | II-6 | III-15 |
| A-343 | II-7 | III-15 |
| A-344 | II-8 | III-15 |
| A-345 | II-9 | III-15 |
| A-346 | II-10 | III-15 |
| A-347 | II-11 | III-15 |
| A-348 | II-12 | III-15 |
| A-349 | II-13 | III-15 |
| A-350 | II-14 | III-15 |
| A-351 | II-15 | III-15 |
| A-352 | II-16 | III-15 |
| A-353 | II-17 | III-15 |
| A-354 | II-18 | III-15 |
| A-355 | II-19 | III-15 |
| A-356 | II-20 | III-15 |
| A-357 | II-21 | III-15 |
| A-358 | II-22 | III-15 |
| A-359 | II-23 | III-15 |
| A-360 | II-24 | III-15 |
| A-361 | II-1 | III-16 |
| A-362 | II-2 | III-16 |
| A-363 | II-3 | III-16 |
| A-364 | II-4 | III-16 |
| A-365 | II-5 | III-16 |
| A-366 | II-6 | III-16 |
| A-367 | II-7 | III-16 |
| A-368 | II-8 | III-16 |
| A-369 | II-9 | III-16 |
| A-370 | II-10 | III-16 |
| A-371 | II-11 | III-16 |
| A-372 | II-12 | III-16 |
| A-373 | II-13 | III-16 |
| A-374 | II-14 | III-16 |
| A-375 | II-15 | III-16 |
| A-376 | II-16 | III-16 |
| A-377 | II-17 | III-16 |
| A-378 | II-18 | III-16 |
| A-379 | II-19 | III-16 |
| A-380 | II-20 | III-16 |
| A-381 | II-21 | III-16 |
| A-382 | II-22 | III-16 |
| A-383 | II-23 | III-16 |
| A-384 | II-24 | III-16 |
| A-385 | II-1 | III-17 |
| A-386 | II-2 | III-17 |
| A-387 | II-3 | III-17 |
| A-388 | II-4 | III-17 |
| A-389 | II-5 | III-17 |
| A-390 | II-6 | III-17 |
| A-391 | II-7 | III-17 |
| A-392 | II-8 | III-17 |
| A-393 | II-9 | III-17 |
| A-394 | II-10 | III-17 |
| A-395 | II-11 | III-17 |
| A-396 | II-12 | III-17 |
| A-397 | II-13 | III-17 |
| A-398 | II-14 | III-17 |
| A-399 | II-15 | III-17 |
| A-400 | II-16 | III-17 |
| A-401 | II-17 | III-17 |
| A-402 | II-18 | III-17 |
| A-403 | II-19 | III-17 |
| A-404 | II-20 | III-17 |
| A-405 | II-21 | III-17 |
| A-406 | II-22 | III-17 |
| A-407 | II-23 | III-17 |
| A-408 | II-24 | III-17 |
| A-409 | II-1 | III-18 |
| A-410 | II-2 | III-18 |
| A-411 | II-3 | III-18 |
| A-412 | II-4 | III-18 |
| A-413 | II-5 | III-18 |

TABLE A-continued

| No. | II | III |
|---|---|---|
| A-414 | II-6 | III-18 |
| A-415 | II-7 | III-18 |
| A-416 | II-8 | III-18 |
| A-417 | II-9 | III-18 |
| A-418 | II-10 | III-18 |
| A-419 | II-11 | III-18 |
| A-420 | II-12 | III-18 |
| A-421 | II-13 | III-18 |
| A-422 | II-14 | III-18 |
| A-423 | II-15 | III-18 |
| A-424 | II-16 | III-18 |
| A-425 | II-17 | III-18 |
| A-426 | II-18 | III-18 |
| A-427 | II-19 | III-18 |
| A-428 | II-20 | III-18 |
| A-429 | II-21 | III-18 |
| A-430 | II-22 | III-18 |
| A-431 | II-23 | III-18 |
| A-432 | II-24 | III-18 |
| A-433 | II-1 | III-19 |
| A-434 | II-2 | III-19 |
| A-435 | II-3 | III-19 |
| A-436 | II-4 | III-19 |
| A-437 | II-5 | III-19 |
| A-438 | II-6 | III-19 |
| A-439 | II-7 | III-19 |
| A-440 | II-8 | III-19 |
| A-441 | II-9 | III-19 |
| A-442 | II-10 | III-19 |
| A-443 | II-11 | III-19 |
| A-444 | II-12 | III-19 |
| A-445 | II-13 | III-19 |
| A-446 | II-14 | III-19 |
| A-447 | II-15 | III-19 |
| A-448 | II-16 | III-19 |
| A-449 | II-17 | III-19 |
| A-450 | II-18 | III-19 |
| A-451 | II-19 | III-19 |
| A-452 | II-20 | III-19 |
| A-453 | II-21 | III-19 |
| A-454 | II-22 | III-19 |
| A-455 | II-23 | III-19 |
| A-456 | II-24 | III-19 |
| A-457 | II-1 | III-20 |
| A-458 | II-2 | III-20 |
| A-459 | II-3 | III-20 |
| A-460 | II-4 | III-20 |
| A-461 | II-5 | III-20 |
| A-462 | II-6 | III-20 |
| A-463 | II-7 | III-20 |
| A-464 | II-8 | III-20 |
| A-465 | II-9 | III-20 |
| A-466 | II-10 | III-20 |
| A-467 | II-11 | III-20 |
| A-468 | II-12 | III-20 |
| A-469 | II-13 | III-20 |
| A-470 | II-14 | III-20 |
| A-471 | II-15 | III-20 |
| A-472 | II-16 | III-20 |
| A-473 | II-17 | III-20 |
| A-474 | II-18 | III-20 |
| A-475 | II-19 | III-20 |
| A-476 | II-20 | III-20 |
| A-477 | II-21 | III-20 |
| A-478 | II-22 | III-20 |
| A-479 | II-23 | III-20 |
| A-480 | II-24 | III-20 |
| A-481 | II-1 | III-21 |
| A-482 | II-2 | III-21 |
| A-483 | II-3 | III-21 |
| A-484 | II-4 | III-21 |
| A-485 | II-5 | III-21 |
| A-486 | II-6 | III-21 |
| A-487 | II-7 | III-21 |
| A-488 | II-8 | III-21 |
| A-489 | II-9 | III-21 |
| A-490 | II-10 | III-21 |
| A-491 | II-11 | III-21 |
| A-492 | II-12 | III-21 |
| A-493 | II-13 | III-21 |
| A-494 | II-14 | III-21 |
| A-495 | II-15 | III-21 |
| A-496 | II-16 | III-21 |
| A-497 | II-17 | III-21 |
| A-498 | II-18 | III-21 |
| A-499 | II-19 | III-21 |
| A-500 | II-20 | III-21 |
| A-501 | II-21 | III-21 |
| A-502 | II-22 | III-21 |
| A-503 | II-23 | III-21 |
| A-504 | II-24 | III-21 |
| A-505 | II-1 | III-22 |
| A-506 | II-2 | III-22 |
| A-507 | II-3 | III-22 |
| A-508 | II-4 | III-22 |
| A-509 | II-5 | III-22 |
| A-510 | II-6 | III-22 |
| A-511 | II-7 | III-22 |
| A-512 | II-8 | III-22 |
| A-513 | II-9 | III-22 |
| A-514 | II-10 | III-22 |
| A-515 | II-11 | III-22 |
| A-516 | II-12 | III-22 |
| A-517 | II-13 | III-22 |
| A-518 | II-14 | III-22 |
| A-519 | II-15 | III-22 |
| A-520 | II-16 | III-22 |
| A-521 | II-17 | III-22 |
| A-522 | II-18 | III-22 |
| A-523 | II-19 | III-22 |
| A-524 | II-20 | III-22 |
| A-525 | II-21 | III-22 |
| A-526 | II-22 | III-22 |
| A-527 | II-23 | III-22 |
| A-528 | II-24 | III-22 |
| A-529 | II-1 | III-23 |
| A-530 | II-2 | III-23 |
| A-531 | II-3 | III-23 |
| A-532 | II-4 | III-23 |
| A-533 | II-5 | III-23 |
| A-534 | II-6 | III-23 |
| A-535 | II-7 | III-23 |
| A-536 | II-8 | III-23 |
| A-537 | II-9 | III-23 |
| A-538 | II-10 | III-23 |
| A-539 | II-11 | III-23 |
| A-540 | II-12 | III-23 |
| A-541 | II-13 | III-23 |
| A-542 | II-14 | III-23 |
| A-543 | II-15 | III-23 |
| A-544 | II-16 | III-23 |
| A-545 | II-17 | III-23 |
| A-546 | II-18 | III-23 |
| A-547 | II-19 | III-23 |
| A-548 | II-20 | III-23 |
| A-549 | II-21 | III-23 |
| A-550 | II-22 | III-23 |
| A-551 | II-23 | III-23 |
| A-552 | II-24 | III-23 |
| A-553 | II-1 | III-24 |
| A-554 | II-2 | III-24 |
| A-555 | II-3 | III-24 |
| A-556 | II-4 | III-24 |
| A-557 | II-5 | III-24 |
| A-558 | II-6 | III-24 |
| A-559 | II-7 | III-24 |
| A-560 | II-8 | III-24 |
| A-561 | II-9 | III-24 |
| A-562 | II-10 | III-24 |
| A-563 | II-11 | III-24 |
| A-564 | II-12 | III-24 |
| A-565 | II-13 | III-24 |
| A-566 | II-14 | III-24 |
| A-567 | II-15 | III-24 |
| A-568 | II-16 | III-24 |
| A-569 | II-17 | III-24 |

TABLE A-continued

| No. | II | III |
|---|---|---|
| A-570 | II-18 | III-24 |
| A-571 | II-19 | III-24 |
| A-572 | II-20 | III-24 |
| A-573 | II-21 | III-24 |
| A-574 | II-22 | III-24 |
| A-575 | II-23 | III-24 |
| A-576 | II-24 | III-24 |
| A-577 | II-1 | III-25 |
| A-578 | II-2 | III-25 |
| A-579 | II-3 | III-25 |
| A-580 | II-4 | III-25 |
| A-581 | II-5 | III-25 |
| A-582 | II-6 | III-25 |
| A-583 | II-7 | III-25 |
| A-584 | II-8 | III-25 |
| A-585 | II-9 | III-25 |
| A-586 | II-10 | III-25 |
| A-587 | II-11 | III-25 |
| A-588 | II-12 | III-25 |
| A-589 | II-13 | III-25 |
| A-590 | II-14 | III-25 |
| A-591 | II-15 | III-25 |
| A-592 | II-16 | III-25 |
| A-593 | II-17 | III-25 |
| A-594 | II-18 | III-25 |
| A-595 | II-19 | III-25 |
| A-596 | II-20 | III-25 |
| A-597 | II-21 | III-25 |
| A-598 | II-22 | III-25 |
| A-599 | II-23 | III-25 |
| A-600 | II-24 | III-25 |
| A-601 | II-1 | III-26 |
| A-602 | II-2 | III-26 |
| A-603 | II-3 | III-26 |
| A-604 | II-4 | III-26 |
| A-605 | II-5 | III-26 |
| A-606 | II-6 | III-26 |
| A-607 | II-7 | III-26 |
| A-608 | II-8 | III-26 |
| A-609 | II-9 | III-26 |
| A-610 | II-10 | III-26 |
| A-611 | II-11 | III-26 |
| A-612 | II-12 | III-26 |
| A-613 | II-13 | III-26 |
| A-614 | II-14 | III-26 |
| A-615 | II-15 | III-26 |
| A-616 | II-16 | III-26 |
| A-617 | II-17 | III-26 |
| A-618 | II-18 | III-26 |
| A-619 | II-19 | III-26 |
| A-620 | II-20 | III-26 |
| A-621 | II-21 | III-26 |
| A-622 | II-22 | III-26 |
| A-623 | II-23 | III-26 |
| A-624 | II-24 | III-26 |
| A-625 | II-1 | III-27 |
| A-626 | II-2 | III-27 |
| A-627 | II-3 | III-27 |
| A-628 | II-4 | III-27 |
| A-629 | II-5 | III-27 |
| A-630 | II-6 | III-27 |
| A-631 | II-7 | III-27 |
| A-632 | II-8 | III-27 |
| A-633 | II-9 | III-27 |
| A-634 | II-10 | III-27 |
| A-635 | II-11 | III-27 |
| A-636 | II-12 | III-27 |
| A-637 | II-13 | III-27 |
| A-638 | II-14 | III-27 |
| A-639 | II-15 | III-27 |
| A-640 | II-16 | III-27 |
| A-641 | II-17 | III-27 |
| A-642 | II-18 | III-27 |
| A-643 | II-19 | III-27 |
| A-644 | II-20 | III-27 |
| A-645 | II-21 | III-27 |
| A-646 | II-22 | III-27 |
| A-647 | II-23 | III-27 |
| A-648 | II-24 | III-27 |
| A-649 | II-1 | III-28 |
| A-650 | II-2 | III-28 |
| A-651 | II-3 | III-28 |
| A-652 | II-4 | III-28 |
| A-653 | II-5 | III-28 |
| A-654 | II-6 | III-28 |
| A-655 | II-7 | III-28 |
| A-656 | II-8 | III-28 |
| A-657 | II-9 | III-28 |
| A-658 | II-10 | III-28 |
| A-659 | II-11 | III-28 |
| A-660 | II-12 | III-28 |
| A-661 | II-13 | III-28 |
| A-662 | II-14 | III-28 |
| A-663 | II-15 | III-28 |
| A-664 | II-16 | III-28 |
| A-665 | II-17 | III-28 |
| A-666 | II-18 | III-28 |
| A-667 | II-19 | III-28 |
| A-668 | II-20 | III-28 |
| A-669 | II-21 | III-28 |
| A-670 | II-22 | III-28 |
| A-671 | II-23 | III-28 |
| A-672 | II-24 | III-28 |
| A-673 | II-1 | III-29 |
| A-674 | II-2 | III-29 |
| A-675 | II-3 | III-29 |
| A-676 | II-4 | III-29 |
| A-677 | II-5 | III-29 |
| A-678 | II-6 | III-29 |
| A-679 | II-7 | III-29 |
| A-680 | II-8 | III-29 |
| A-681 | II-9 | III-29 |
| A-682 | II-10 | III-29 |
| A-683 | II-11 | III-29 |
| A-684 | II-12 | III-29 |
| A-685 | II-13 | III-29 |
| A-686 | II-14 | III-29 |
| A-687 | II-15 | III-29 |
| A-688 | II-16 | III-29 |
| A-689 | II-17 | III-29 |
| A-690 | II-18 | III-29 |
| A-691 | II-19 | III-29 |
| A-692 | II-20 | III-29 |
| A-693 | II-21 | III-29 |
| A-694 | II-22 | III-29 |
| A-695 | II-23 | III-29 |
| A-696 | II-24 | III-29 |
| A-697 | II-1 | III-30 |
| A-698 | II-2 | III-30 |
| A-699 | II-3 | III-30 |
| A-700 | II-4 | III-30 |
| A-701 | II-5 | III-30 |
| A-702 | II-6 | III-30 |
| A-703 | II-7 | III-30 |
| A-704 | II-8 | III-30 |
| A-705 | II-9 | III-30 |
| A-706 | II-10 | III-30 |
| A-707 | II-11 | III-30 |
| A-708 | II-12 | III-30 |
| A-709 | II-13 | III-30 |
| A-710 | II-14 | III-30 |
| A-711 | II-15 | III-30 |
| A-712 | II-16 | III-30 |
| A-713 | II-17 | III-30 |
| A-714 | II-18 | III-30 |
| A-715 | II-19 | III-30 |
| A-716 | II-20 | III-30 |
| A-717 | II-21 | III-30 |
| A-718 | II-22 | III-30 |
| A-719 | II-23 | III-30 |
| A-720 | II-24 | III-30 |
| A-721 | II-1 | III-31 |
| A-722 | II-2 | III-31 |
| A-723 | II-3 | III-31 |
| A-724 | II-4 | III-31 |
| A-725 | II-5 | III-31 |

TABLE A-continued

| No. | II | III |
|---|---|---|
| A-726 | II-6 | III-31 |
| A-727 | II-7 | III-31 |
| A-728 | II-8 | III-31 |
| A-729 | II-9 | III-31 |
| A-730 | II-10 | III-31 |
| A-731 | II-11 | III-31 |
| A-732 | II-12 | III-31 |
| A-733 | II-13 | III-31 |
| A-734 | II-14 | III-31 |
| A-735 | II-15 | III-31 |
| A-736 | II-16 | III-31 |
| A-737 | II-17 | III-31 |
| A-738 | II-18 | III-31 |
| A-739 | II-19 | III-31 |
| A-740 | II-20 | III-31 |
| A-741 | II-21 | III-31 |
| A-742 | II-22 | III-31 |
| A-743 | II-23 | III-31 |
| A-744 | II-24 | III-31 |
| A-745 | II-1 | III-32 |
| A-746 | II-2 | III-32 |
| A-747 | II-3 | III-32 |
| A-748 | II-4 | III-32 |
| A-749 | II-5 | III-32 |
| A-750 | II-6 | III-32 |
| A-751 | II-7 | III-32 |
| A-752 | II-8 | III-32 |
| A-753 | II-9 | III-32 |
| A-754 | II-10 | III-32 |
| A-755 | II-11 | III-32 |
| A-756 | II-12 | III-32 |
| A-757 | II-13 | III-32 |
| A-758 | II-14 | III-32 |
| A-759 | II-15 | III-32 |
| A-760 | II-16 | III-32 |
| A-761 | II-17 | III-32 |
| A-762 | II-18 | III-32 |
| A-763 | II-19 | III-32 |
| A-764 | II-20 | III-32 |
| A-765 | II-21 | III-32 |
| A-766 | II-22 | III-32 |
| A-767 | II-23 | III-32 |
| A-768 | II-24 | III-32 |
| A-769 | II-1 | III-33 |
| A-770 | II-2 | III-33 |
| A-771 | II-3 | III-33 |
| A-772 | II-4 | III-33 |
| A-773 | II-5 | III-33 |
| A-774 | II-6 | III-33 |
| A-775 | II-7 | III-33 |
| A-776 | II-8 | III-33 |
| A-777 | II-9 | III-33 |
| A-778 | II-10 | III-33 |
| A-779 | II-11 | III-33 |
| A-780 | II-12 | III-33 |
| A-781 | II-13 | III-33 |
| A-782 | II-14 | III-33 |
| A-783 | II-15 | III-33 |
| A-784 | II-16 | III-33 |
| A-785 | II-17 | III-33 |
| A-786 | II-18 | III-33 |
| A-787 | II-19 | III-33 |
| A-788 | II-20 | III-33 |
| A-789 | II-21 | III-33 |
| A-790 | II-22 | III-33 |
| A-791 | II-23 | III-33 |
| A-792 | II-24 | III-33 |

In the pesticidal mixtures PM of the present invention, in particular in any one of the pesticidal mixtures of Groups 1 to 18, the components 1), 2) and 3) are preferably present in the following ratios.

In one embodiment, component 1) and component 2) are present in a weight ratio from 100:1 to 1:100, and component 1) and component 3) are present in a weight ratio from 100:1 to 1:100, and component 2) and component 3) are present in a weight ratio from 100:1 to 1:100.

In a preferred embodiment, component 1) and component 2) are present in a weight ratio from 10:1 to 1:10, and component 1) and component 3) are present in a weight ratio from 10:1 to 1:10, and component 2) and component 3) are present in a weight ratio from 10:1 to 1:10.

In another embodiment, an excess of component 1) compared to the combination of components 2) and 3) is present, so that the weight ratio of component 1) to the combination of components 2) and 3 is from 1000:1 to 2:1, preferably from 100:1 to 2:1, more preferably from 10:1 to 2:1. In this connection, it is preferred that components 2) and 3) are present in similar amounts, e.g. in a weight ratio of from 2:1 to 1:2, preferably 1:1.5 to 1.5:1.

In another embodiment, an excess of the combination of components 2) and 3) compared to component 1) is present, so that the weight ratio of the combination of components 2) and 3 to component 1) is from 1000:1 to 2:1, preferably from 100:1 to 2:1, more preferably from 10:1 to 2:1. In this connection, it is preferred that components 2) and 3) are present in similar amounts, e.g. in a weight ratio of from 2:1 to 1:2, preferably 1:1.5 to 1.5:1.

In another embodiment, components 1), 2), and 3) are present in amounts, which provide a synergistically effect in terms of the insecticidal and/or fungicidal activity.

Preferred ratios of component 1) to component 2) to component 3) include (1-10):(1-10):(1-10), e.g. 1(±0.5):10(±0.5):10(±0.5), 10(±0.5):1(±0.5):1(±0.5), or 1(±0.5):10(±0.5):1(±0.5), 1(±0.5):1(±0.5):10(±0.5), or 1(±0.5):2(±0.5):2(±0.5), 2(±0.5):1(±0.5):1(±0.5), or 1(±0.5):2(±0.5):1(±0.5), 1(±0.5):1(±0.5):2(±0.5).

As already indicated above, the pesticidal mixtures PM of the invention, in particular any one of the pesticidal mixtures of Groups 1 to 18, are suitable for use for protecting a plant selected from wheat, maize, barley, oat, rye, rice, soybean, cotton, sugarbeet, rapeseed, and potato against the attack or infestation by invertebrate pests and/or pythopathogenic fungi. In this regard, the pests and fungi as defined below are of particular relevance. Preferably, the plants are protected against attack or infestation of both, pests and fungi. The following preferred embodiments regarding invertebrate pests, pythopatogenic harmful fungi and plants in connection with the use of the pesticidal mixtures PM of the invention are to be understood as preferred on their own as well as preferably in combination with each other, and in combination with the preferred embodiments of the pesticidal mixture PM of the invention as defined above.

In one embodiment, the invertebrate pests are selected from the group consisting of aphids (P-1), diptera (P-2), leafhopper (P-3), thrips (P-4), whitefly (P-5), and combinations thereof. In one preferred embodiment, the invertebrate pests are selected from the group consisting of aphids (P-1), diptera (P-2), leafhopper (P-3), and combinations thereof. In another preferred embodiment, the invertebrate pests are aphids (P-1), thrips P-4) or a combination thereof. In one particularly preferred embodiment, the invertebrate pests are aphids (P-1). In another particularly preferred embodiment, the invertebrate pests are thrips (P-4).

In one embodiment, the phytopathogenic harmful fungi are selected from the group consisting of *Pythium* sp. (S-1), *Fusarium* sp. (S-2), *Rhizoctonia* sp. (S-3), *Ustilago* sp. (S-4), *Tilletia* sp. (S-5), *Michrodochium* sp. (S-6), *Gaeumannomyces graminis* (S-7), *Aphanomyces cochlioides* (S-8), *Sclerotinia* sp. (S-9), *Phoma* sp. (S-10), and combinations thereof, and are preferably selected from the group consisting of *Pythium* sp. (S-1), *Fusarium* sp. (S-2), *Usti-* lago sp. (S-4), *Tilletia* sp. (S-5), *Michrodochium* sp. (S-6), *Gaeumannomyces graminis* (S-7), *Aphanomyces cochlioides* (S-8), *Sclerotinia* sp. (S-9), *Phoma* sp. (S-10), and combinations thereof, and are more preferably *Pythium* sp. (S-1), *Fusarium* sp. (S-2), or *Phoma* sp. (S-10), or combinations thereof and are particularly preferably *Phoma* sp. (S-10).

Preferred *Pythium* species include *P. ultimum* and *P. aphanidermatum*.

Preferred *Fusarium* species include *F. graminearum*, *F. culmorum*, *F. oxysporum*, *F. solani*, *F. tucumaniae*, *F. brasiliense*, and *F. verticillioides*.

Preferred *Rhizoctonia* species include *R. solani*, and *R. cerealis*.

Preferred *Ustilgao* species include *U. nuda*, *U. avaenae*, and *U. maydis*.

Preferred *Tilletia* species include *T. tritici*, and *T. controversa*.

Preferred *Michrodochium* species include *Michrodochium nivale*.

Preferred *Sclerotinia* species include *S. sclerotiorum*, *S. rolfsii*, and *S. sclerotiorum*.

Preferred *Phoma* species include *Phoma lingam* and *P. betae*.

Phytopathogenic harmful fungi, which are of particular relevance in connection with potato (C-7), are selected from the group consisting of *Phytophthora infestans*, *Alternaria solani*, *Rhizoctonia solani*, *Spongospora subterranea*, *Fusarium coeruleum*, *Synchytrium endobioticum*, *Helminthosporium solani*, *Fusarium oxysporum*, and *Colletotrichum coccodes*.

Phytopathogenic harmful fungi, which are of particular relevance in connection with soybean (C-3), additionally include *Phakopsora pachyrhizi* and *P. meibomiae* (soybean rust). Thus, preferred phytopathogenic harmful fungi in connection with soybean preferably include S-1, S-2, S-3, *Phakopsora pachyrhizi*, and *P. meibomiae*, in particular, S-1, S-2, *Phakopsora pachyrhizi*, and *P. meibomiae*.

In one embodiment, the plant is selected from wheat (C-1a), maize (C-1b), barley (C-1c), oat (C-1d), rye (C-1e), rice (C-2), soybean (C-3), cotton (C-4), sugarbeet (C-5), rapeseed (C-6), and potato (C-7). In a preferred embodiment, the plant is a cereal selected from wheat (C-1a), maize (C-1b), barley (C-1c), oat (C-1d), and rye (C-1e), and is preferably a cereal selected from maize (C-1b), barley (C-1c), oat (C-1d), and rye (C-1e). In another preferred embodiment, the plant is soybean (C-3) or cotton (C-4).

In one particularly preferred embodiment, the plant is wheat (C-1a). In another particularly preferred embodiment, the plant is maize (C-1b). In another particularly preferred embodiment, the plant is barley (C-1c). In another particularly preferred embodiment, the plant is oat (C-1d). In another particularly preferred embodiment, the plant is rye (C-1e). In another particularly preferred embodiment, the plant is rice (C-2). In another particularly preferred embodiment, the plant is soybean (C-3). In another particularly preferred embodiment, the plant is cotton (C-4). In another particularly preferred embodiment, the plant is sugarbeet (C-5). In another particularly preferred embodiment, the plant is rapeseed (C-6). In another particularly preferred embodiment, the plant is potato (C-7).

Preference is given to the use of the pesticidal mixtures PM of the invention for the protection of a plant against the harmful pests and fungi according to one row of the following table U1.

TABLE U1

| No | plant | pest | fungi |
|---|---|---|---|
| U1-1 | C-1a | P-1, P-2, P-3 | S-1, S-2, S-3, S-4, S-5, S-6, S-7 |
| U1-2 | C-1b | P-1, P-2, P-3 | S-1, S-2, S-3, S-4, S-5, S-6, S-7 |
| U1-3 | C-1c | P-1, P-2, P-3 | S-1, S-2, S-3, S-4, S-5, S-6, S-7 |
| U1-4 | C-1d | P-1, P-2, P-3 | S-1, S-2, S-3, S-4, S-5, S-6, S-7 |
| U1-5 | C-1e | P-1, P-2, P-3 | S-1, S-2, S-3, S-4, S-5, S-6, S-7 |
| U1-6 | C-2 | P-2 | S-2, S-3 |
| U1-7 | C-3 | P-1, P-2, P-4, P-5 | S-1, S-2, S-3 |
| U1-8 | C-4 | P-1, P-2, P-4, P-5 | S-1, S-2, S-3 |
| U1-9 | C-5 | P-1, P-2 | S-1, S-2, S-3, S-8, S-9 |
| U1-10 | C-6 | P-1, P-2 | S-1, S-2, S-3, S-9, S-10 |
| U1-11 | C-7 | P-1, P-3 | S-2, S-3 |

More preferred is the use of the pesticidal mixtures PM of the invention for the protection of a plant against the harmful pests and fungi according to one row of the following table U2.

TABLE U2

| No | plant | pest | fungi |
|---|---|---|---|
| U2-1 | C-1a | P-1, P-2, P-3 | S-1, S-2, S-4, S-5, S-6, S-7 |
| U2-2 | C-1b | P-1, P-2, P-3 | S-1, S-2, S-4, S-5, S-6, S-7 |
| U2-3 | C-1c | P-1, P-2, P-3 | S-1, S-2, S-4, S-5, S-6, S-7 |
| U2-4 | C-1d | P-1, P-2, P-3 | S-1, S-2, S-4, S-5, S-6, S-7 |
| U2-5 | C-1e | P-1, P-2, P-3 | S-1, S-2, S-4, S-5, S-6, S-7 |
| U2-6 | C-2 | P-2 | S-2 |
| U2-7 | C-3 | P-1, P-2, P-4, P-5 | S-1, S-2 |
| U2-8 | C-4 | P-1, P-2, P-4, P-5 | S-1, S-2 |
| U2-9 | C-5 | P-1, P-2 | S-1, S-2, S-8, S-9 |
| U2-10 | C-6 | P-1, P-2 | S-1, S-2, S-9, S-10 |
| U2-11 | C-7 | P-1, P-3 | S-2 |

Particular preferred is the use of the pesticidal mixtures PM of the invention for the protection of a plant against the harmful pests and fungi according to one row of the following table V.

TABLE V

| No. | plant | pest | fungi |
|---|---|---|---|
| V-1 | C-1a | P-1 | S-1 |
| V-2 | C-1a | P-2 | S-1 |
| V-3 | C-1a | P-3 | S-1 |
| V-4 | C-1a | P-1 | S-2 |
| V-5 | C-1a | P-2 | S-2 |
| V-6 | C-1a | P-3 | S-2 |
| V-7 | C-1a | P-1 | S-3 |
| V-8 | C-1a | P-2 | S-3 |
| V-9 | C-1a | P-3 | S-3 |
| V-10 | C-1a | P-1 | S-4 |
| V-11 | C-1a | P-2 | S-4 |
| V-12 | C-1a | P-3 | S-4 |
| V-13 | C-1a | P-1 | S-5 |
| V-14 | C-1a | P-2 | S-5 |
| V-15 | C-1a | P-3 | S-5 |
| V-16 | C-1a | P-1 | S-6 |
| V-17 | C-1a | P-2 | S-6 |
| V-18 | C-1a | P-3 | S-6 |
| V-19 | C-1a | P-1 | S-7 |
| V-20 | C-1a | P-2 | S-7 |
| V-21 | C-1a | P-3 | S-7 |
| V-22 | C-1b | P-1 | S-1 |
| V-23 | C-1b | P-2 | S-1 |
| V-24 | C-1b | P-3 | S-1 |
| V-25 | C-1b | P-1 | S-2 |
| V-26 | C-1b | P-2 | S-2 |
| V-27 | C-1b | P-3 | S-2 |
| V-28 | C-1b | P-1 | S-3 |
| V-29 | C-1b | P-2 | S-3 |
| V-30 | C-1b | P-3 | S-3 |
| V-31 | C-1b | P-1 | S-4 |
| V-32 | C-1b | P-2 | S-4 |

TABLE V-continued

| No. | plant | pest | fungi |
| --- | --- | --- | --- |
| V-33 | C-1b | P-3 | S-4 |
| V-34 | C-1b | P-1 | S-5 |
| V-35 | C-1b | P-2 | S-5 |
| V-36 | C-1b | P-3 | S-5 |
| V-37 | C-1b | P-1 | S-6 |
| V-38 | C-1b | P-2 | S-6 |
| V-39 | C-1b | P-3 | S-6 |
| V-40 | C-1b | P-1 | S-7 |
| V-41 | C-1b | P-2 | S-7 |
| V-42 | C-1b | P-3 | S-7 |
| V-43 | C-1c | P-1 | S-1 |
| V-44 | C-1c | P-2 | S-1 |
| V-45 | C-1c | P-3 | S-1 |
| V-46 | C-1c | P-1 | S-2 |
| V-47 | C-1c | P-2 | S-2 |
| V-48 | C-1c | P-3 | S-2 |
| V-49 | C-1c | P-1 | S-3 |
| V-50 | C-1c | P-2 | S-3 |
| V-51 | C-1c | P-3 | S-3 |
| V-52 | C-1c | P-1 | S-4 |
| V-53 | C-1c | P-2 | S-4 |
| V-54 | C-1c | P-3 | S-4 |
| V-55 | C-1c | P-1 | S-5 |
| V-56 | C-1c | P-2 | S-5 |
| V-57 | C-1c | P-3 | S-5 |
| V-58 | C-1c | P-1 | S-6 |
| V-59 | C-1c | P-2 | S-6 |
| V-60 | C-1c | P-3 | S-6 |
| V-61 | C-1c | P-1 | S-7 |
| V-62 | C-1c | P-2 | S-7 |
| V-63 | C-1c | P-3 | S-7 |
| V-64 | C-1d | P-1 | S-1 |
| V-65 | C-1d | P-2 | S-1 |
| V-66 | C-1d | P-3 | S-1 |
| V-67 | C-1d | P-1 | S-2 |
| V-68 | C-1d | P-2 | S-2 |
| V-69 | C-1d | P-3 | S-2 |
| V-70 | C-1d | P-1 | S-3 |
| V-71 | C-1d | P-2 | S-3 |
| V-72 | C-1d | P-3 | S-3 |
| V-73 | C-1d | P-1 | S-4 |
| V-74 | C-1d | P-2 | S-4 |
| V-75 | C-1d | P-3 | S-4 |
| V-76 | C-1d | P-1 | S-5 |
| V-77 | C-1d | P-2 | S-5 |
| V-78 | C-1d | P-3 | S-5 |
| V-79 | C-1d | P-1 | S-6 |
| V-80 | C-1d | P-2 | S-6 |
| V-81 | C-1d | P-3 | S-6 |
| V-82 | C-1d | P-1 | S-7 |
| V-83 | C-1d | P-2 | S-7 |
| V-84 | C-1d | P-3 | S-7 |
| V-85 | C-1e | P-1 | S-1 |
| V-86 | C-1e | P-2 | S-1 |
| V-87 | C-1e | P-3 | S-1 |
| V-88 | C-1e | P-1 | S-2 |
| V-89 | C-1e | P-2 | S-2 |
| V-90 | C-1e | P-3 | S-2 |
| V-91 | C-1e | P-1 | S-3 |
| V-92 | C-1e | P-2 | S-3 |
| V-93 | C-1e | P-3 | S-3 |
| V-94 | C-1e | P-1 | S-4 |
| V-95 | C-1e | P-2 | S-4 |
| V-96 | C-1e | P-3 | S-4 |
| V-97 | C-1e | P-1 | S-5 |
| V-98 | C-1e | P-2 | S-5 |
| V-99 | C-1e | P-3 | S-5 |
| V-100 | C-1e | P-1 | S-6 |
| V-101 | C-1e | P-2 | S-6 |
| V-102 | C-1e | P-3 | S-6 |
| V-103 | C-1e | P-1 | S-7 |
| V-104 | C-1e | P-2 | S-7 |
| V-105 | C-1e | P-3 | S-7 |
| V-106 | C-2 | P-2 | S-2 |
| V-107 | C-2 | P-2 | S-3 |
| V-108 | C-3 | P-1 | S-1 |
| V-109 | C-3 | P-2 | S-1 |
| V-110 | C-3 | P-4 | S-1 |
| V-111 | C-3 | P-5 | S-1 |
| V-112 | C-3 | P-1 | S-2 |
| V-113 | C-3 | P-2 | S-2 |
| V-114 | C-3 | P-4 | S-2 |
| V-115 | C-3 | P-5 | S-2 |
| V-116 | C-3 | P-1 | S-3 |
| V-117 | C-3 | P-2 | S-3 |
| V-118 | C-3 | P-4 | S-3 |
| V-119 | C-3 | P-5 | S-3 |
| V-120 | C-4 | P-1 | S-1 |
| V-121 | C-4 | P-2 | S-1 |
| V-122 | C-4 | P-4 | S-1 |
| V-123 | C-4 | P-5 | S-1 |
| V-124 | C-4 | P-1 | S-2 |
| V-125 | C-4 | P-2 | S-2 |
| V-126 | C-4 | P-4 | S-2 |
| V-127 | C-4 | P-5 | S-2 |
| V-128 | C-4 | P-1 | S-3 |
| V-129 | C-4 | P-2 | S-3 |
| V-130 | C-4 | P-4 | S-3 |
| V-131 | C-4 | P-5 | S-3 |
| V-132 | C-5 | P-1 | S-1 |
| V-133 | C-5 | P-2 | S-1 |
| V-134 | C-5 | P-1 | S-2 |
| V-135 | C-5 | P-2 | S-2 |
| V-136 | C-5 | P-1 | S-3 |
| V-137 | C-5 | P-2 | S-3 |
| V-138 | C-5 | P-1 | S-8 |
| V-139 | C-5 | P-2 | S-8 |
| V-140 | C-5 | P-1 | S-9 |
| V-141 | C-5 | P-2 | S-9 |
| V-142 | C-6 | P-1 | S-1 |
| V-143 | C-6 | P-2 | S-1 |
| V-144 | C-6 | P-1 | S-2 |
| V-145 | C-6 | P-2 | S-2 |
| V-146 | C-6 | P-1 | S-3 |
| V-147 | C-6 | P-2 | S-3 |
| V-148 | C-6 | P-1 | S-9 |
| V-149 | C-6 | P-2 | S-9 |
| V-150 | C-6 | P-1 | S-10 |
| V-151 | C-6 | P-2 | S-10 |
| V-152 | C-7 | P-1 | S-2 |
| V-153 | C-7 | P-1 | S-3 |
| V-154 | C-7 | P-3 | S-2 |
| V-155 | C-7 | P-3 | S-3 |

As indicated in the above tables U1, U2, and V, thrips are of particular importance as harmful pests on soybean and cotton. Therefore, the present invention also relates in one embodiment to the use of the pesticidal mixtures PM of the invention for the protection of cotton against thrips (P-4) and preferably also against the harmful fungi S-1 and S-2. Furthermore, the present invention relates in one embodiment to the use of the pesticidal mixtures PM of the invention for the protection of soybean against thrips (P-4) and preferably also against at least one of the harmful fungi selected from S-1, S-2, *Phakopsora pachyrhizi*, and *P. meibomiae* (soybean rust). In one preferred embodiment, the present invention relates to the use of the pesticidal mixtures PM of the invention for the protection of soybean against thrips (P-4) and preferably also against at least one of the harmful fungi selected from S-1, and S-2. In another preferred embodiment, the present invention relates to the use of the pesticidal mixtures PM of the invention for the protection of soybean against thrips (P-4) and preferably also against at least one of the harmful fungi selected from *Phakopsora pachyrhizi*, and *P. meibomiae* (soybean rust).

In one preferred embodiment of said use, the phytopathogenic fungus is *Phakopsora pachyrhizi*.

In another preferred embodiment of said use, the phytopathogenic fungus is *P. meibomiae* (soybean rust).

Furthermore, aphids are of particular importance as harmful pests on most plants, in particular on cereals. Therefore, the present invention also relates in one embodiment to the use of the pesticidal mixtures PM of the invention for the protection of cereals selected from C-1a, C-1b, C-1c, C-1d, and C-1e, preferably from C-1b, C-1c, C-1d, and C-1e against aphids (P-1) and preferably also against at least one of the harmful fungi selected from S-1, S-2, S-4, S-5, S-6, and S-7.

Moreover, aphids and leafhoppers, in particular leafhoppers, are of particular relevance on potatoes. Furthermore, potatoes are particularly susceptible to phytopathogenic harmful fungi including *Phytophthora infestans, Alternaria solani, Rhizoctonia solani, Spongospora subterranea, Fusarium coeruleum, Synchytrium endobioticum, Helminthosporium solani, Fusarium oxysporum*, and *Colletotrichum coccodes*. Therefore the present invention also relates in one embodiment to the use of the pesticidal mixtures PM of the present invention for the protection of potatoes against aphids and/or leafhoppers and against one or more phytopathogenic harmful fungi selected from the group consisting of *Phytophthora infestans, Alternaria solani, Rhizoctonia solani, Spongospora subterranea, Fusarium coeruleum, Synchytrium endobioticum, Helminthosporium solani, Fusarium oxysporum*, and *Colletotrichum coccodes*.

In one preferred embodiment of said use, the phytopathogenic fungis is *Phytophthora infestans*.

In another preferred embodiment of said use, the phytopathogenic fungus is *Alternaria solani*.

In another preferred embodiment of said use, the phytopathogenic fungus is *Rhizoctonia solani*.

In another preferred embodiment of said use, the phytopathogenic fungus is *Spongospora subterranea*.

In another preferred embodiment of said use, the phytopathogenic fungus is *Fusarium coeruleum*.

In another preferred embodiment of said use, the phytopathogenic fungus is *Synchytrium endobioticum*.

In another preferred embodiment of said use, the phytopathogenic fungus is *Helminthosporium solani*.

In another preferred embodiment of said use, the phytopathogenic fungus is *Fusarium oxysporum*.

In another preferred embodiment of said use, the phytopathogenic fungus is *Colletotrichum coccodes*.

It is emphasized that not only the pesticidal mixtures PM of the present invention are suitable for the above uses in connection with potatoes, but also binary mixtures comprising a compound of formula I as defined above and a fungicide III as defined above.

As already indicated above, the present invention also relates to a seed treatment composition comprising a pesticidal mixture PM of the invention, in particular any one of the pesticidal mixtures listed in Groups 1 to 18, and at least one auxiliary, wherein the auxiliary is preferably selected from the group consisting of surfactants, antifreezing agents, binders, and pigments, and is particularly preferably a surfactant or a binder.

In a preferred embodiment, the seed treatment composition of the pesticidal mixture PM is in the form of a flowable concentrate FS, a solution LS, a powder for dry treatment DS, a water dispersible powder for slurry treatment WS, a water-soluble powder SS, an emulsion ES or EC, or a gel formulation, and is preferably in the form of a flowable concentrate FS.

The sead treatment compositions of the pesticidal mixtures PM are suitable for the same uses as defined above, with particular preference to the uses defined in tables U1, U2, and V.

Furthermore, the sead treatment compositions of the pesticidal mixtures PM may be applied in the method for controlling invertebrate pests and pythopathogenic harmful fungi as defined below.

The present invention also relates to seeds comprising a pesticidal mixture PM of the invention, in particular any one of the pesticidal mixtures listed in Groups 1 to 18, or a seed treatment composition thereof in an amount of from 0.01 g to 10000 g per 100 kg of seeds.

It is noted that the amount per 100 kg seeds is based on the weight of the pesticidal mixture PM irrespective of whether it is referred to the pesticidal mixture PM or the seed treatment composition thereof.

Preferred seeds are seeds selected from wheat, maize, barley, oat, rye, rice, soybean, cotton, sugarbeet, rapeseed, and potato, in particular from wheat, maize, barley, soybean, cotton, and rapeseed.

The present invention also relates to a method for controlling invertebrate pests and/or phytopathogenic harmful fungi on a plant selected from wheat, maize, barley, oat, rye, rice, soybean, cotton, sugarbeet, rapeseed, and potato comprising contacting the plant or the plant propagation material; the pest or its food supply, habitat or breeding ground; and/or the fungi or their habitat, with an effective amount of a pesticidal mixture PM as defined above, in particular any one of the pesticidal mixtures of Groups 1 to 18, or a seed treatment composition thereof.

Preferably, the method is suitable for both, controlling invertebrate pests and pythopathogenic harmful fungi. Furthermore, preference is given to plants, pests, and fungi as defined above, and in particular to the plant-pest-fungi correlations provided in the rows of tables U1, U2, and V.

The pesticidal mixtures A, B, C, D, E, and F are described hereinafter.

In one embodiment, the present invention therefore relates to a pesticidal mixture A, which comprises as component A1) at least one compound of formula I, which is selected from the compounds I-1 to I-18, and as component A2) tioxazafen.

Thus, the pesticidal mixtures A according to one row of the following table MA and being referred to as pesticidal mixtures A-MA-1 to A-MA-18 are preferred.

TABLE MA

| No. | A1) | A2) |
|---|---|---|
| MA-1 | I-1 | tioxazafen |
| MA-2 | I-2 | tioxazafen |
| MA-3 | I-3 | tioxazafen |
| MA-4 | I-4 | tioxazafen |
| MA-5 | I-5 | tioxazafen |
| MA-6 | I-6 | tioxazafen |
| MA-7 | I-7 | tioxazafen |
| MA-8 | I-8 | tioxazafen |
| MA-9 | I-9 | tioxazafen |
| MA-10 | I-10 | tioxazafen |
| MA-11 | I-11 | tioxazafen |
| MA-12 | I-12 | tioxazafen |
| MA-13 | I-13 | tioxazafen |
| MA-14 | I-14 | tioxazafen |
| MA-15 | I-15 | tioxazafen |
| MA-16 | I-16 | tioxazafen |
| MA-17 | I-17 | tioxazafen |
| MA-18 | I-18 | tioxazafen |

Preferred weight ratio ranges of component A1) to component A2) are in the range of from 100:1 to 1:100, more preferably 10:1 to 1:10, e.g. from 2:1 to 1:2. It can be preferred that an excess of component A1) compared to component A2) is used. It can also be preferred that an excess of component A2) compared to component A1) is used. In principal, the amounts of component A1) and A2) are selected as such that a synergistic effect in terms of the insecticidal activity can be observed.

In a preferred embodiment, the pesticidal mixtures A, in particular the pesticidal mixtures A-MA-1 to A-MA-18, are binary mixtures, which means that the mixtures do not comprise a further pesticidally active compound.

In another preferred embodiment, the pesticidal mixtures A, in particular the pesticidal mixtures A-MA-1 to A-MA-18, may comprise one further pesticide in addition to components A1) and A2). If a pesticidal mixture A comprises a further pesticide, said pesticide is preferably not a Ryanodine receptor-modulator from the class of diamide compounds. Preferably, said further pesticide is not an anthranilamide compound. In particular, said further pesticide is not a compound selected from M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(tri-fluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; and M.28.5h) N-[4,6-dibromo-2-[(diethyl-lambda-4-sulfanylidene)carbamoyl]-phenyl]-2-(3-chloro-2-pyridyl)-5-(trifluoromethyl) pyrazole-3-carboxamide.

In another embodiment, the present invention relates to a pesticidal mixture B, which comprises as component B1) at least one compound of formula I, which is selected from the compounds I-1 to I-18, and as component B2) tetraniliprole.

Thus, the pesticidal mixtures B according to one row of the following table MB and being referred to as pesticidal mixtures B-MB-1 to B-MB-18 are preferred.

TABLE MB

| No. | B1) | B2) |
|---|---|---|
| MB-1 | I-1 | tetraniliprole |
| MB-2 | I-2 | tetraniliprole |
| MB-3 | I-3 | tetraniliprole |
| MB-4 | I-4 | tetraniliprole |
| MB-5 | I-5 | tetraniliprole |
| MB-6 | I-6 | tetraniliprole |
| MB-7 | I-7 | tetraniliprole |
| MB-8 | I-8 | tetraniliprole |
| MB-9 | I-9 | tetraniliprole |
| MB-10 | I-10 | tetraniliprole |
| MB-11 | I-11 | tetraniliprole |
| MB-12 | I-12 | tetraniliprole |
| MB-13 | I-13 | tetraniliprole |
| MB-14 | I-14 | tetraniliprole |
| MB-15 | I-15 | tetraniliprole |
| MB-16 | I-16 | tetraniliprole |
| MB-17 | I-17 | tetraniliprole |
| MB-18 | I-18 | tetraniliprole |

Preferred weight ratio ranges of component B1) to component B2) are in the range of from 100:1 to 1:100, more preferably 10:1 to 1:10, e.g. from 2:1 to 1:2. It can be preferred that an excess of component B1) compared to component B2) is used. It can also be preferred that an excess of component B2) compared to component B1) is used. Preferably, the amounts of component B1) and B2) are selected as such that a synergistic effect in terms of the insecticidal activity can be observed.

In a preferred embodiment, the pesticidal mixtures B, in particular the pesticidal mixtures B-MB-1 to B-MB-18, are binary mixtures, which means that the mixtures do not comprise a further pesticidally active compound.

In another preferred embodiment, the pesticidal mixtures B, in particular the pesticidal mixtures B-MB-1 to B-MB-18, may comprise one further pesticide in addition to components B1) and B2). If a pesticidal mixture B comprises a further pesticide, said pesticide is preferably not a Ryanodine receptor-modulator from the class of diamide compounds. Preferably, said further pesticide is not an anthranilamide compound. In particular, said further pesticide is not a compound selected from M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; and M.28.5h) N-[4,6-dibromo-2-[(diethyl-lambda-4-sulfanylidene)carbamoyl]-phenyl]-2-(3-chloro-2-pyridyl)-5-(trifluoromethyl) pyrazole-3-carboxamide.

In another embodiment, the present invention relates to a pesticidal mixture C, which comprises as component C1) at least one compound of formula I, which is selected from the compounds I-1 to I-18, and as component C2) broflanilide.

Thus, the pesticidal mixtures C according to one row of the following table MC and being referred to as pesticidal mixtures C-MC-1 to C-MC-18 are preferred.

TABLE MC

| No. | C1) | C2) |
|---|---|---|
| MC-1 | I-1 | broflanilide |
| MC-2 | I-2 | broflanilide |
| MC-3 | I-3 | broflanilide |
| MC-4 | I-4 | broflanilide |
| MC-5 | I-5 | broflanilide |
| MC-6 | I-6 | broflanilide |
| MC-7 | I-7 | broflanilide |
| MC-8 | I-8 | broflanilide |
| MC-9 | I-9 | broflanilide |
| MC-10 | I-10 | broflanilide |
| MC-11 | I-11 | broflanilide |
| MC-12 | I-12 | broflanilide |
| MC-13 | I-13 | broflanilide |
| MC-14 | I-14 | broflanilide |
| MC-15 | I-15 | broflanilide |
| MC-16 | I-16 | broflanilide |
| MC-17 | I-17 | broflanilide |
| MC-18 | I-18 | broflanilide |

Preferred weight ratio ranges of component C1) to component C2) are in the range of from 100:1 to 1:100, more preferably 10:1 to 1:10, e.g. from 2:1 to 1:2. It can be preferred that an excess of component C1) compared to component C2) is used. It can also be preferred that an excess of component C2) compared to component C1) is used. Preferably, the amounts of component C1) and C2) are selected as such that a synergistic effect in terms of the insecticidal activity can be observed.

In a preferred embodiment, the pesticidal mixtures C, in particular the pesticidal mixtures C-MC-1 to C-MC-18, are binary mixtures.

In another preferred embodiment, the pesticidal mixtures C, in particular the pesticidal mixtures C-MC-1 to C-MC-18, may comprise one further pesticide in addition to components C1) and C2).

For example, the pesticidal mixtures C, in particular the pesticidal mixtures C-MC-1 to C-MC-18, may in one embodiment additionally comprise at least one fungicide III as defined above in table III, i.e. at least one fungicide III selected from the fungicides III-1 to III-33.

In one embodiment, the invention relates to mixtures C-MC-1, which additionally comprise at least one fungicide selected from the fungicides III-1 to III-33, the individual mixtures being referred to as C-MC-1-III-1 to C-MC-1-III-33.

In another embodiment, the invention relates to mixtures C-MC-2, which additionally comprise at least one fungicide selected from the fungicides III-1 to III-33, the individual mixtures being referred to as C-MC-2-III-1 to C-MC-2-III-33.

In another embodiment, the invention relates to mixtures C-MC-3, which additionally comprise at least one fungicide selected from the fungicides III-1 to III-33, the individual mixtures being referred to as C-MC-3-III-1 to C-MC-3-III-33.

In another embodiment, the invention relates to mixtures C-MC-4, which additionally comprise at least one fungicide selected from the fungicides III-1 to III-33, the individual mixtures being referred to as C-MC-4-III-1 to C-MC-4-III-33.

In another embodiment, the invention relates to mixtures C-MC-5, which additionally comprise at least one fungicide selected from the fungicides III-1 to III-33, the individual mixtures being referred to as C-MC-5-III-1 to C-MC-5-III-33.

In another embodiment, the invention relates to mixtures C-MC-6, which additionally comprise at least one fungicide selected from the fungicides III-1 to III-33, the individual mixtures being referred to as C-MC-6-III-1 to C-MC-6-III-33.

In another embodiment, the invention relates to mixtures C-MC-7, which additionally comprise at least one fungicide selected from the fungicides III-1 to III-33, the individual mixtures being referred to as C-MC-7-III-1 to C-MC-7-III-33.

In another embodiment, the invention relates to mixtures C-MC-8, which additionally comprise at least one fungicide selected from the fungicides III-1 to III-33, the individual mixtures being referred to as C-MC-8-III-1 to C-MC-8-III-33.

In another embodiment, the invention relates to mixtures C-MC-9, which additionally comprise at least one fungicide selected from the fungicides III-1 to III-33, the individual mixtures being referred to as C-MC-9-III-1 to C-MC-9-III-33.

In another embodiment, the invention relates to mixtures C-MC-10, which additionally comprise at least one fungicide selected from the fungicides III-1 to III-33, the individual mixtures being referred to as C-MC-10-III-1 to C-MC-10-III-33.

In another embodiment, the invention relates to mixtures C-MC-11, which additionally comprise at least one fungicide selected from the fungicides III-1 to III-33, the individual mixtures being referred to as C-MC-11-III-1 to C-MC-11-III-33.

In another embodiment, the invention relates to mixtures C-MC-12, which additionally comprise at least one fungicide selected from the fungicides III-1 to III-33, the individual mixtures being referred to as C-MC-12-III-1 to C-MC-12-III-33.

In another embodiment, the invention relates to mixtures C-MC-13, which additionally comprise at least one fungicide selected from the fungicides III-1 to III-33, the individual mixtures being referred to as C-MC-13-III-1 to C-MC-13-III-33.

In another embodiment, the invention relates to mixtures C-MC-14, which additionally comprise at least one fungicide selected from the fungicides III-1 to III-33, the individual mixtures being referred to as C-MC-14-III-1 to C-MC-14-III-33.

In another embodiment, the invention relates to mixtures C-MC-15, which additionally comprise at least one fungicide selected from the fungicides III-1 to III-33, the individual mixtures being referred to as C-MC-15-III-1 to C-MC-15-III-33.

In another embodiment, the invention relates to mixtures C-MC-16, which additionally comprise at least one fungicide selected from the fungicides III-1 to III-33, the individual mixtures being referred to as C-MC-16-III-1 to C-MC-16-III-33.

In another embodiment, the invention relates to mixtures C-MC-17, which additionally comprise at least one fungicide selected from the fungicides III-1 to III-33, the individual mixtures being referred to as C-MC-17-III-1 to C-MC-17-III-33.

In another embodiment, the invention relates to mixtures C-MC-18, which additionally comprise at least one fungicide selected from the fungicides III-1 to III-33, the individual mixtures being referred to as C-MC-18-III-1 to C-MC-18-III-33.

Furthermore, the pesticidal mixtures C, in particular the pesticidal mixtures C-MC-1 to C-MC-18, may in one embodiment additionally comprise at least one insecticide II as defined above in table II, i.e. at least one insecticide II selected from the insecticides II-1 to II-20, or II-21 to II-24.

In one embodiment, the invention relates to mixtures C-MC-1, which additionally comprise at least one insecticide selected from insecticides I-1 to II-20, or II-21 to II-24, the individual mixtures being referred to as C-MC-1-II-1 to C-MC-1-II-20, and C-MC-1-II-21 to C-MC-1-II-24, resp.

In one embodiment, the invention relates to mixtures C-MC-2, which additionally comprise at least one insecticide selected from insecticides II-1 to II-20, or II-21 to II-24, the individual mixtures being referred to as C-MC-2-II-1 to C-MC-2-II-20, and C-MC-2-II-21 to C-MC-2-II-24, resp.

In one embodiment, the invention relates to mixtures C-MC-3, which additionally comprise at least one insecticide selected from insecticides II-1 to II-20, or II-21 to II-24, the individual mixtures being referred to as C-MC-3-II-1 to C-MC-3-II-20, and C-MC-3-II-21 to C-MC-3-II-24, resp.

In one embodiment, the invention relates to mixtures C-MC-4, which additionally comprise at least one insecticide selected from insecticides II-1 to II-20, or II-21 to II-24, the individual mixtures being referred to as C-MC-4-II-1 to C-MC-4-II-20, and C-MC-4-II-21 to C-MC-4-II-24, resp.

In one embodiment, the invention relates to mixtures C-MC-5, which additionally comprise at least one insecticide selected from insecticides II-1 to II-20, or II-21 to II-24, the individual mixtures being referred to as C-MC-5-II-1 to C-MC-5-II-20, and C-MC-5-II-21 to C-MC-5-II-24, resp.

In one embodiment, the invention relates to mixtures C-MC-6, which additionally comprise at least one insecticide selected from insecticides II-1 to II-20, or II-21 to II-24, the individual mixtures being referred to as C-MC-6-II-1 to C-MC-6-II-20, and C-MC-6-II-21 to C-MC-6-II-24, resp.

In one embodiment, the invention relates to mixtures C-MC-7, which additionally comprise at least one insecticide selected from insecticides II-1 to II-20, or II-21 to II-24, the individual mixtures being referred to as C-MC-7-II-1 to C-MC-7-II-20, and C-MC-7-II-21 to C-MC-7-II-24, resp.

In one embodiment, the invention relates to mixtures C-MC-8, which additionally comprise at least one insecticide selected from insecticides II-1 to II-20, or II-21 to II-24, the individual mixtures being referred to as C-MC-8-II-1 to C-MC-8-II-20, and C-MC-8-II-21 to C-MC-8-II-24, resp.

In one embodiment, the invention relates to mixtures C-MC-9, which additionally comprise at least one insecticide selected from insecticides II-1 to II-20, or II-21 to II-24, the individual mixtures being referred to as C-MC-9-II-1 to C-MC-9-II-20, and C-MC-9-II-21 to C-MC-9-II-24, resp.

In one embodiment, the invention relates to mixtures C-MC-10, which additionally comprise at least one insecticide selected from insecticides II-1 to II-20, or II-21 to II-24, the individual mixtures being referred to as C-MC-10-II-1 to C-MC-10-II-20, and C-MC-10-II-21 to C-MC-10-II-24, resp.

In one embodiment, the invention relates to mixtures C-MC-11, which additionally comprise at least one insecticide selected from insecticides II-1 to II-20, or II-21 to II-24, the individual mixtures being referred to as C-MC-12-II-1 to C-MC-11-II-20, and C-MC-11-II-21 to C-MC-11-II-24, resp.

In one embodiment, the invention relates to mixtures C-MC-12, which additionally comprise at least one insecticide selected from insecticides II-1 to II-20, or II-21 to II-24, the individual mixtures being referred to as C-MC-12-II-1 to C-MC-12-II-20, and C-MC-12-II-21 to C-MC-12-II-24, resp.

In one embodiment, the invention relates to mixtures C-MC-13, which additionally comprise at least one insecticide selected from insecticides II-1 to II-20, or II-21 to II-24, the individual mixtures being referred to as C-MC-13-II-1 to C-MC-13-II-20, and C-MC-13-II-21 to C-MC-13-II-24, resp.

In one embodiment, the invention relates to mixtures C-MC-14, which additionally comprise at least one insecticide selected from insecticides II-1 to II-20, or II-21 to II-24, the individual mixtures being referred to as C-MC-14-II-1 to C-MC-14-II-20, and C-MC-14-II-21 to C-MC-14-II-24, resp.

In one embodiment, the invention relates to mixtures C-MC-15, which additionally comprise at least one insecticide selected from insecticides II-1 to II-20, or II-21 to II-24, the individual mixtures being referred to as C-MC-15-II-1 to C-MC-15-II-20, and C-MC-15-II-21 to C-MC-15-II-24, resp.

In one embodiment, the invention relates to mixtures C-MC-16, which additionally comprise at least one insecticide selected from insecticides II-1 to II-20, or II-21 to II-24, the individual mixtures being referred to as C-MC-16-II-1 to C-MC-16-II-20, and C-MC-16-II-21 to C-MC-16-II-24, resp.

In one embodiment, the invention relates to mixtures C-MC-17, which additionally comprise at least one insecticide selected from insecticides II-1 to II-20, or II-21 to II-24, the individual mixtures being referred to as C-MC-17-II-1 to C-MC-17-II-20, and C-MC-17-II-21 to C-MC-17-II-24, resp.

In one embodiment, the invention relates to mixtures C-MC-18, which additionally comprise at least one insecticide selected from insecticides II-1 to II-20, or II-21 to II-24, the individual mixtures being referred to as C-MC-18-II-1 to C-MC-18-II-20, and C-MC-18-II-21 to C-MC-18-II-24, resp.

With regard to preferred uses, methods, seed treatment compositions, and seeds in connection with the above defined mixtures A, B, C, D, E, and F reference is made to the preferred embodiments defined in connection with the pesticidal mixtures PM, in particular the preferences in terms of pests, fungi and plants, especially the preferences provided in tables U1, U2, and V.

With regard to all the pesticidal mixtures defined herein, i.e. pesticidal mixture PM as well as pesticidal mixtures A, B, C, D, E, and F, the following embodiments are additionally preferred. When it is in the following referred to the "mixture(s) of the present invention" or "mixture(s) according to the invention", these terms are intended to refer to each pesticidal mixture PM, A, B, C, D, E, and F individually.

The mixtures of the present invention may be combined and applied in mixture with other active ingredients, for example with other pesticides, insecticides, nematicides, fungicides, herbicides, safeners, fertilizers such as ammonium nitrate, urea, potash, and superphosphate, phytotoxicants and plant growth regulators.

These additional ingredients may be used sequentially or in combination with the mixtures of the invention, if appropriate also added only immediately prior to use (tank mix). For example, the plant(s) may be sprayed with a mixture of this invention either before or after being treated with other active ingredients.

The invention also relates to agrochemical compositions comprising an auxiliary and at least one mixture of the present invention.

An agrochemical composition comprises a pesticidally effective amount of a mixture of the present invention. The term "pesticidally effective amount" is defined below.

The mixtures of the present invention can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclo-hexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, lime-stone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl-naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the mixtures of the present invention on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazoli-nones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-Soluble Concentrates (SL, LS)
10-60 wt % of the mixture according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.
ii) Dispersible Concentrates (DC)
5-25 wt % of the mixture according to the invention and 1-10 wt % dispersant (e. g. polyvinylpyrrolidone) are dissolved in up to 100 wt % organic solvent (e.g. cyclohexanone). Dilution with water gives a dispersion.
iii) Emulsifiable Concentrates (EC)
15-70 wt % of the mixture according to the invention and 5-10 wt % emulsifiers (e.g. calcium do-decylbenzenesulfonate and castor oil ethoxylate) are dissolved in up to 100 wt % water-insoluble organic solvent (e.g. aromatic hydrocarbon). Dilution with water gives an emulsion.
iv) Emulsions (EW, EO, ES)
5-40 wt % of the mixture according to the invention and 1-10 wt % emulsifiers (e.g. calcium do-decylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.
v) Suspensions (SC, OD, FS)
In an agitated ball mill, 20-60 wt % of the mixture according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active sub-stance. For FS type composition up to 40 wt % binder (e.g. polyvinylalcohol) is added.
vi) Water-Dispersible Granules and Water-Soluble Granules (WG, SG)

50-80 wt % of the mixture according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of the mixture according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of the mixture according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)

5-20 wt % of the mixture according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt % of the mixture according to the invention, 0-40 wt % water insoluble organic solvent (e.g. aromatic hydrocarbon), 2-15 wt % acrylic monomers (e.g. methyl-methacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of the mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylene-diamine) results in the formation of a polyurea microcapsule. The monomers amount to 1-10 wt %. The wt % relate to the total CS composition.

xi) Dustable Powders (DP, DS)

1-10 wt % of a the mixture according to the invention are ground finely and mixed intimately with up to 100 wt % solid carrier, e.g. finely divided kaolin.

xii) Granules (GR, FG)

0.5-30 wt % of the mixture according to the invention is ground finely and associated with up to 100 wt % solid carrier (e.g. silicate). Granulation is achieved by extrusion, spray-drying or the fluidized bed.

xiii) Ultra-Low Volume Liquids (UL)

1-50 wt % of the mixture according to the invention are dissolved in up to 100 wt % organic solvent, e.g. aromatic hydrocarbon.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions com¬prising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage de-vice, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e.g. components comprising mixtures of the present invention, may be mixed by the user in a spray tank and further auxiliaries and additives may be added, if appropriate.

In a further embodiment, either individual components of the composition according to the invention or partially premixed components, e. g. components comprising mixtures of the present invention, can be applied jointly (e.g. after tank mix) or consecutively.

The mixtures of the present invention are suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of a mixture of the present invention.

The mixtures of the present invention are also suitable for use in combating or controlling animal pests. Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of a mixture of the present invention.

The mixtures of the present invention are effective through both contact and ingestion. Furthermore, the mixtures of the present invention can be applied to any and all developmental stages, such as egg, larva, pupa, and adult.

The mixtures of the present invention can be applied as such or in form of compositions comprising them as defined above. Furthermore, the mixtures of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active mixture to the furrow, and closing the furrow.

Foliar application refers to the application of the pesticidally active mixture to plant foliage, e.g. through spray equipment. For foliar applications, it can be advantageous to modify the behavior of the pests by use of pheromones in combination with the mixtures of the present invention. Suitable pheromones for specific crops and pests are known to a skilled person and publicly available from databases of pheromones and semiochemicals, such as http://www.pherobase.com.

As used herein, the term "contacting" includes both direct contact (applying the mixtures/compositions directly on the animal pest or plant—typically to the foliage, stem or roots of the plant) and indirect contact (applying the mixtures/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including wild type plants and plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, eucalyptus, flax, lentil, maize, melon, papaya, petunia, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is per-formed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and LibertyLink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under trade names including WideStrike®, Bollgard®, Agrisure®, HercuLex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agri-biotech Applications (ISAAA)" (http://www.isaaa.org/gmapprovaldatabase) and "Center for Environmental Risk Assessment (CERA)" (http://ceragmc.org/GMCropDatabase).

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be trans-planted after germination or after emergence from soil, may also be included. These plant propagation materials may be treated prophylactically with a plant protection mixture either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The mixtures of the present invention are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a mixture of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active mixture is carried out by spraying or by dusting the seeds before sowing of the plants and before emergence of the plants.

The present invention also comprises seeds coated with or containing the active mixture. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the active mixture may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the mixtures of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the mixtures of the invention are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising a mixture of the present invention, or an agriculturally useful salt thereof, as defined herein. The amount of the mixture of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The mixtures of the present invention may also be used for improving the health of a plant. Therefore, the present invention also relates to a method for improving plant health by treating a plant, plant propagation material and/or the locus where the plant is growing or is to grow with an effective and non-phytotoxic amount of a mixture of the present invention.

As used herein "an effective and non-phytotoxic amount" means that the mixture is used in a quantity which allows to obtain the desired effect but which does not give rise to any phytotoxic symptom on the treated plant or on the plant grown from the treated propagule or treated soil.

The terms "plant" and "plant propagation material" are defined above.

"Plant health" is defined as a condition of the plant and/or its products which is determined by several aspects alone or in combination with each other such as yield (for example increased bio-mass and/or increased content of valuable ingredients), quality (for example improved content or composition of certain ingredients or shelf life), plant vigour (for example improved plant growth and/or greener leaves ("greening effect"), tolerance to abiotic (for example drought) and/or bio-tic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The mixtures of the invention are also suitable for use against non-crop insect pests. For use against said non-crop pests, mixtures of the present invention can be used as bait composition, gel, general insect spray, aerosol, as ultra-low volume application and bed net (impregnated or surface applied). Furthermore, drenching and rodding methods can be used.

As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. http://www.pherobase.com), and are known to those skilled in the art.

For use in bait compositions, the typical content of active ingredient is from 0.001 weight % to 15 weight %, desirably from 0.001 weight % to 5% weight % of active mixture.

Formulations of the mixtures of the present invention as aerosols (e.g in spray cans), oil sprays or pump sprays are highly suitable for the non-professional user for controlling pests such as flies, fleas, ticks, mosquitos or cockroaches. Aerosol recipes are preferably composed of the active mixture, solvents, furthermore auxiliaries such as emulsifiers, perfume oils, if appropriate stabilizers, and, if required, propellants.

The oil spray formulations differ from the aerosol recipes in that no propellants are used.

For use in spray compositions, the content of active ingredient is from 0.001 to 80 weights %, preferably from 0.01 to 50 weight % and most preferably from 0.01 to 15 weight %.

The mixtures of the present invention and its respective compositions can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with mixtures of the present invention and its respective compositions also comprise treating surfaces of huts and houses, air spraying and impregnation of curtains, tents, clothing items, bed nets, tsetse-fly trap or the like. Insecticidal compositions for application to fibers, fabric, knitgoods, nonwovens, netting material or foils and tarpaulins preferably comprise a mixture including the insecticide, optionally a repellent and at least one binder.

The mixtures of the present invention and its compositions can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active mixture per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

The mixtures of the present invention are especially suitable for efficiently combating animal pests such as arthropods, gastropods and nematodes including but not limited to: insects from the order of Lepidoptera, for example *Achroia grisella, Acleris* spp. such as *A. fimbriana, A. gloverana, A. variana; Acrolepiopsis assectella, Acronicta major, Adoxophyes* spp. such as *A. cyrtosema, A. orana; Aedia leucomelas, Agrotis* spp. such as *A. exclamationis, A. fucosa, A. ipsilon, A. orthogoma, A. segetum, A. subterranea; Alabama argillacea, Aleurodicus dispersus, Alsophila pometaria, Ampelophaga rubiginosa, Amyelois transitella, Anacampsis sarcitella, Anagasta kuehniella, Anarsia lineatella, Anisota senatoria, Antheraea pernyi, Anticarsia (=Thermesia)* spp. such as *A. gemmatalis; Apamea* spp., *Aproaerema modicella, Archips* spp. such as *A. argyrospila, A. fuscocupreanus, A. rosana, A. xyloseanus; Argyresthia conjugella, Argyroploce* spp., *Argyrotaenia* spp. such as *A. velutinana; Athetis mindara, Austroasca viridigrisea, Autographa gamma, Autographa nigrisigna, Barathra brassicae, Bedellia* spp., *Bonagota salubricola, Borbo cinnara, Bucculatrix thurberiella, Bupalus piniarius, Busseola* spp., *Cacoecia* spp. such as *C. murinana, C podana; Cactoblastis cactorum, Cadra cautella, Calingo braziliensis, Caloptilis theivora, Capua reticulana, Carposina* spp. such as *C. niponensis, C. sasakii, Cephus* spp.,

*Chaetocnema aridula, Cheimatobia brumata, Chilo* spp. such as *C. Indicus, C. suppressalis, C. partellus; Choreutis pariana, Choristoneura* spp. such as *C. conflictana, C. fumiferana, C. longicellana, C. murinana, C. occidentalis, C. rosaceana; Chrysodeixis* (=*Pseudoplusia*) spp. such as *C. eriosoma, C. includens; Cirphis unipuncta, Clysia ambiguella, Cnaphalocerus* spp., *Cnaphalocrocis medinalis, Cnephasia* spp., *Cochylis hospes, Coleophora* spp., *Colias eurytheme, Conopomorpha* spp., *Conotrachelus* spp., *Copitarsia* spp., *Corcyra cephalonica, Crambus caliginosellus, Crambus teterrellus, Crocidosema* (=*Epinotia*) *aporema, Cydalima* (=*Diaphania*) *perspectalis, Cydia* (=*Carpocapsa*) spp. such as *C. pomonella, C. latiferreana; Dalaca noctuides, Datana integerrima, Dasychira pinicola, Dendrolimus* spp. such as *D. pini, D. spectabilis, D. sibiricus; Desmia funeralis, Diaphania* spp. such as *D. nitidalis, D. hyalinata; Diatraea grandiosella, Diatraea saccharalis, Diphthera festiva, Earias* spp. such as *E. insulana, E. vittella; Ecdytolopha aurantianu, Egira* (=*Xylomyges*) *curialis, Elasmopalpus lignosellus, Eldana saccharina, Endopiza viteana, Ennomos subsignaria, Eoreuma loftini, Ephestia* spp. such as *E. cautella, E. elutella, E. kuehniella; Epinotia aporema, Epiphyas postvittana, Erannis tiliaria, Erionota thrax, Etiella* spp., *Eulia* spp., *Eupoecilia ambiguella, Euproctis chrysorrhoea, Euxoa* spp., *Evetria bouliana, Faronta albilinea, Feltia* spp. such as *F. subterranean; Galleria mellonella, Gracillaria* spp., *Grapholita* spp. such as *G. funebrana, G. molesta, G. inopinata; Halysidota* spp., *Harrisina americana, Hedylepta* spp., *Helicoverpa* spp. such as *H. armigera* (=*Heliothis armigera*), *H. zea* (=*Heliothis zea*); *Heliothis* spp. such as *H. assulta, H. subflexa, H. virescens, Hellula* spp. such as *H. undalis, H. rogatalis Helocoverpa gelotopoeon, Hemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma salicis, Leucoptera* spp. such as *L. coffeella, L. scitella; Leuminivora lycinivorella, Lithocolletis blancardella, Lithophane antennata, Llattia octo* (=*Amyna axis*), *Lobesia botrana, Lophocampa* spp., *Loxagrotis albicosta, Loxostege* spp. such as *L. sticticalis, L. cereralis; Lymantria* spp. such as *L. dispar, L. monacha; Lyonetia clerkella, Lyonetia prunifoliella, Malacosoma* spp. such as *M. americanum, M. californicum, M. constrictum, M. neustria; Mamestra* spp. such as *M. brassicae, M. configurata; Mamstra brassicae, Manduca* spp. such as *M. quinquemaculata, M. sexta; Marasmia* spp, *Marmara* spp., *Maruca testulalis, Megalopyge lanata, Melanchra picta, Melanitis leda, Mocis* spp. such as *M. lapites, M. repanda; Mocis latipes, Monochroa fragariae, Mythimna separata, Nemapogon cloacella, Neoleucinodes elegantalis, Nepytia* spp., *Nymphula* spp., *Oiketicus* spp., *Omiodes indicata, Omphisa anastomosalis, Operophtera brumata, Orgyia pseudotsugata, Oria* spp., *Orthaga thyrisalis, Ostrinia* spp. such as *O. nubilalis; Oulema oryzae, Paleacrita vernata, Panolis flammea, Parnara* spp., *Papaipema nebris, Papilio cresphontes, Paramyelois transitella, Paranthrene regalis, Paysandisia archon, Pectinophora* spp. such as *P. gossypiella; Peridroma saucia, Perileucoptera* spp., such as *P. coffeella; Phalera bucephala, Phryganidia californica, Phthorimaea* spp. such as *P. operculella; Phyllocnistis citrella, Phyllonorycter* spp. such as *P. blancardella, P. crataegella, P. issiki, P. ringoniella; Pieris* spp. such as *P. brassicae, P. rapae, P. napi; Pilocrocis tripunctata, Plathypena scabra, Platynota* spp. such as *P. flavedana, P. idaeusalis, P. stultana; Platyptilia carduidactyla, Plebejus argus, Plodia interpunctella, Plusia* spp, *Plutella maculipennis, Plutella xylostella, Pontia protodica, Prays* spp.; *Prodenia* spp., *Proxenus lepigone, Pseudaletia* spp. such as *P. sequax, P. unipuncta, Pyrausta nubilalis, Rachiplusia nu, Richia albicosta, Rhizobius ventralis, Rhyacionia frustrana, Sabulodes aegrotata, Schizura concinna, Schoenobius* spp., *Schreckensteinia festaliella, Scirpophaga* spp. such as *S. incertulas, S. innotata; Scotia segetum, Sesamia* spp. such as *S. inferens, Seudyra subflava, Sitotroga cerealella, Sparganothis pilleriana, Spilonota lechriaspis, S. ocellana, Spodoptera* (=*Lamphygma*) spp. such as *S. eridania, S. exigua, S. frugiperda, S. latisfascia, S. littoralis, S. litura, S. omithogali, Stigmella* spp., *Stomopteryx subsecivella, Strymon bazochii, Sylepta derogata, Synanthedon* spp. such as *S. exitiosa, Tecia solanivora, Telehin licus, Thaumatopoea pityocampa, Thaumatotibia* (=*Cryptophlebia*) *leucotreta, Thaumetopoea pityocampa, Thecla* spp., *Theresimima ampelophaga, Thyrinteina* spp, *Tildenia inconspicuella, Tinea* spp. such as *T. cloacella, T. pellionella; Tineola bisselliella, Tortrix* spp. such as *T. viridana; Trichophaga tapetzella, Trichoplusia* spp. such as *T. ni; Tuta* (=*Scrobipalpula*) *absoluta, Udea* spp. such as *U. rubigalis, U. rubigalis; Virachola* spp., *Yponomeuta padella*, and *Zeiraphera canadensis;* insects from the order of Coleoptera, for example *Acalymma vittatum, Acanthoscehdes obtectus, Adoretus* spp., *Agelastica alni, Agrilus* spp. such as *A. anxius, A. planipennis, A. sinuatus; Agriotes* spp. such as *A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabripennis; Anthonomus* spp. such as *A. eugenii, A. grandis, A. pomorum; Anthrenus* spp., *Aphthona euphoridae, Apion* spp., *Apogonia* spp., *Athous haemorrhoidalis, Atomaria* spp. such as *A. linearis, Attagenus* spp., *Aulacophora femoralis, Blastophagus piniperda, Blitophaga undata, Bruchidius obtectus, Bruchus* spp. such as *B. lentis, B. pisorum, B. rufimanus; Byctiscus betulae, Callidiellum rufipenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C napi, Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicornis, D. semipunctata, D. virgifera; Diaprepes abbreviates, Dichocrocis* spp., *Dic/ladispa armigera, Diloboderus abderus, Diocalandra frumenti* (*Diocalandra stigmaticollis*), *Enaphalodes rufulus, Epilachna* spp. such as *E. varivestis, E. vigintioctomaculata; Epitrix* spp. such as *E. hirtipennis, E. similaris, Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus, Hypera* spp. such as *H. brunneipennis, H. postica; Hypomeces squamosus, Hypothenemus* spp., *Ips typographus, Lachnosterna consanguinea, Lasioderma serricome, Latheticus oryzae, Lathridius* spp. such as *L. bilineata, L. melanopus; Leptinotarsa* spp. such as *L. decemlineata; Leptispa pygmaea, Limonius californicus, Lissorhoptrus oryzophilus,*

*Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. melolontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetoniajucunda, Phaedon* spp. such as *P. brassicae, P. cochleariae Phoracantha recurva, Phyllobius pyri Phyllopertha horticola, Phyllophaga* spp. such as *P. helleri; Phyllotreta* spp. such as *P. chrysocephala, P. nemorum, P. striolata, P. vittula; Phyllopertha horticola, Popillia japonica, Premnotrypes* spp., *Psacothea hilaris, Psylliodes chrysocephala, Prostephanus truncates, Psylliodes* spp., *Ptinus* spp., *Pulga saltona, Rhizopertha dominica, Rhynchophorus* spp. such as *R. billineatus, R. ferrugineus, R. palmarum, R. phoenicis, R. vulneratus; Saperda candida, Scolytus schevyrewi, Scyphophorus acupunctatus, Sitona lineatus, Sitophilus* spp. such as *S. granaria, S. oryzae, S zeamais; Sphenophorus* spp. such as *S. levis, Stegobium paniceum, Sternechus* spp. such as *S. subsignatus, Strophomorphus ctenotus, Symphyletes* spp., *Tanymecus* spp., *Tenebrio molitor, Tenebrioides mauretanicus, Tribolium* spp. such as *T. castaneum; Trogoderma* spp., *Tychius* spp., *Xylotrechus* spp. such as *X. pyrrhoderus;* and, *Zabrus* spp. such as *Z. tenebrioides;* insects from the order of Diptera for example *Aedes* spp. such as *A. aegypti, A. albopictus, A. vexans; Anastrepha ludens, Anopheles* spp. such as *A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. macellaria; Chrysops atlanticus, Chrysops discalis, Chrysops silacea, Cochliomyia* spp. such as *C. hominivorax, Contarinia* spp. such as *C. sorghicola; Cordylobia anthropophaga, Culex* spp. such as *C. nigripalpus, C. pipiens, C. quinque fasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukii, Fannia* spp. such as *F. canicularis; Gastraphilus* spp. such as *G. intestinalis; Geomyza tipunctata, Glossina* spp. such as *G. fuscipes, G. morsitans, G. palpalis, G. tachinoides; Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L. trifoli; Lucilia* spp. such as *L. caprina, L. cuprina, L. sericata, Lycoria pectoralis, Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mixtum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis mosellana, Stomoxys* spp. such as *S. calcitrans Tabanus* spp. such as *T. atratus, T. bovinus, T. lineola, T. similis; Tannia* spp., *Thecodiplosis japonensis, Tipula oleracea, Tipula paludosa,* and *Wohlfahrtia* spp;

insects from the order of Thysanoptera for example, *Baliothrips biformis, Dichromothrips corbetti, Dichromothrips* ssp., *Echinothrips americanus, Enneothrips flavens, Frankliniella* spp. such as *F. fusca, F. occidentalis, F. tritici; Heliothrips* spp., *Hercinothrips femoralis, Kakothrips* spp., *Microcephalothrips abdominalis, Neohydatothrips samayunkur, Pezothrips kellyanus, Rhipiphorothrips cruentatus, Scirtothrips* spp. such as *S. citri, S. dorsalis, S. perseae; Stenchaetothrips* spp, *Taeniothrips cardamoni, Taeniothrips inconsequens, Thrips* spp. such as *T. imagines, T. hawaiiensis, T. oryzae, T. palmi, T. parvispinus, T. tabaci;* insects from the order of Hemiptera for example, *Aciziajamatonica, Acrosternum* spp. such as *A. hilare; Acyrthosipon* spp. such as *A. onobrychis, A. pisum; Adelges laricis, Adelges tsugae, Adelphocoris* spp., such as *A. rapidus, A. superbus; Aeneolamia* spp., *Agonoscena* spp., *Aulacorthum solani, Aleurocanthus woglumi, Aleurodes* spp., *Aleurodicus disperses, Aleurolobus barodensis, Aleurothrixus* spp., *Amrasca* spp., *Anasa tristis, Antestiopsis* spp., *Anuraphis cardui, Aonidiella* spp., *Aphanostigma piri, Aphidula nasturtii, Aphis* spp. such as *A. craccivora, A. fabae, A. forbesi, A. gossypii, A. grossulariae, A. maidiradicis, A. pomi, A. sambuci, A. schneideri A. spiraecola; Arboridia apicalis, Arilus critatus, Aspidiella* spp., *Aspidiotus* spp., *Atanus* spp., *Aulacaspis yasumatsui, Aulacorthum solani, Bactericera cockerelli (Paratrioza cockerelli), Bemisia* spp. such as *B. argentifoli, B. tabaci (Aleurodes tabaci), Blissus* spp. such as *B. leucopterus; Brachycaudus* spp. such as *B. cardui, B. helichrysi, B. persicae, B. prunicola; Brachycolus* spp., *Brachycorynella asparagi, Brevicoryne brassicae, Cacopsylla* spp. such as *C. fulguralis, C. pyricola (Psylla piri); Calligypona marginata, Calocoris* spp., *Campylomma livida, Capitophorus horni, Carneocephala fulgida, Caverius* spp., *Ceraplastes* spp., *Ceratovacuna lanigera, Ceroplastes ceriferus, Cerosipha gossypii, Chaetosiphon fragaefolii, Chionaspis tegalensis, Chlorita onukii, Chromaphisjuglandicola, Chrysomphalus ficus, Cicadulina mbila, Cimex* spp. such as *C. hemipterus, C. lectularius; Coccomytilus halli, Coccus* spp. such as *C. hesperidum, C. pseudomagnoliarum; Corythucha arcuata, Creontiades dilutus, Cryptomyzus ribis, Chrysomphalus aonidum, Cryptomyzus ribis, Ctenarytaina spatulata, Cyrtopeltis notatus, Dalbulus* spp., *Dasynus piperis, Dialeurodes* spp. such as *D. citrifolii, Dalbulus maidis, Diaphorina* spp. such as *D. citri; Diaspis* spp. such as *D. bromeliae; Dichelops furcatus, Diconocoris hewetti, Doralis* spp., *Dreyfusia nordmannianae, Dreyfusia piceae, Drosicha* spp., *Dysaphis* spp. such as *D. plantaginea, D. pyri, D. radicola; Dysaulacorthum pseudosolani, Dysdercus* spp. such as *D. cingulatus, D. intermedius; Dysmicoccus* spp., *Edessa* spp., *Geocoris* spp., *Empoasca* spp. such as *E. fabae, E. solana; Epidiaspis leperii, Eriosoma* spp. such as *E. lanigerum, E. pyricola; Erythroneura* spp., *Eurygaster* spp. such as *E. integriceps; Euscelis bilobatus, Euschistus* spp. such as *E. heros, E. impictiventris, E. servus; Fiorinia theae, Geococcus coffeae, Glycaspis brimblecombei, Halyomorpha* spp. such as *H. halys; Heliopeltis* spp., *Homalodisca vitripennis (=H. coagulata), Horcias nobilellus, Hyalopterus pruni, Hyperomyzus lactucae, Icerya* spp. such as *I. purchase; Idiocerus* spp., *Idioscopus* spp., *Laodelphax striatellus, Lecanium* spp., *Lecanoideus floccissimus, Lepidosaphes* spp. such as *L. ulmi; Leptocorisa* spp., *Leptoglossus phyllopus, Lipaphis erysimi, Lygus* spp. such as *L. hesperus, L. lineolaris, L.*

*pratensis; Maconellicoccus hirsutus, Marchalina hellenica, Macropes excavatus, Macrosiphum* spp. such as *M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella* spp., *Metopolophium dirhodum, Monellia costalis, Monelliopsis pecanis, Myzocallis coryli, Murgantia* spp., *Myzus* spp. such as *M. ascalonicus, M. cerasi, M. nicotianae, M. persicae, M. varians; Nasonovia ribis-nigri, Neotoxoptera formosana, Neomegalotomus* spp, *Nephotettix* spp. such as *N. malayanus, N. nigropictus, N. parvus, N. virescens; Nezara* spp. such as *N. viridula; Nilaparvata lugens, Nysius huttoni, Oebalus* spp. such as *O. pugnax; Oncometopia* spp., *Orthezia praelonga, Oxycaraenus hyalinipennis, Parabemisia myricae, Parlatoria* spp., *Parthenolecanium* spp. such as *P. corni, P. persicae; Pemphigus* spp. such as *P. bursarius, P. populivenae, Peregrinus maidis, Perkinsiella saccharicida, Phenacoccus* spp. such as *P. aceris, P. gossypii, Phloeomyzus passerinii; Phorodon humuli, Phylloxera* spp. such as *P. devastatrix, Piesma quadrata, Piezodorus* spp. such as *P. guildinii Pinnaspis aspidistrae, Planococcus* spp. such as *P. citri, P. ficus; Prosapia bicincta, Protopulvinaria pyriformis, Psallus seriatus, Pseudacysta persea, Pseudaulacaspis pentagona, Pseudococcus* spp. such as *P. comstock; Psylla* spp. such as *P. mali; Pteromalus* spp., *Pulvinaria amygdali, Pyrilla* spp., *Quadraspidiotus* spp., such as *Q. perniciosus; Quesada gigas, Rastrococcus* spp., *Reduvius senilis, Rhizoecus americanus, Rhodnius* spp., *Rhopalomyzus ascalonicus, Rhopalosiphum* spp. such as *R. pseudobrassicas, R. insertum, R. maidis, R. padi; Sagatodes* spp., *Sahlbergella singularis, Saissetia* spp., *Sappaphis mala, Sappaphis mall Scaptocoris* spp., *Scaphoides titanus, Schizaphis graminum, Schizoneura lanuginosa, Scotinophora* spp., *Selenaspidus articulatus, Sitobion avenae, Sogata* spp., *Sogatella furcifera, Solubea insularis, Spissistilus festinus (=Stictocephala festina), Stephanitis nashi, Stephanitis pyrioides, Stephanitis takeyai, Tenalaphara malayensis, Tetraleurodes perseae, Therioaphis maculate, Thyanta* spp. such as *T. accerra, T. perditor, Tibraca* spp., *Tomaspis* spp., *Toxoptera* spp. such as *T. aurantii Trialeurodes* spp. such as *T. abutilonea, T. ricini, T. vaporariorum; Triatoma* spp., *Trioza* spp., *Typhlocyba* spp., *Unaspis* spp. such as *U. citri, U. yanonensis*; and *Viteus vitifolli*, Insects from the order Hymenoptera for example *Acanthomyops interjectus, Athalia rosae, Atta* spp. such as *A. capiguara, A. cephalotes, A. cephalotes, A. laevigata, A. robusta, A. sexdens, A. texana, Bombus* spp., *Brachymyrmex* spp., *Camponotus* spp. such as *C. floridanus, C. pennsylvanicus, C. modoc; Cardiocondyla nuda, Chalibion* sp, *Crematogaster* spp., *Dasymutilla occidentalis, Diprion* spp., *Dolichovespula maculata, Dorymyrmex* spp., *Dryocosmus kuriphilus, Formica* spp., *Hoplocampa* spp. such as *H. minuta, H. testudinea; Iridomyrmex humilis, Lasius* spp. such as *L. niger, Linepithema humile, Liometopum* spp., *Leptocybe invasa, Monomorium* spp. such as *M. pharaonis, Monomorium, Nylandria fulva, Pachycondyla chinensis, Paratrechina longicornis, Para vespula* spp., such as *P. germanica, P. pennsylvanica, P. vulgaris; Pheidole* spp. such as *P. megacephala; Pogonomyrmex* spp. such as *P. barbatus, P. californicus, Polistes rubiginosa, Prenolepis impairs, Pseudomyrmex gracilis, Schelipron* spp., *Sirex cyaneus, Solenopsis* spp. such as *S. geminata, S. invicta, S. molesta, S. richteri, S. xyloni, Sphecius speciosus, Sphex* spp., *Tapinoma* spp. such as *T. melanocephalum, T. sessile; Tetramorium* spp. such as *T. caespitum, T. bicarinatum, Vespa* spp. such as *V. crabro; Vespula* spp. such as *V. squamosal; Wasmannia auropunctata, Xylocopa* sp;

Insects from the order Orthoptera for example *Acheta domesticus, Calliptamus italicus, Chortoicetes terminifera, Ceuthophilus* spp., *Diastrammena asynamora, Dociostaurus maroccanus, Gryllotalpa* spp. such as *G. africana, G. gryllotalpa; Gryllus* spp., *Hieroglyphus daganensis, Kraussaria angulifera, Locusta* spp. such as *L. migratoria, L. pardalina; Melanoplus* spp. such as *M. bivittatus, M. femurrubruri, M. mexicanus, M. sanguinipes, M. spretus; Nomadacris septemfasciata, Oedaleus senegalersis, Scapteriscus* spp., *Schistocerca* spp. such as *S. americana, S. gregaria, Stemopelmatus* spp., *Tachycines asynamorus*, and *Zonozerus variegatus;*

Pests from the Class Arachnida for example Acari, e.g. of the families Argasidae, Ixodidae and Sarcoptidae, such as *Amblyomma* spp. (e.g. *A. americanum, A. variegatum, A. maculatum*), *Argas* spp. such as *A. persicu*), *Boophilus* spp. such as *B. annulatus, B. decoloratus, B. microplus, Dermacentor* spp. such as *D. silvarum, D. andersoni, D. variabilis, Hyalomma* spp. such as *H. truncatum, Ixodes* spp. such as *I. ricinus, I. rubicundus, I. scapularis, I. holocyclus, I. pacificus, Rhipicephalus sanguineus, Ornithodorus* spp. such as *O. moubata, O. hermsi, O. turicata, Ornithonyssus bacoti, Otobius megnini, Dermanyssus gallinae, Psoroptes* spp. such as *P. ovis, Rhipicephalus* spp. such as *R. sanguineus, R. appendiculatus, Rhipicephalus evertsi, Rhizoglyphus* spp., *Sarcoptes* spp. such as *S. scabiei*; and Family Eriophyidae including *Aceria* spp. such as *A. sheldoni, A. anthocoptes, Acallitus* spp., *Aculops* spp. such as *A. lycopersici, A. pelekassi Aculus* spp. such as *A. schlechtendali; Colomerus vitis, Epitrimerus pyri, Phyllocoptruta oleivora; Eriophytes ribis* and *Eriophyes* spp. such as *Eriophyes sheldoni*, Family Tarsonemidae including *Hemitarsonemus* spp., *Phytonemus pallidus* and *Polyphagotarsonemus latus, Stenotarsonemus* spp. *Steneotarsonemus spinki*; Family Tenuipalpidae including *Brevipalpus* spp. such as *B. phoenicisi*; Family Tetranychidae including *Eotetranychus* spp., *Eutetranychus* spp., *Oligonychus* spp., *Petrobia latens, Tetranychus* spp. such as *T. cinnabarinus, T. evansl T. kanzawa, T. pacificus, T. phaseulus, T. telarius* and *T. urticae; Bryobia praetiosa; Panonychus* spp. such as *P. ulmi, P. citr, Metatetranychus* spp. and *Oligonychus* spp. such as *O. pratensis, O. perseae, Vasates lycopersici; Raoiella indica*, Family Carpoglyphidae including *Carpoglyphus* spp.; *Penthaleidae* spp. such as *Halotydeus destructor*, Family Demodicidae with species such as *Demodex* spp.; Family Trombicidea including *Trombicula* spp.; Family Macronyssidae including *Ornothonyssus* spp.; Family Pyemotidae including *Pyemotes tritici; Tyrophagus putrescentiae*; Family Acaridae including *Acarus siro*; Family Araneida including *Latrodectus mactans, Tegenaria agrestis, Chiracanthium* sp, *Lycosa* sp *Achaearanea tepidariorum* and *Loxosceles reclusa;*

Pests from the Phylum Nematoda, for example, plant parasitic nematodes such as rootknot nematodes, *Meloidogyne* spp. such as *M. hapla, M. incognita, M. javanica*; cyst-forming nematodes, *Globodera* spp. such as *G. rostochiensis; Heterodera* spp. such as *H. avenae, H. glycines, H. schachtii, H. trifoli*; Seed gall nematodes, *Anguina* spp.; Stem and foliar nematodes, *Aphelenchoides* spp. such as *A. besseyi*, Sting nematodes, *Belonolaimus* spp. such as *B. longicaudatus*; Pine nematodes, *Bursaphelenchus* spp. such as *B. lignicolus, B. xylophilus*; Ring nematodes, *Criconema* spp., *Criconemella* spp. such as *C. xenoplax* and *C. ornata*; and, *Criconemoides* spp. such as *Criconemoides informis; Mesocriconema* spp.; Stem and bulb nematodes, *Ditylenchus* spp. such as *D. destructor, D. dipsaci*; Awl nematodes,

*Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus*; Lesion nematodes, *Pratylenchus* spp. such as *P. brachyurus, P. neglectus, P. penetrans, P. curvitatus, P. goodeyi*; Burrowing nematodes, *Radopholus* spp. such as *R. similis*; *Rhadopholus* spp.; *Rhodopholus* spp.; Reniform nematodes, *Rotylenchus* spp. such as *R. robustus, R. reniformis; Scutellonema* spp.; Stubby-root nematode, *Trichodorus* spp. such as *T. obtusus, T. primitivus; Paratrichodorus* spp. such as *P. minor*; Stunt nematodes, *Tylenchorhynchus* spp. such as *T. claytoni, T. dubius*; Citrus nematodes, *Tylenchulus* spp. such as *T. semipenetrans*; Dagger nematodes, *Xiphinema* spp.; and other plant parasitic nematode species;

Insects from the order Isoptera for example *Calotermes flavicollis, Coptotermes* spp. such as *C. formosanus, C. gestroi, C. acinaciformis; Cornitermes cumulans, Cryptotermes* spp. such as *C. brevis, C. cavifrons; Globitermes sulfureus, Heterotermes* spp. such as *H. aureus, H. longiceps, H. tenuis; Leucotermes flavipes, Odontotermes* spp., *Incisitermes* spp. such as *I. minor, I. Snyder Marginitermes hubbardi, Mastotermes* spp. such as *M. darwiniensis Neocapritermes* spp. such as *N. opacus, N. parvus; Neotermes* spp., *Procornitermes* spp., *Zootermopsis* spp. such as *Z. angusticollis, Z. nevadensis, Reticulitermes* spp. such as *R. hesperus, R. tibialis, R. speratus, R. flavipes, R. grassei, R. lucifugus, R. santonensis, R. virginicus; Termes natalensis*, Insects from the order Blattaria for example *Blatta* spp. such as *B. orientalis, B. lateralis; Blattella* spp. such as *B. asahinae, B. germanica; Leucophaea maderae, Panchlora nivea, Periplaneta* spp. such as *P. americana, P. australasiae, P. brunnea, P. fuligginosa, P. japonica; Supella longipalpa, Parcoblatta pennsylvanica, Eurycotis floridana, Pycnoscelus surinamensis,*

Insects from the order Siphonoptera for example *Cediopsylla simples, Ceratophyllus* spp., *Ctenocephalides* spp. such as *C. felis, C. canis, Xenopsylla cheopis, Pulex irritans, Trichodectes canis, Tunga penetrans,* and *Nosopsyllus fasciatus,*

Insects from the order Thysanura for example *Lepisma saccharina, Ctenolepisma urbana,* and *Thermobia domestica,*

Pests from the class Chilopoda for example *Geophilus* spp., *Scutigera* spp. such as *Scutigera coleoptrata;*

Pests from the class Diplopoda for example *Blaniulus guttulatus, Julus* spp., *Narceus* spp., Pests from the class Symphyla for example *Scutigerella immaculata,*

Insects from the order Dermaptera, for example *Forficula auricularia,*

Insects from the order Collembola, for example *Onychiurus* spp., such as *Onychiurus armatus,*

Pests from the order Isopoda for example, *Armadillidium vulgare, Oniscus asellus, Porcellio scaber,*

Insects from the order Phthiraptera, for example *Damalinia* spp., *Pediculus* spp. such as *Pediculus humanus capitis, Pediculus humanus corporis, Pediculus humanus humanus; Pthirus pubis, Haematopinus* spp. such as *Haematopinus eurysternus, Haematopinus suis, Linognathus* spp. such as *Linognathus vituli; Bovicola bovis, Menopon gallinae, Menacanthus stramineus* and *Solenopotes capillatus, Trichodectes* spp., Examples of further pest species which may be controlled by mixtures of the invention include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata, Succinea* spp.; from the class of the helminths, for example, *Ancylostoma duodenale, Ancylostoma ceylanicum, Acylostoma braziliensis, Ancylostoma* spp., *Ascaris lumbricoides, Ascaris* spp., *Brugia malayi, Brugia timori, Bunostomum* spp., *Chabertia* spp., *Clonorchis* spp., *Cooperia* spp., *Dicrocoelium* spp., *Dictyocaulus filaria, Diphyllobothrium latum, Dracunculus medinensis, Echinococcus granulosus, Echinococcus multilocularis, Enterobius vermicularis, Faciola* spp., *Haemonchus* spp. such as *Haemonchus contortus; Heterakis* spp., *Hymenolepis nana, Hyostrongulus* spp., *Loa Loa, Nematodirus* spp., *Oesophagostomum* spp., *Opisthorchis* spp., *Onchocerca volvulus, Ostertagia* spp., *Paragonimus* spp., *Schistosomen* spp., *Strongyloides fuelleborni, Strongyloides stercora lis, Stronyloides* spp., *Taenia saginata, Taenia solium, Trichinella spiralis, Trichinella nativa, Trichinella britovi, Trichinella nelsoni, Trichinella pseudopsiralis, Trichostrongulus* spp., *Trichuris trichiura, Wuchereria bancrofti.*

The mixtures of the present invention are particularly suitable for controlling the following plant diseases:

*Albugo* spp. (white rust) on ornamentals, vegetables (e. g. *A. candida*) and sunflowers (e. g. *A. tragopogonis*); *Alternaria* spp. (*Alternaria* leaf spot) on vegetables, rape (*A. brassicola* or *brassicae*), sugar beets (*A. tenuis*), fruits, rice, soybeans, potatoes (e. g. *A. solani* or *A. alternata*), tomatoes (e. g. *A. solani* or *A. alternata*) and wheat; *Aphanomyces* spp. on sugar beets and vegetables; *Ascochyta* spp. on cereals and vegetables, e. g. *A. tritici* (anthracnose) on wheat and *A. hordei* on barley; *Bipolaris* and *Drechslera* spp. (teleomorph: *Cochliobolus* spp.), e. g. Southern leaf blight (*D. maydis*) or Northern leaf blight (*B. zeicola*) on corn, e. g. spot blotch (*B. sorokiniana*) on cereals and e. g. *B. oryzae* on rice and turfs; *Blumeria* (formerly *Erysiphe*) graminis (powdery mildew) on cereals (e. g. on wheat or barley); *Botrytis cinerea* (teleomorph: *Botryotinia fuckeliana*: grey mold) on fruits and berries (e. g. strawberries), vegetables (e. g. lettuce, carrots, celery and cabbages), rape, flowers, vines, forestry plants and wheat; *Bremia lactucae* (downy mildew) on lettuce; *Ceratocystis* (syn. *Ophiostoma*) spp. (rot or wilt) on broad-leaved trees and evergreens, e. g. *C. ulmi* (Dutch elm disease) on elms; *Cercospora* spp. (*Cercospora* leaf spots) on corn (e. g. Gray leaf spot: *C. zeae-maydis*), rice, sugar beets (e. g. *C. beticola*), sugar cane, vegetables, coffee, soybeans (e. g. *C. sojina* or *C. kikuchii*) and rice; *Cladosporium* spp. on tomatoes (e. g. *C. fulvum*: leaf mold) and cereals, e. g. *C. herbarum* (black ear) on wheat; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*, anamorph: *B. sorokiniana*) and rice (e. g. *C. miyabeanus*, anamorph: *H. oryzae*); *Colletotrichum* (teleomorph: *Glomerella*) spp. (anthracnose) on cotton (e. g. *C. gossypi*), corn (e. g. *C. graminicola*: Anthracnose stalk rot), soft fruits, potatoes (e. g. *C. coccodes* black dot), beans (e. g. *C. lindemuthianum*) and soybeans (e. g. *C. truncatum* or *C. gloeosporioides*); *Corticium* spp., e. g. *C. sasakii* (sheath blight) on rice; *Corynespora cassiicola* (leaf spots) on soybeans and ornamentals; *Cycloconium* spp., e. g. *C. oleaginum* on olive trees; *Cylindrocarpon* spp. (e. g. fruit tree canker or young vine decline, teleomorph: *Nectria* or *Neonectria* spp.) on fruit trees, vines (e. g. *C. liriodendri*, teleomorph: *Neonectria liriodendri*: Black Foot Disease) and ornamentals; *Dematophora* (teleomorph: *Rosellinia*) necatrix (root and stem rot) on soybeans; *Dia-*

*porthe* spp., e. g. *D. phaseolorum* (damping off) on soybeans; *Drechslera* (syn. *Helminthosporium*, teleomorph: *Pyrenophora*) spp. on corn, cereals, such as barley (e. g. *D. teres*, net blotch) and wheat (e. g. *D. tritici-repentis*: tan spot), rice and turf; Esca (dieback, apoplexy) on vines, caused by *Formitiporia* (syn. *Phellinus*) *punctata*, *F. mediterranea*, *Phaeomoniella chlamydospora* earlier *Phaeoacremonium chlamydosporum*), *Phaeoacremonium aleophilum* and/or *Botryosphaeria obtusa*; *Elsinoe* spp. on pome fruits (*E. pyri*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e. g. *E. pisi*), such as cucurbits (e. g. *E. cichoracearum*), cabbages, rape (e. g. *E. cruciferarum*); *Eutypa lata* (*Eutypa* canker or dieback, anamorph: *Cytosporina lata*, syn. *Libertella blepharis*) on fruit trees, vines and ornamental woods; *Exserohilum* (syn. *Helminthosporium*) spp. on corn (e. g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* (f. sp. *glycines* now syn. *F. virguliforme*) and *F. tucumaniae* and *F. brasiliense* each causing sudden death syndrome on soybeans, and *F. verticillioides* on corn; *Gaeumannomyces graminis* (take-all) on cereals (e. g. wheat or barley) and corn; *Gibberella* spp. on cereals (e. g. *G. zeae*) and rice (e. g. *G. fujikuroi*; Bakanae disease); *Glomerella cingulata* on vines, pome fruits and other plants and *G. gossypiion* cotton; Grainstaining complex on rice; *Guignardia bidwellii* (black rot) on vines; *Gymnosporangium* spp. on rosaceous plants and junipers, e. g. *G. sabinae* (rust) on pears; *Helminthosporium* spp. (syn. *Drechslera*, teleomorph: *Cochliobolus*) on corn, cereals and rice; *Hemileia* spp., e. g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; *Microdochium* (syn. *Fusarium*) *nivale* (pink snow mold) on cereals (e. g. wheat or barley); *Microsphaera diffusa* (powdery mildew) on soybeans; *Monilinia* spp., e. g. *M. laxa, M. fructicola* and *M. fructigena* (bloom and twig blight, brown rot) on stone fruits and other rosaceous plants; *Mycosphaerella* spp. on cereals, bananas, soft fruits and ground nuts, such as e. g. *M. graminicola* (anamorph: *Septoria tritic, Septoria blotch*) on wheat or *M. fijiensis* (black Sigatoka disease) on bananas; *Peronospora* spp. (downy mildew) on cabbage (e. g. *P. brassicae*), rape (e. g. *P. parasitica*), onions (e. g. *P. destructor*), tobacco (*P. tabacina*) and soybeans (e. g. *P. manshurica*); *Phakopsora pachyrhizi* and *P. meibomiae* (soybean rust) on soybeans; *Phialophora* spp. e. g. on vines (e. g. *P. tracheiphila* and *P. tetraspora*) and soybeans (e. g. *P. gregata*: stem rot); *Phoma lingam* (root and stem rot) on rape and cabbage and *P. betae* (root rot, leaf spot and damping-off) on sugar beets; *Phomopsis* spp. on sunflowers, vines (e. g. *P. viticola*: can and leaf spot) and soybeans (e. g. stem rot: *P. phaseoli* teleomorph: *Diaporthe phaseolorum*); *Physoderma maydis* (brown spots) on corn; *Phytophthora* spp. (wilt, root, leaf, fruit and stem root) on various plants, such as paprika and cucurbits (e. g. *P. capsici*), soybeans (e. g. *P. megasperma*, syn. *P. sojae*), potatoes and tomatoes (e. g. *P. infestans*, late blight) and broad-leaved trees (e. g. *P. ramorum*: sudden oak death); *Plasmodiophora brassicae* (club root) on cabbage, rape, radish and other plants; *Plasmopara* spp., e. g. *P. viticola* (grapevine downy mildew) on vines and *P. halstedii* on sunflowers; *Podosphaera* spp. (powdery mildew) on rosaceous plants, hop, pome and soft fruits, e. g. *P. leucotricha* on apples; *Polymyxa* spp., e. g. on cereals, such as barley and wheat (*P. graminis*) and sugar beets (*P. betae*) and thereby transmitted viral diseases; *Pseudocercosporella herpotrichoides* (eyespot, teleomorph: *Tapesia yallundae*) on cereals, e. g. wheat or barley; *Pseudoperonospora* (downy mildew) on various plants, e. g. *P. cubensis* on cucurbits or *P. humili* on hop; *Pseudopezicula tracheiphila* (red fire disease or 'rotbrenner', anamorph: *Phialophora*) on vines; *Puccinia* spp. (rusts) on various plants, e. g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye, *P. kuehnfi* (orange rust) on sugar cane and *P. asparagi* on asparagus; *Pyrenophora* (anamorph: *Drechslera*) *tritici-repentis* (tan spot) on wheat or *P. teres* (net blotch) on barley; *Pyricularia* spp., e. g. *P. oryzae* (teleomorph: *Magnaporthe grisea*, rice blast) on rice and *P. grisea* on turf and cereals; *Pythium* spp. (damping-off) on turf, rice, corn, wheat, cotton, rape, sunflowers, soybeans, sugar beets, vegetables and various other plants (e. g. *P. ultimum* or *P. aphanidermatum*); *Ramularia* spp., e. g. *R. collo-cygni* (*Ramularia* leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* (scald) on barley, rye and triticale; *Sarocladium oryzae* and *S. attenuatum* (sheath rot) on rice; *Sclerotinia* spp. (stem rot or white mold) on vegetables and field crops, such as rape, sunflowers (e. g. *S. sclerotiorum*) and soybeans (e. g. *S. rolfsii* or *S. sclerotiorum*); *Septoria* spp. on various plants, e. g. *S. glycines* (brown spot) on soybeans, *S. tritici* (*Septoria* blotch) on wheat and *S.* (syn. *Stagonospora*) *nodorum* (*Stagonospora* blotch) on cereals; *Uncinula* (syn. *Erysiphe*) *necator* (powdery mildew, anamorph: *Oidium tucken*) on vines; *Setosphaeria* spp. (leaf blight) on corn (e. g. *S. turcicum*, syn. *Helminthosporium turcicum*) and turf; *Sphacelotheca* spp. (smut) on corn, (e. g. *S. reiliana*: head smut), sorghum und sugar cane; *Sphaerotheca fuliginea* (powdery mildew) on cucurbits; *Spongospora subterranea* (powdery scab) on potatoes and thereby transmitted viral diseases; *Stagonospora* spp. on cereals, e. g. *S. nodorum* (*Stagonospora* blotch, teleomorph: *Leptosphaeria* [syn. *Phaeosphaeria*] *nodorum*) on wheat; *Synchytrium endobioticum* on potatoes (potato wart disease); *Taphrina* spp., e. g. *T. deformans* (leaf curl disease) on peaches and *T. pruni* (plum pocket) on plums; *Thielaviopsis* spp. (black root rot) on tobacco, pome fruits, vegetables, soybeans and cotton, e. g. *T. basicola* (syn. *Chalara elegans*); *Tilletia* spp. (common bunt or stinking smut) on cereals, such as e. g. *T. tritici* (syn. *T. caries*, wheat bunt) and *T. controversa* (dwarf bunt) on wheat; *Typhula incarnata* (grey snow mold) on barley or wheat; *Urocystis* spp., e. g. *U. occulta* (stem smut) on rye; *Uromyces* spp. (rust) on vegetables, such as beans (e. g. *U. appendiculatus*, syn. *U. phaseoli*) and sugar beets (e. g. *U. betae*); *Ustilago* spp. (loose smut) on cereals (e. g. *U. nuda* and *U. avaenae*), corn (e. g. *U. maydis*: corn smut) and sugar cane; *Venturia* spp. (scab) on apples (e. g. *V. inaequalis*) and pears; and *Verticillium* spp. (wilt) on various plants, such as fruits and ornamentals, vines, soft fruits, vegetables and field crops, e. g. *V. dahliae* on strawberries, rape, potatoes and tomatoes.

EXAMPLES

Synergism can be described as an interaction where the combined effect of two or more com-pounds is greater than the sum of the individual effects of each of the compounds. The presence of a synergistic effect in terms of percent control or efficacy, between two mixing partners (X and Y) can be calculated using the Colby equation (Colby, S. R., 1967, Calculating Synergistic and Antagonistic Responses in Herbicide Combinations, Weeds, 15, 20-22):

$$E = X + Y - \frac{XY}{100}$$

When the observed combined control effect is greater than the expected combined control effect (E), then the combined effect is synergistic.

The following tests can demonstrate the control efficacy of mixtures or compositions of this invention on specific pests and fungi. However, the pest control protection afforded by the com-pounds, mixtures or compositions is not limited to these species. In certain instances, combinations of a compound of this invention with other invertebrate pest control compounds or agents are found to exhibit synergistic effects against certain important invertebrate pests and/or harmful fungi.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

B.1 Cowpea Aphid (*Aphis craccivora*)
The active compounds were formulated in 50:50 (vol:vol) acetone:water. The test solution was prepared at the day of use. Potted cowpea plants colonized with 100-150 aphids of various stages were sprayed after the pest population had been recorded. Population reduction was assessed after 24, 72, and 120 hours.

B.2 Cotton Aphid (*Aphis gossypii*, Mixed Life Stages)
The active compounds were formulated in cyclohexanone as a 10,0000 ppm solution supplied in 1.3 ml ABgene® tubes. These tubes were inserted into an automated electrostatic sprayer equipped with an atomizing nozzle and they served as stock solutions for which lower dilutions were made in 50% acetone: 50% water (v/v). A nonionic surfactant (Kinetic®) was included in the solution at a volume of 0.01% (v/v).

Cotton plants at the cotyledon stage were infested with aphids prior to treatment by placing a heavily infested leaf from the main aphid colony on top of each cotyledon. Aphids were allowed to transfer overnight to accomplish an infestation of 80-100 aphids per plant and the host leaf was removed. The infested plants were then sprayed by an automated electrostatic plant sprayer equipped with an atomizing spray nozzle. The plants were dried in the sprayer fume hood, removed from the sprayer, and then maintained in a growth room under fluorescent lighting in a 24-hr photoperiod at 25° C. and 20-40% relative humidity. Aphid mortality on the treated plants, relative to mortality on untreated control plants, was determined after 5 days.

B.3 Silverleaf Whitefly (*Bemisia argentifolii*, Adult)
The active compounds were formulated in cyclohexanone as a 10,0000 ppm solution supplied in 1.3 ml ABgene® tubes. These tubes were inserted into an automated electrostatic sprayer equipped with an atomizing nozzle and they served as stock solutions for which lower dilutions were made in 50% acetone: 50% water (v/v). A nonionic surfactant (Kinetic®) was included in the solution at a volume of 0.01% (v/v).

Cotton plants at the cotyledon stage (one plant per pot) were sprayed by an automated electrostatic plant sprayer equipped with an atomizing spray nozzle. The plants were dried in the sprayer fume hood and then removed from the sprayer. Each pot was placed into a plastic cup and 10 to 12 whitefly adults (approximately 3-5 days old) were introduced. The insects were collected using an aspirator and 0.6 cm, nontoxic Tygon® tubing (R-3603) connected to a barrier pipette tip. The tip, containing the collected insects, was then gently inserted into the soil containing the treated plant, allowing insects to crawl out of the tip to reach the foliage for feeding. Cups were covered with a reusable screened lid (150-micron mesh polyester screen PeCap from Tetko, Inc.). Test plants were maintained in a growth room at 25° C. and 20-40% relative humidity for 3 days, avoiding direct exposure to fluorescent light (24 hour photoperiod) to prevent trap-ping of heat inside the cup. Mortality was assessed 3 days after treatment, compared to untreated control plants.

B.4 Vetch Aphid (*Megoura viciae*)
The active compounds were formulated in 1:3 (vol:vol) DMSO:water with different concentrations of formulated compounds.

Bean leaf disks were placed into microtiterplates filled with 0.8% agar-agar and 2.5 ppm OPUS™. The leaf disks were sprayed with 2.5 µl of the test solution and 5 to 8 adult aphids were placed into the microtiter plates which were then closed and kept at 23±1° C. and 50±5% relative humidity under fluorescent light for 6 days. Mortality was assessed on the basis of vital, re-produced aphids. Aphid mortality and fecundity was then visually assessed.

B.5 Green Peach Aphid (*Myzus persicae*)
The active compounds were formulated in cyclohexanone as a 10,0000 ppm solution supplied in 1.3 ml ABgene® tubes. These tubes were inserted into an automated electrostatic sprayer equipped with an atomizing nozzle and they served as stock solutions for which lower dilutions were made in 50% acetone: 50% water (v/v). A nonionic surfactant (Kinetic®) was included in the solution at a volume of 0.01% (v/v).

Bell pepper plants at the first true-leaf stage were infested prior to treatment by placing heavily infested leaves from the main colony on top of the treatment plants. Aphids were allowed to transfer overnight to accomplish an infestation of 30-50 aphids per plant and the host leaves were removed. The infested plants were then sprayed by an automated electrostatic plant sprayer equipped with an atomizing spray nozzle. The plants were dried in the sprayer fume hood, removed, and then maintained in a growth room under fluorescent lighting in a 24 hour photoperiod at 25° C. and 20-40% relative humidity. Aphid mortality on the treated plants, relative to mortality on untreated control plants, was determined after 5 days.

B.7 Rice Plant Hopper (*Nilaparvata lugens*)
Rice seedlings were cleaned and washed 24 hours before spraying. The active compounds were formulated in 50:50 acetone:water and 0.1% vol/vol surfactant (EL 620) was added. Potted rice seedlings were sprayed with 5 ml test solution, air dried, placed in cages and inoculated with 10 adults. Treated rice plants were kept at 28-29° C. and relative humidity of 50-60%. Percent mortality was recorded after 72 hours.

B.8 Orchid Thrips (*Dichromothrips corbetti*)
The active compounds were formulated as a 50:50 (vol:vol) acetone:water solution. Surfactant (Alkamuls EL 620) was added at the rate of 0.1% (vol/vol). Vanda orchids petals were cleaned, washed and air dried prior to spraying. Petals were dipped into the test solution for 3 seconds, air dried, placed inside a resealable plastic and inoculated with 20 adults. The treated petals were kept inside the holding room at 28-29° C. and relative humidity of 50-60%. Percent mortality was recorded after 72 hours.

B.9 Rice Green Leafhopper (*Nephotettix virescens*)

Rice seedlings were cleaned and washed 24 hours before spraying. The active com-pounds were formulated in 50:50 acetone:water, and 0.1% vol/vol surfactant (EL 620) was added. Potted rice seedlings were sprayed with 5 ml test solution, air dried, placed in cages and inoculated with 10 adults. Treated rice plants were kept at 28-29° C. and relative humidity of 50-60%. Percent mortality was recorded after 72 hours.

Test 1—Control of Vetch Aphid

For evaluating control of vetch aphid (*Megoura viciae*) through contact or systemic means the test unit consisted of 24-well-microtiter plates containing broad bean leaf disks.

The compounds or mixtures were formulated using a solution containing 75% water and 25% Dimethylsulfoxide (DMSO). Different concentrations of formulated compounds or mixtures were sprayed onto the leaf disks at 2.5 µl, using a custom built micro atomizer, at two replications.

For experimental mixtures in these tests identical volumes of both mixing partners at the desired concentrations respectively, were mixed together.

After application, the leaf disks were air-dried and 5-8 adult aphids placed on the leaf disks inside the microtiter plate wells. The aphids were then allowed to suck on the treated leaf disks and incubated at 23+1° C., 50+5% relative humidity (RH) for 5 days. Aphid mortality and fecundity was then visually assessed.

Test 2—Control of Green Peach Aphid

For evaluating control of green peach aphid (*Myzus persicae*) through systemic means the test unit consisted of 96-well-microtiter plates containing liquid artificial diet under an artificial membrane.

The compounds or mixtures were formulated using a solution containing 75% water and 25% DMSO. Different concentrations of formulated compounds or mixtures were pipetted into the aphid diet, using a custom built pipetter, at two replications.

For experimental mixtures in these tests identical volumes of both mixing partners at the desired concentrations respectively, were mixed together.

After application, 5-8 adult aphids were placed on the artificial membrane inside the microtiter plate wells. The aphids were then allowed to suck on the treated aphid diet and incubated at 23+1° C., 50+5% RH for 3 days. Aphid mortality and fecundity was then visually assessed.

Test 3—Control of Boll Weevil

For evaluating control of boll weevil (*Anthonomus grandis*) the test unit consisted of 24-well-microtiter plates containing an insect diet and 20-30 *A. grandis* eggs.

The compounds or mixtures were formulated using a solution containing 75% water and 25% DMSO. Different concentrations of formulated compounds or mixtures were sprayed onto the insect diet at 20 µl, using a custom built micro atomizer, at two replications.

For experimental mixtures in these tests identical volumes of both mixing partners at the desired concentrations respectively, were mixed together.

After application, microtiter plates were incubated at 23+1° C., 50+5% RH for 5 days. Egg and larval mortality was then visually assessed.

Test 4—Control of Mediterranean Fruitfly

For evaluating control of Mediterranean fruitfly (*Ceratitis capitata*) the test unit consisted of 96-well-microtiter plates containing an insect diet and 50-80 *C. capitata* eggs.

The compounds or mixtures were formulated using a solution containing 75% water and 25% DMSO. Different concentrations of formulated compounds or mixtures were sprayed onto the insect diet at 5 µl, using a custom built micro atomizer, at two replications.

For experimental mixtures in these tests identical volumes of both mixing partners at the desired concentrations respectively, were mixed together.

After application, microtiter plates were incubated at 28+1° C., 80+5% RH for 5 days. Egg and larval mortality was then visually assessed.

Test 5—Control of Tobacco Budworm

For evaluating control of tobacco budworm (*Heliothis virescens*) the test unit consisted of 96-well-microtiter plates containing an insect diet and 15-25 *H. virescens* eggs.

The compounds or mixtures were formulated using a solution containing 75% water and 25% DMSO. Different concentrations of formulated compounds or mixtures were sprayed onto the insect diet at 10 µl, using a custom built micro atomizer, at two replications.

For experimental mixtures in these tests identical volumes of both mixing partners at the desired concentrations respectively, were mixed together.

After application, microtiter plates were incubated at 28+1° C., 80+5% RH for 5 days. Egg and larval mortality was then visually assessed.

Tests 6 to 9: Microtests

The active compounds were formulated separately as a stock solution having a concentration of 10000 ppm in dimethyl sulfoxide.

The measured parameters were compared to the growth of the active compound-free control variant (100%) and the fungus-free and active compound-free blank value to determine the relative growth in % of the pathogens in the respective active compounds. These percentages were converted into efficacies.

Test 6—Activity Against the Grey Mold *Botrytis cinerea* in the Microtiterplate Test The stock solutions were mixed according to the ratio, pipetted onto a micro titer plate (MTP) and diluted with water to the stated concentrations. A spore suspension of *Botrci cinerea* in an aqueous biomalt solution was then added. The plates were placed in a water vapor-saturated chamber at a temperature of 18° C. Using an absorption photometer, the MTPs were measured at 405 nm 7 days after the inoculation.

Test 7—Activity Against Rice Blast *Pyricularia oryzae* in the Microtiterplate Test The stock solutions were mixed according to the ratio, pipetted onto a micro titer plate (MTP) and diluted with water to the stated concentrations. A spore suspension of *Pyricularia oryzae* in an aqueous biomalt solution was then added. The plates were placed in a water vapor-saturated chamber at a temperature of 18° C. Using an absorption photometer, the MTPs were measured at 405 nm 7 days after the inoculation.

Test 8—Activity Against Early Blight on Tomatoes Caused by *Alternaria solani*

Microtest: the active compounds were formulated separately as a stock solution having a concentration of 10000 ppm in dimethyl sulfoxide.

The stock solutions were mixed according to the ratio, pipetted onto a micro titer plate (MTP) and diluted with water to the stated concentrations. A spore suspension of

*Alternaria solani* in an aqueous biomalt solution was then added. The plates were placed in a water vapor-saturated chamber at a temperature of 18° C. Using an absorption photometer, the MTPs were measured at 405 nm 7 days after the inoculation.

The invention claimed is:

1. A pesticidal mixture comprising C1) at least one active compound of formula I:

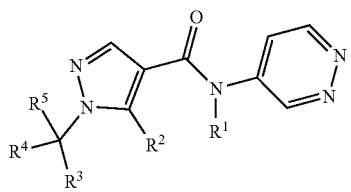

wherein
$R^1$ is $CH_2CH_3$;
$R^2$ is $CH_3$, or halomethyl;
$R^3$ is $CH(CH_3)_2$;
$R^4$ is $CH_3$;
$R^5$ is H or $CH_3$;
C2) broflanilide;
wherein component C1) and component C2) are present in a weight ratio ranging from 100:1 to 1:100.

2. The mixture of claim 1, wherein the weight ratio range of component C1) to component C2) is in the range of from, 10:1 to 1:10.

3. The mixture of claim 1, wherein the weight ratio range of component C1) to component C2) is in the range of from 2:1 to 1:2.

4. A seed treatment composition comprising a pesticidal mixture as defined in claim 1, and at least one auxiliary, wherein the auxiliary is selected from the group consisting of surfactants, antifreezing agents, binders, and pigments.

5. Treated seeds comprising seeds treated with a pesticidal mixture as defined in claim 1 or a seed treatment composition comprising the pesticidal mixture and at least one auxiliary selected from the group consisting of surfactants, antifreezing agents, binders, and pigments, wherein the pesticidal mixture is applied to the seeds in an amount ranging from 0.01 g to 10000 g per 100 kg of seeds.

6. The seed treatment composition according to claim 4, wherein the auxiliary is selected from the group consisting of surfactants and binders.

7. A method for controlling invertebrate pests on plants selected from wheat, maize, barley, oat, rye, rice, soybean, cotton, sugarbeet, rapeseed, and potato, on a plant propagation material thereof, or in a soil or water in which the plants are growing, the method comprising contacting at least one of the plants, the plant propagation materials, the invertebrate pests, a food supply of the invertebrate pests, a habitat of the invertebrate pests, and a breeding ground of the invertebrate pests, with an effective amount of the pesticidal mixture of claim 1.

8. The method of claim 7, wherein the weight ratio range of component C1) to component C2) is in the range of from 10:1 to 1:10.

9. The method of claim 7, wherein the weight ratio range of component C1) to component C2) is in the range of from 2:1 to 1:2.

10. The method according to claim 7, wherein the invertebrate pests are selected from the group consisting of aphids and thrips.

* * * * *